(12) United States Patent
Ma et al.

(10) Patent No.: US 12,528,808 B2
(45) Date of Patent: Jan. 20, 2026

(54) THERAPY FOR ERYTHROPOIETIC PROTOPORPHYRIA (EPP) AND X-LINKED PROTOPORPHYRIA (XLP)

(71) Applicant: UNIVERSITY OF PITTSBURGH-OF THE COMMONWEALTH SYSTEM OF HIGHER EDUCATION, Pittsburgh, PA (US)

(72) Inventors: Xiaochao Ma, Sewickley, PA (US); Junjie Zhu, Pittsburgh, PA (US); Jie Lu, Wexford, PA (US)

(73) Assignee: UNIVERSITY OF PITTSBURGH OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 1070 days.

(21) Appl. No.: 17/612,638

(22) PCT Filed: May 20, 2020

(86) PCT No.: PCT/US2020/033746
§ 371 (c)(1),
(2) Date: Nov. 19, 2021

(87) PCT Pub. No.: WO2020/236901
PCT Pub. Date: Nov. 26, 2020

(65) Prior Publication Data
US 2022/0249473 A1  Aug. 11, 2022

Related U.S. Application Data

(60) Provisional application No. 62/850,061, filed on May 20, 2019.

(51) Int. Cl.
| C07D 471/14 | (2006.01) |
| A61K 31/4985 | (2006.01) |
| A61P 1/16 | (2006.01) |
| A61P 35/00 | (2006.01) |
| C07K 14/705 | (2006.01) |
| C12N 9/14 | (2006.01) |

(52) U.S. Cl.
CPC ........ *C07D 471/14* (2013.01); *A61K 31/4985* (2013.01); *A61P 1/16* (2018.01); *A61P 35/00* (2018.01); *C07K 14/705* (2013.01); *C12N 9/14* (2013.01); *C12Y 306/03044* (2013.01)

(58) Field of Classification Search
CPC .... C07D 471/14; A61K 31/4985; A61P 35/00
See application file for complete search history.

(56) References Cited

U.S. PATENT DOCUMENTS

| 4,342,566 | A | 8/1982 | Theofilopoulos et al. |
| 4,704,692 | A | 11/1987 | Ladner |
| 4,816,567 | A | 3/1989 | Cabilly et al. |
| 5,565,332 | A | 10/1996 | Hoogenboom et al. |
| 5,721,367 | A | 2/1998 | Kay et al. |
| 5,804,440 | A | 9/1998 | Burton et al. |
| 5,837,243 | A | 11/1998 | Deo et al. |
| 5,939,598 | A | 8/1999 | Kucherlapati et al. |
| 6,096,441 | A | 8/2000 | Barbas et al. |
| 6,130,364 | A | 10/2000 | Jakobovits et al. |
| 6,180,377 | B1 | 1/2001 | Morgan et al. |
| 9,056,111 | B1 | 6/2015 | Larson et al. |
| 9,314,448 | B2 | 4/2016 | Henrich et al. |
| 9,937,217 | B2 | 4/2018 | Henrich et al. |
| 2016/0214984 | A1* | 7/2016 | Li .................... A61P 35/00 |
| 2017/0151339 | A1 | 6/2017 | White et al. |
| 2017/0224837 | A1 | 8/2017 | Chang et al. |
| 2022/0249473 | A1 | 8/2022 | Ma et al. |

FOREIGN PATENT DOCUMENTS

| CN | 106191061 | 12/2016 |
| CN | 108601841 | 9/2018 |
| EP | 3972605 A4 | 3/2022 |
| WO | 94/29348 | 12/1994 |
| WO | 2017035116 | 3/2017 |
| WO | 2019/060742 | 3/2019 |
| WO | 2020236901 A1 | 11/2020 |

OTHER PUBLICATIONS

International Search Report and Written Opinion dated Oct. 13, 2020, from International Application No. PCT/US2020/033746, 17 pages.
Zhou et al. "Increased expression of the Abcg2 transporter during erythroid maturation plays a role in decreasing cellular protoporphyrin IX level", Blood. Mar. 15, 2005; 105(6): 2571-2576.
Liu et al. "A new class of anti-thrombosis hexahydropyrazino-[1',2':1,6]pyrido-[3,4-b]-indole-1,4-dions: Design, synthesis, log K determination, and QSAR analysis", Bioorganic & Medicinal Chemistry 15 (2007) 5672-5693.
Toyoda et al. "Inhibitors of Human ABCG2: From Technical Background to Recent Updates With Clinical Implications", Frontiers in Pharmacology, Mar. 2019, vol. 10, article 208.
Wang et al. "The essential role of the transporter ABCG2 in the pathophysiology of erythropoietic protoporphyria", Sci. Adv. 2019; 5; Sep. 18, 2019.
Examination Report issued in corresponding Canadian Application No. 3,135,592, dated Dec. 3, 2024.
International Preliminary Report on Patentability issued for Application No. PCT/US2020/033746, dated Dec. 2, 2021.

(Continued)

*Primary Examiner* — Theodore R. Howell
(74) *Attorney, Agent, or Firm* — Meunier Carlin & Curfman LLC

(57) ABSTRACT

Disclosed are novel compositions and methods of using the same for the treatment of Erythropoiefic protoporphyria (EPP) and X-linked protoporphyria (XLP). Disclosed are methods and compositions related to treating Erythropoietic protoporphyria and X-linked protoporphyria. Also described are therapeutic agents that can inhibit ABCG2. For example, provided herein are therapeutic agents defined by Formula I.

8 Claims, 20 Drawing Sheets

Specification includes a Sequence Listing.

(56) References Cited

OTHER PUBLICATIONS

Office Action issued for Chinese Application No. 202080049499.0, dated May 31, 2023.
Office Action issued for Chinese Application No. 202080049499.0, dated Dec. 12, 2023.
Extended European Search Report issued for Application No. 20809953.1, dated Sep. 6, 2023.
Office Action issued for Canadian Application No. 3135592, dated Nov. 17, 2023.
Lin, Yu-Hsing, et al. "Protoporphyrin IX accumulation disrupts mitochondrial dynamics and function in ABCG2-deficient hepatocytes." FEBS letters 587.19 (2013): 3202-3209.
Van Loevezijn, Arnold, et al. "Inhibition of BCRP-mediated drug efflux by fumitremorgin-type indolyl diketopiperazines." Bioorganic & medicinal chemistry letters 11.1 (2001): 29-32.
A. G. Smith, F. De Matteis, Drugs and the hepatic porphyrias. Clin Haematol 9, 399-425 (1980).
A. Schauder, A. Avital, Z. Malik, Regulation and gene expression of heme synthesis under heavy metal exposure—review. J Environ Pathol Toxicol Oncol 29, 137-158 (2010).
A. V. Anstey, R. J. Hift, Liver disease in erythropoietic protoporphyria: insights and implications for management. Gut 56, 1009-1018 (2007).
American Porphyria Foundation, https://porphyriafoundation.org/about-porphyria/types/EPP-XLP. (2018).
B. M. McGuire et al., Liver transplantation for erythropoietic protoporphyria liver disease. Liver Transpl 11, 1590-1596 (2005).
C. Lim, M. Razzaque, J. Luo, P. Farmer, Isolation and characterization of protoporphyrin glycoconjugates from rat Harderian gland by HPLC, capillary electrophoresis and HPLC/electrospray ionization MS. Biochem. J 347, 757-761 (2000).
C. Xu, C. Y.-T. Li, A.-N. T. Kong, Induction of phase I, II and III drug metabolism/transport by xenobiotics. Archives of pharmacal research 28, 249 (2005).
D. M. Becker, J. D. Viljoen, J. Katz, S. Kramer, Reduced ferrochelatase activity: a defect common to porphyria variegata and protoporphyria. Br J Haematol 36, 171-179 (1977).
E. Henin et al., Pharmacokinetic interactions in mice between irinotecan and MBL-II-141, an ABCG2 inhibitor. Biopharmaceutics & drug disposition38, 351-362 (2017).
E. I. Minder, X. Schneider-Yin, J. Steurer, L. M. Bachmann, A systematic review of treatment options for dermal photosensitivity in erythropoietic protoporphyria. Cellular and molecular biology (Noisy-le-Grand, France) 55, 84-97 (2009).
F. Li et al., Human PXR modulates hepatotoxicity associated with rifampicin and isoniazid co-therapy. Nat Med 19, 418-420 (2013).
G. S. Marks, D. T. Zelt, S. P. Cole, Alterations in the heme biosynthetic pathway as an index of exposure to toxins. Can J Physiol Pharmacol 60, 1017-1026 (1982).
G. Szakacs, J. K. Paterson, J. A. Ludwig, C. Booth-Genthe, M. M. Gottesman, Targeting multidrug resistance in cancer. Nature reviews. Drug discovery5, 219-234 (2006).
H. Baart de la Faille et al., Erythropoietic protoporphyria: clinical aspects with emphasis on the skin. Curr Probl Dermatol 20, 123-134 (1991).
H. L. Bonkovsky et al., Porphyrin and heme metabolism and the porphyrias. Compr Physiol 3, 365-401 (2013).
H. Puy, L. Gouya, J.-C. Deybach, Porphyrias. The Lancet 375, 924-937 (2010).
J. D. Allen et al., Potent and specific inhibition of the breast cancer resistance protein multidrug transporter in vitro and in mouse intestine by a novel analogue of fumitremorgin C. Mol Cancer Ther1, 417-425 (2002).
J. G. Langendonk et al., Afamelanotide for Erythropoietic Protoporphyria. The New England journal of medicine 373, 48-59 (2015).
J. R. Bloomer, The liver in protoporphyria. Hepatology 8, 402-407 (1988).
J. W. Jonker et al., The breast cancer resistance protein protects against a major chlorophyll-derived dietary phototoxin and protoporphyria. Proc Natl Acad Sci U S A 99, 15649-15654 (2002).
K. Liu et al., Metabolism of KO143, an ABCG2 inhibitor. Drug Metabolism and Pharmacokinetics32, 193-200 (2017).
K. Natarajan, Y. Xie, M. R. Baer, D. D. Ross, Role of breast cancer resistance protein (BCRP/ABCG2) in cancer drug resistance. Biochem. Pharmacol.83, 1084-1103 (2012).
M. B. Poh-Fitzpatrick, A. A. Lamola, Comparative study of protoporphyrins in erythropoietic protoporphyria and griseofulvin-induced murine protoporphyria. Binding affinities, distribution, and fluorescence spectra in various blood fractions. The Journal of clinical investigation 60, 380-389 (1977).
M. Balwani et al., Clinical, Biochemical, and Genetic Characterization of North American Patients With Erythropoietic Protoporphyria and X-linked Protoporphyria. JAMA dermatology 153, 789-796 (2017).
M. Balwani, R. J. Desnick, The porphyrias: advances in diagnosis and treatment. Hematology Am Soc Hematol Educ Program 2012, 19-27 (2012).
M. J. Casanova-Gonzalez, M. Trapero-Marugan, E. A. Jones, R. Moreno-Otero, Liver disease and erythropoietic protoporphyria: a concise review. World J Gastroenterol 16, 4526-4531 (2010).
M. Lecha, H. Puy, J. C. Deybach, Erythropoietic protoporphyria. Orphanet J Rare Dis 4, 19 (2009).
M. Wiese, BCRP/ABCG2 inhibitors: a patent review (2009-present). Expert Opin. Ther. Pat.25, 1229-1237 (2015).
N. S. Key, J. M. Rank, D. Freese, J. R. Bloomer, D. E. Hammerschmidt, Hemolytic anemia in protoporphyria: possible precipitating role of liver failure and photic stress. American journal of hematology 39, 202-207 (1992).
R. J. Hift, S. Thunell, A. Brun, Drugs in porphyria: From observation to a modern algorithm-based system for the prediction of porphyrogenicity. Pharmacol Ther 132, 158-169 (2011).
S. Boulechfar et al., Ferrochelatase structural mutant (Fechm1Pas) in the house mouse. Genomics 16, 645-648 (1993).
S. D. Whatley et al., C-terminal deletions in the ALAS2 gene lead to gain of function and cause X-linked dominant protoporphyria without anemia or iron overload. American journal of human genetics 83, 408-414 (2008).
S. Kramer, J. D. Viljoen, Erythropoietic protoporphyria: evidence that it is due to a variant ferrochelatase. Int J Biochem 12, 925-930 (1980).
S. Lyoumi et al., Protoporphyrin retention in hepatocytes and Kupffer cells prevents sclerosing cholangitis in erythropoietic protoporphyria mouse model. Gastroenterology 141, 1509-1519, 1519 e1501-1503 (2011).
S. Sandberg, A. Brun, Light-induced protoporphyrin release from erythrocytes in erythropoietic protoporphyria. The Journal of clinical investigation 70, 693-698 (1982).
S. Tutois et al., Erythropoietic protoporphyria in the house mouse. A recessive inherited ferrochelatase deficiency with anemia, photosensitivity, and liver disease. J Clin Invest 88, 1730-1736 (1991).
T. R. Tephly, A. H. Gibbs, F. De Matteis, Studies on the mechanism of experimental porphyria produced by 3, 5-diethoxycarbonyl-1, 4-dihydrocollidine. Role of a porphyrin-like inhibitor of protohaem ferro-lyase. Biochem. J 180, 241-244 (1979).
X. Ma et al., The pregnane X receptor gene-humanized mouse: a model for investigating drug-drug interactions mediated by cytochromes P450 3A. Drug Metab Dispos 35, 194-200 (2007).
Y. Fukuda et al., The severity of hereditary porphyria is modulated by the porphyrin exporter and Lan antigen ABCB6. Nature communications 7, 12353 (2016).
Y. Li et al., Synthesis of a new inhibitor of breast cancer resistance protein with significantly improved pharmacokinetic profiles. Bioorg Med Chem Lett26, 551-555 (2016).
Senter, Peter D., et al. "Generation of 5-fluorouracil from 5-fluorocytosine by monoclonal antibody-cytosine deaminase conjugates." Bioconjugate chemistry 2.6 (1991): 447-451.
Bagshawe, K. D. "Towards generating cytotoxic agents at cancer sites. The First Bagshawe Lecture." Br. J. Cancer 60 (1989): 275-281.

(56) References Cited

OTHER PUBLICATIONS

Bagshawe, K. D., et al. "A cytotoxic agent can be generated selectively at cancer sites." British journal of cancer 58.6 (1988): 700-703.
Senter, Peter D., et al. "Generation of cytotoxic agents by targeted enzymes." Bioconjugate chemistry 4.1 (1993): 3-9.
Battelli, M. G., et al. "T lymphocyte killing by a xanthine-oxidase-containing immunotoxin." Cancer Immunology, Immunotherapy 35.6 (1992): 421-425.
Pietersz, Geoffrey A., and Ian FC Mckenzie. "Antibody conjugates for the treatment of cancer." Immunological reviews 129.1 (1992): 57-80.
Roffler, Steven R., et al. "Anti-neoplastic glucuronide prodrug treatment of human tumor cells targeted with a monoclonal antibody-enzyme conjugate." Biochemical pharmacology 42.10 (1991): 2062-2065.
Hughes, Brenda J., et al. "Monoclonal antibody targeting of liposomes to mouse lung in vivo." Cancer research 49.22 (1989): 6214-6220.
Litzinger, David C., and Leaf Huang. "Biodistribution and immunotargetability of ganglioside-stabilized dioleoylphosphatidylethanolamine liposomes." Biochimica et Biophysica Acta (BBA)-Biomembranes 1104.1 (1992): 179-187.
Handbook of Monoclonal Antibodies, Ferrone et al., eds., Noges Publications, Park Ridge, N.J., (1985) ch. 22 and pp. 303-357.
Smith et al., Antibodies in Human Diagnosis and Therapy, Haber et al., eds., Raven Press, New York (1977) pp. 365-389.
Kohler and Milstein, Nature, 256:495 (1975).
Zoller, Mark J. "New recombinant DNA methodology for protein engineering." Current opinion in biotechnology 3.4 (1992): 348-354.
Jakobovits, Aya, et al. "Analysis of homozygous mutant chimeric mice: deletion of the immunoglobulin heavy-chain joining region blocks B-cell development and antibody production." Proceedings of the National Academy of Sciences 90.6 (1993): 2551-2555.
Jakobovits, Aya, et al. "Germ-line transmission and expression of a human-derived yeast artificial chromosome." Nature 362.6417 (1993): 255-258.
Brüggemann, Marianne, N. P. Davies, and I. R. Rosewell. "Designer mice: the production of human antibody repertoires in transgenic animals." The Year in immunology 7 (1993): 33-40.
Jones, Peter T., et al. "Replacing the complementarity-determining regions in a human antibody with those from a mouse." Nature 321.6069 (1986): 522-525.
Riechmann, Lutz, et al. "Reshaping human antibodies for therapy." Nature 332.6162 (1988): 323-327.
Presta, Leonard G. "Antibody engineering." Current Opinion in Structural Biology 2.4 (1992): 593-596.
Verhoeyen, Martine, Cesar Milstein, and Greg Winter. "Reshaping human antibodies: grafting an antilysozyme activity." Science 239. 4847 (1988): 1534-1536.
He, L. et al., "Involvement of protoporphyrin IX accumulation in the pathogenesis of isoniazid/rifampicin-induced liver injury: the prevention of curcumin", Xenobiotica, 2017, vol. 47, pp. 154-163.
Wu, G. et al., "Toward breast cancer resistance protein (BCRP) inhibitors: design, synthesis of a series of new simplified fumitremorgin C analogues", Tetrahedron, 2007, vol. 63, pp. 5510-5528.
Jackson, Scott M., et al. "Structural basis of small-molecule inhibition of human multidrug transporter ABCG2." Nature structural & molecular biology 25.4 (2018): 333-340.

\* cited by examiner

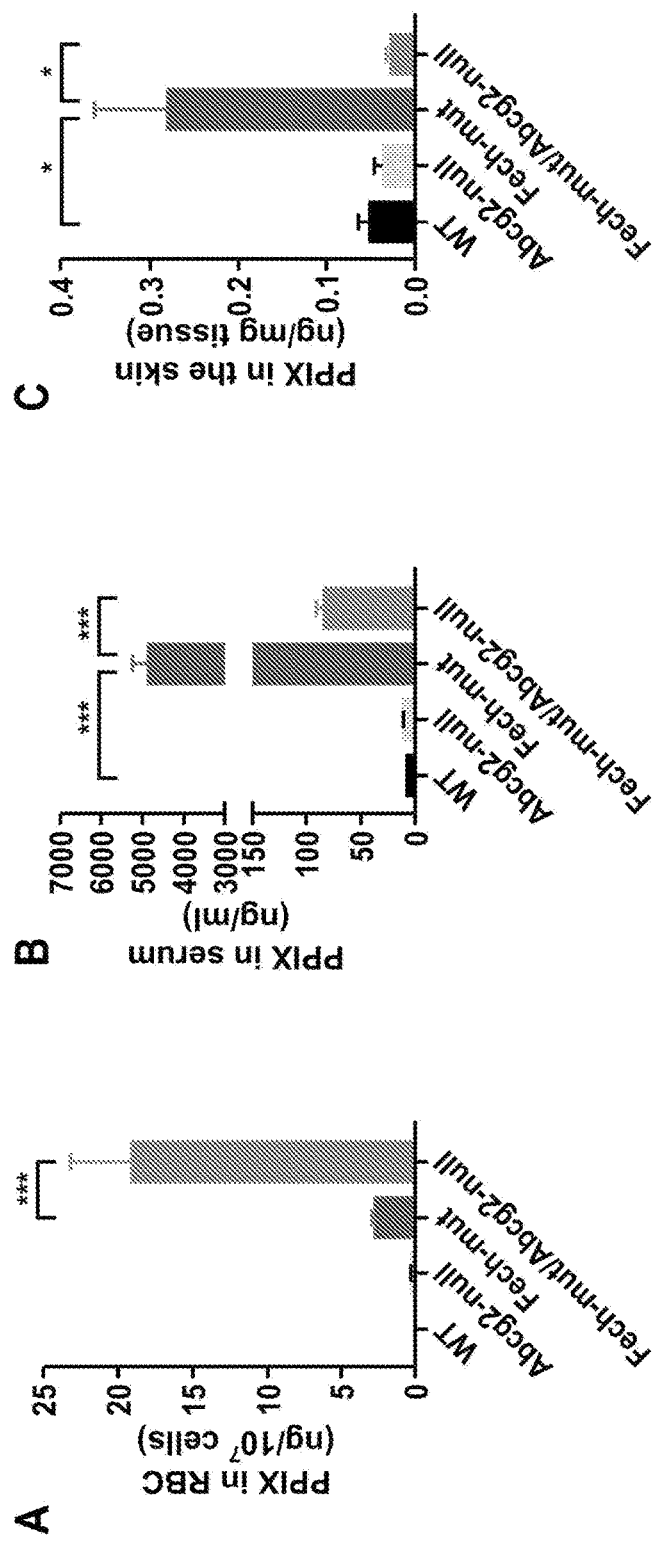
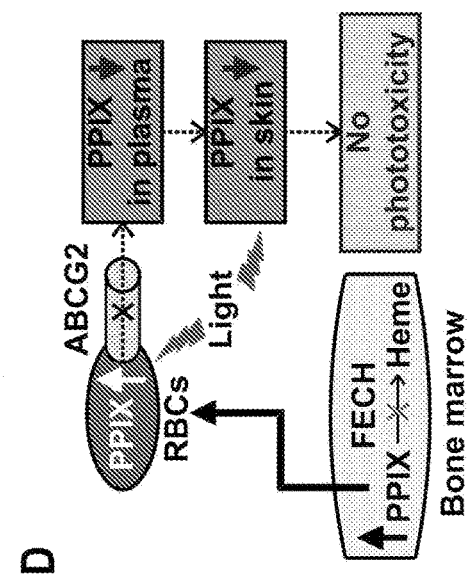
FIGS. 3A-3D

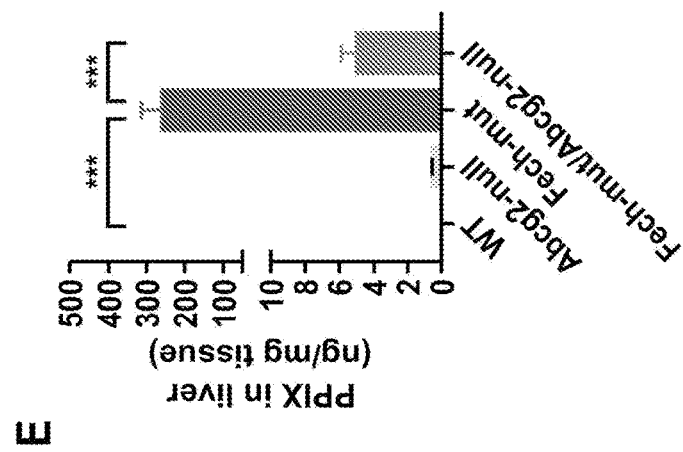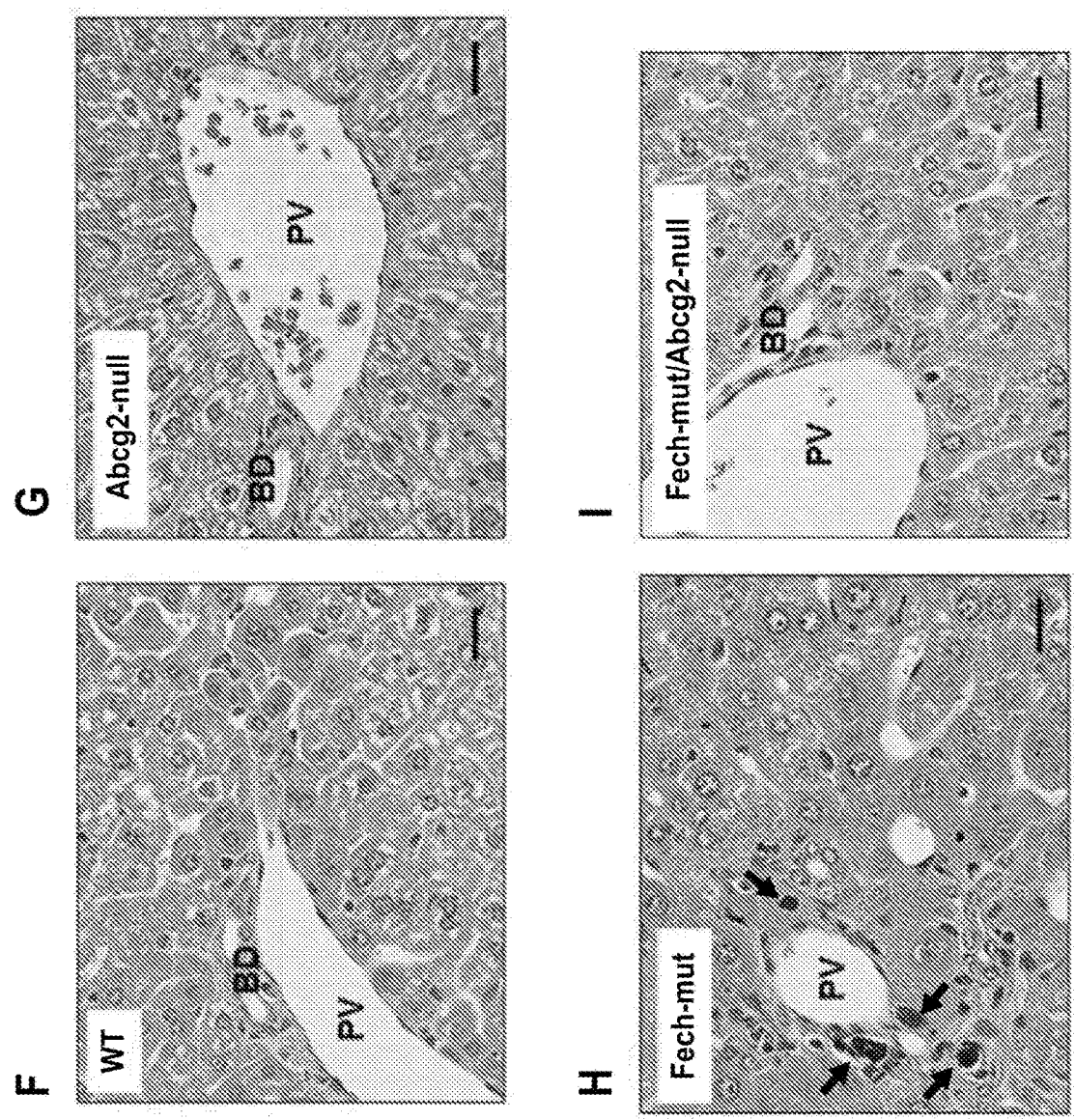
FIGS. 4E-4I

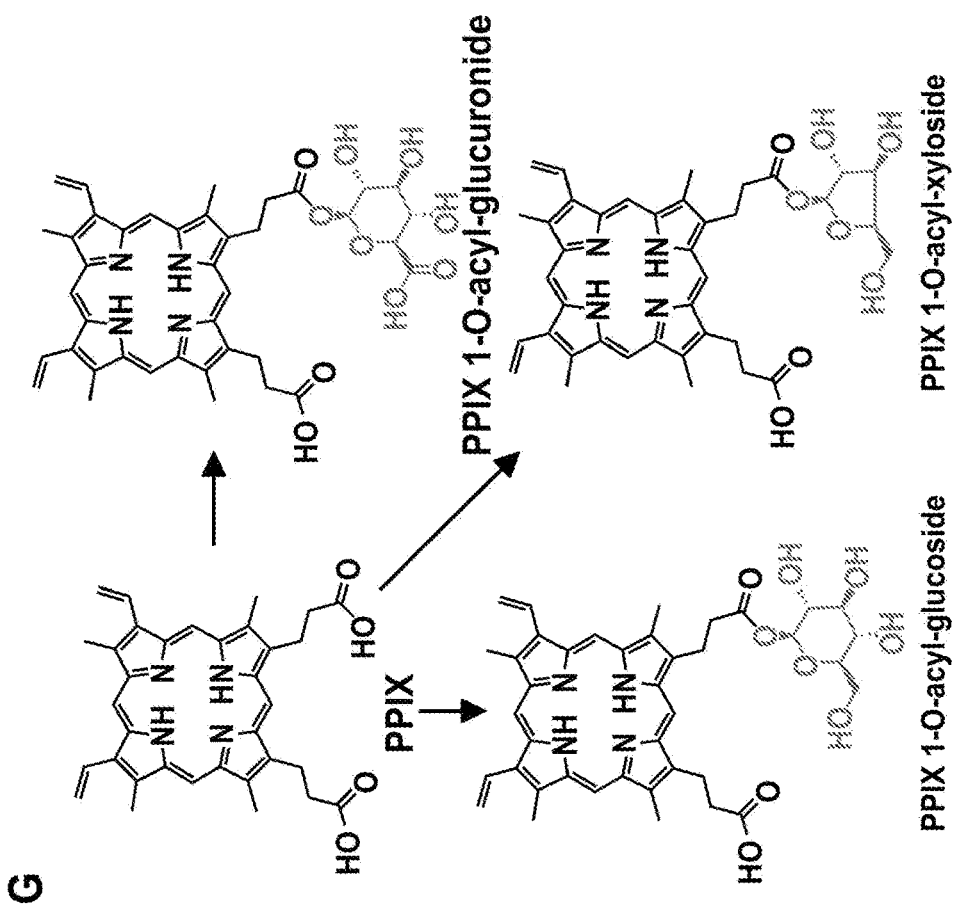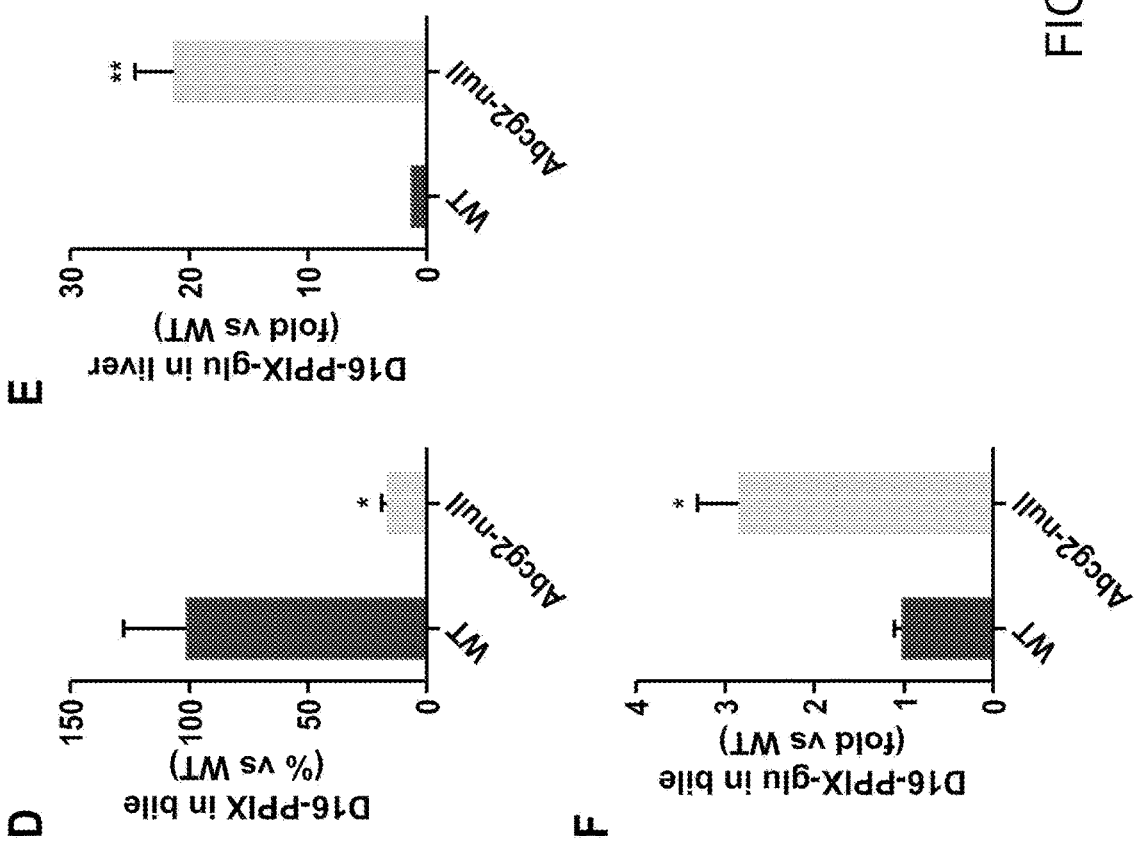
FIGS. 8D-8G

(A) EPP mice: before exposure to UV light

(B) EPP mice: after exposure to UV light

| Control | ABCG2 inhibitor (K31) |

THERAPY FOR ERYTHROPOIETIC PROTOPORPHYRIA (EPP) AND X-LINKED PROTOPORPHYRIA (XLP)

CROSS-REFERENCE TO RELATED APPLICATIONS

This application claims benefit of U.S. Provisional Application No. 62/850,061, filed May 20, 2019, which is hereby incorporated herein by reference in its entirety.

STATEMENT REGARDING FEDERALLY SPONSORED RESEARCH OR DEVELOPMENT

This invention was made with government support under Grant No. R01 DK090305 awarded by National Institute of Diabetes and Digestive and Kidney Diseases. The government has certain rights in the invention.

BACKGROUND

The porphyrias are a group of metabolic disorders of the heme biosynthesis pathway. Erythropoietic protoporphyria (EPP) is the third most common type of porphyria and the most common porphyria in childhood. EPP is caused by loss-of-function mutations of ferrochelatase (FECH), the last enzyme in the heme biosynthesis pathway that incorporates $Fe^{2+}$ with protoporphyrin IX (PPIX) to form heme. Because of FECH deficiency, PPIX is significantly accumulated in EPP patients, mainly in red blood cells (RBCs), plasma, and the liver. In addition to EPP, PPIX accumulation also occurs in X-linked protoporphyria (XLP), another type of porphyria caused by gain-of-function mutations of δ-aminolevulinate synthase 2 (ALAS2), the rate-limiting enzyme in the heme biosynthesis pathway. Furthermore, many clinically used drugs and environmental toxins, including rifampicin (RIF), isoniazid (INH), diethoxycarbonyl-1,4-dihydrocollidine (DDC), and griseofulvin (GSF), can cause PPIX accumulation in the liver through the induction of ALAS and/or inhibition of FECH. What are needed are novel treatments for EPP and XLP.

SUMMARY

Disclosed are methods and compositions related to treating Erythropoietic protoporphyria and X-linked protoporphyria.

Also described are therapeutic agents that can inhibit ABCG2. For example, provided herein are therapeutic agents defined by Formula I below

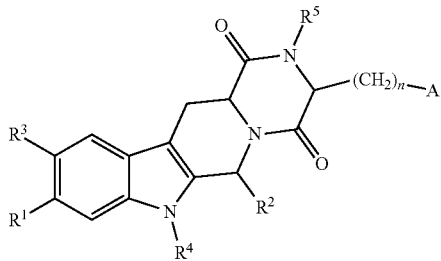

Formula I wherein
A is selected from the group consisting of

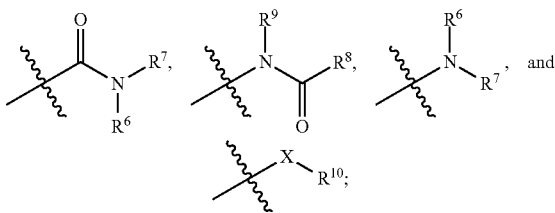

n is an integer of from 0 to 6;
X, when present, is selected from the group consisting of $CH_2$, O and S;
$R^1$ is selected from the group consisting of H, halo, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, CN, $NO_2$, $OR^a$, $SR^a$, $C(O)R^b$, $C(O)NR^cR^d$, $C(O)OR^a$, $OC(O)R^b$, $OC(O)NR^cR^d$, $NR^cR^d$, $NR^cOR^d$, $NR^cC(O)R^b$, $NR^cC(O)OR^a$, $NR^cC(O)NR^cR^d$, $C(=NR^e)R^b$, $C(=NR^e)NR^cR^d$, $NR^cC(=NR^e)NR^cR^d$, $NR^cS(O)R^b$, $NR^cS(O)_2R^b$, $NR^cS(O)_2NR^cR^d$, $S(O)R^b$, $S(O)NR^cR^d$, $S(O)_2R^b$, and $S(O)_2NR^cR^d$, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl are optionally substituted with 1, 2, 3, or 4 independently selected $R^A$ groups;
$R^2$ and $R^3$ are independently selected from the group consisting of H, halo, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, CN, $NO_2$, $OR^a$, and $SR^a$, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl are optionally substituted with 1, 2, 3, or 4 independently selected $R^A$ groups;
$R^4$ and $R^5$ are independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups;
$R^6$ and $R^7$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^6$ and $R^7$, together with the N atom to which they are attached, form a 4-9 membered heterocycloalkyl group or a 5-6 membered heteroaryl group, each optionally substituted with 1, 2, or 3 independently selected $R^A$ groups;
$R^8$ and $R^9$ are independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^8$ and $R^9$, together with the atoms to which they are attached, form a 4-9 membered heterocycloalkyl group or a 5-6 membered heteroaryl group, each optionally substituted with 1, 2, or 3 independently selected $R^A$ groups;

$R^{10}$ is selected from the group consisting of $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups;

each $R^a$, $R^b$, $R^c$, and $R^d$ is independently selected from H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl; wherein the $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl are each optionally substituted with 1, 2, 3, or 4 independently selected $R^A$ groups;

each $R^e$ is independently selected from H, CN, $C_{1-6}$ alkyl, $C_{1-6}$ haloalkyl, $C_{1-6}$ alkylthio, $C_{1-6}$ alkylsulfonyl, $C_{1-6}$ alkylcarbonyl, $C_{1-6}$ alkylaminosulfonyl, carbamyl, $C_{1-6}$ alkylcarbamyl, di($C_{1-6}$ alkyl)carbamyl, aminosulfonyl, $C_{1-6}$ alkylaminosulfonyl, and di($C_{1-6}$ alkyl)aminosulfonyl; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl) amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

Also disclosed herein are pharmaceutical compositions comprising a therapeutic agent of any preceding aspect further comprising rifampicin (RIF), isoniazid (INH), diethoxycarbonyl-1,4-dihydrocollidine (DDC), or griseofulvin (GSF).

In one aspect, disclosed herein are methods of treating, preventing, reducing, or inhibiting Erythropoietic protoporphyria (EPP) or X-linked protoporphyria (XLP) in a subject comprising administering to the subject a therapeutic agent that inhibits ABCG2 activity including, but not limited any therapeutic agent that inhibits ABCG2 of any preceding aspect.

Also disclosed herein are methods of reducing PPIX efflux from red blood cells or hepatocytes in a subject comprising administering to the subject a therapeutic agent that inhibits ABCG2 activity.

In one aspect, disclosed herein are methods of treating, preventing, reducing, or inhibiting purpura, erythema, edema, or burning sensation in the skin of a subject with EPP comprising administering to the subject a therapeutic agent that inhibits ABCG2 activity.

In one aspect, disclosed herein are methods of treating, preventing, reducing, or inhibiting liver toxicity in the skin of a subject (e.g., with EPP) comprising administering to the subject a therapeutic agent that inhibits ABCG2 activity.

In one aspect, disclosed herein are methods of treating, preventing, reducing, or inhibiting EPP, XLP, PPIX efflux from red blood cells or hepatocytes, purpura, erythema, edema, or burning sensation in the skin of any preceding aspect, wherein the therapeutic agent is an antibody, peptide, protein, RNAi, small molecule, or targeted nucleic acid integration system, such as, for example, an anti-ABCG2 antibody, a targeted nucleic acid integration system (for example, a clustered regularly interspaced short palindromic repeat (CRISPR)/CRISPR-associated 9 (Cas9) integration systems) comprising a guide RNA that targets the ABCG2 gene, or an RNAi that targets the ABCG2 gene.

In one aspect, disclosed herein are methods of treating, preventing, reducing, or inhibiting EPP, XLP, PPIX efflux from red blood cells or hepatocytes, purpura, erythema, edema, or burning sensation in the skin of any preceding aspect, wherein agent comprises a tissue specific targeting moiety, or expression vector.

In one aspect, disclosed herein are cells comprising an ABCG2 knock-out. Also disclosed herein are transgenic animals comprising the cells of any preceding aspect.

BRIEF DESCRIPTION OF THE DRAWINGS

The accompanying drawings, which are incorporated in and constitute a part of this specification, illustrate several embodiments and together with the description illustrate the disclosed compositions and methods.

FIG. 1A shows genotyping results of WT, Abcg2-null, Fech-mut, and Fech-mut/Abcg2-null mice. Fech-mut/Abcg2-null mice are deficient in both Fech and Abcg2. FIG. 1B shows the gross appearance of mice after light exposure. The back skin of mice was shaved and exposed to UV light (395-410 nm) for 30 min each day for 5 days. FIGS. 1C, 1D, 1E and 1F show histologic sections of mouse skin after exposure to UV light, H&E staining. The bar equals 40 μm.

FIG. 2A shows glutathione (GSH) levels in the skin. FIGS. 2B and 2C show mRNA expressions of tumor necrosis factor-α (TNF-α) and interleukin 1β (IL-1β) in the skin. All the data are expressed as means±S.E.M. (n=4 per group). *$P<0.05$, ***$P<0.001$, by one-way analysis of variance (ANOVA).

FIGS. 3A, 3B, 3C, and 3D show that ABCG2 modulates PPIX distributions in red blood cells (RBCs), plasma, and the skin of EPP mouse models. FIG. 3A shows PPIX levels in RBCs. FIG. 3B shows PPIX levels in serum. FIG. 3C shows PPIX levels in the skin of mice after exposure to UV light. PPIX was analyzed by UPLC-QTOFMS. All data are expressed as means±S.E.M. (n=4 per group). *P<0.05, ***P<0.001, analyzed by one-way ANOVA. FIG. 3D shows a schematic showing deficiency of ABCG2 decreases PPIX distribution to the skin and abrogates PPIX-mediated phototoxicity in EPP.

FIGS. 4A, 4B, 4C, 4D, 4E, 4F, 4G, 4H, and 4I show EPP-associated hepatotoxicity is dependent on ABCG2. WT, Abcg2-null, Fech-mut, and Fech-mut/Abcg2-null mice were kept under the same environment and sacrificed at a similar age. FIGS. 4A, 4B, and 4C show serum activities of alanine transaminase (ALT), aspartate transaminase (AST), and alkaline phosphatase (ALP). FIG. 4D shows serum total bilirubin. FIG. 4E shows PPIX in the liver, analyzed by UPLC-QTOFMS. The data are expressed as means±S.E.M. (n=4 per group). ***P<0.001, analyzed by one-way ANOVA. FIGS. 4F, 4G, 4H, and 4I show representative liver sections with H&E staining. Arrows indicate bile plugs. The bar equals 10 μm. PV, portal vein; BD, bile duct.

FIGS. 5A, 5B, and 5C show serum activities of ALT, AST, and ALP. FIG. 5D shows PPIX in the liver, analyzed by UPLC-QTOFMS. All data are expressed as means±S.E.M. (n=3-4 per group). P<0.01, *P<0.001, by one-way analysis of variance (ANOVA). FIGS. 5E and 5F show histologic analysis of liver with H&E staining. Arrows point to bile plugs. The bar equals 10 μm. PV, portal vein; BD, bile duct.

FIGS. 6A, 6B, and 6C show serum activities of ALT, AST, and ALP. FIG. 6D shows PPIX in the liver. All data are expressed as means±S.E.M. (n=3-4 per group). ***P<0.001, by one-way analysis of variance (ANOVA). FIGS. 6E and 6F show histologic analysis of liver with H&E staining. Arrows point to bile plugs. The bar equals 10 μm. PV, portal vein; BD, bile duct.

FIG. 7A shows genotyping results of hPXR and hPXR/Abcg2-null mice. FIGS. 7B and 7C show serum activities of ALT and ALP. FIG. 7D shows PPIX in the liver, analyzed by UPLC-QTOFMS. All data are expressed as means±S.E.M. (n=3-4 per group). *P<0.05, **P<0.01, by one-way analysis of variance (ANOVA). FIGS. 7E and 7F show histologic analysis of liver with H&E staining. Arrows point to bile plugs. PV, portal vein; BD, bile duct.

FIGS. 8A, 8B, 8C, 8D, 8E, 8F, 8G, 8H, and 8I show Deficiency of ABCG2 modulates PPIX distribution, metabolism, and excretion. FIGS. 8A, 8B, 8C, 8D, 8E, and 8F show metabolomic analyses in WT and Abcg2-null mice treated with deuterium-labeled aminolevulinic acid ($D_2$-ALA), a precursor of PPIX. Liver and bile samples were collected at 1 h after $D_2$-ALA treatment. FIG. 8A shows score plots of liver samples generated by principal component analysis (PCA). Each point represents a mouse sample. FIGS. 8B and 8C show S-plots of liver and bile metabolome generated by orthogonal partial least-squares discriminant analysis (OPLS-DA). Each point represents a metabolite. All metabolites were analyzed by UPLC-QTOFMS. FIG. 8D shows $D_{16}$-PPIX in the bile. FIGS. 8E and 8F show $D_{16}$-protoporphyrin-1-O-acyl-glucouronide ($D_{16}$-PPIX-glu) in the liver and bile. All the data are expressed as means±S.E.M. The data in WT were set as 100% or 1. *P<0.05, **P<0.01, by two-tailed Student's t-test. FIG. 8G shows the structures of PPIX and its conjugated metabolites with glucuronic acid, xylose, and glucose. FIG. 8H shows the percentages of PPIX and its conjugated metabolites in the bile of Fech-mut and Fech-mut/Abcg2-null mice. FIG. 8I shows a schematic showing deficiency of ABCG2 abolishes EPP-associated liver injury by modulating PPIX distribution, metabolism, and excretion.

FIG. 9A shows extracted chromatogram of $D_{16}$-PPIX-glu in the liver of Abcg2-null mice treated with $D_2$-ALA. FIG. 9B shows MS/MS of $D_{16}$-PPIX-glu. FIG. 9C shows a schematic showing the synthetic route of PPIX-glu. FIG. 9D shows MS/MS of the synthesized PPIX-glu.

FIG. 10A shows a schematic showing ABCG2 drives phototoxicity and hepatotoxicity in EPP by (1) increasing PPIX distribution to the skin and increasing photosensitivity; (2) increasing PPIX delivery to the hepatobiliary system and causing bile duct blockage and cholestatic liver injury; and (3) ABCG2-dependent bile duct blockage further increases PPIX accumulation in the body, which in turn potentiates both phototoxicity and hepatotoxicity. FIG. 10B shows a schematic showing deficiency of ABCG2 abolishes phototoxicity and hepatotoxicity in EPP by (1) decreasing PPIX distribution to the skin and decreasing photosensitivity; (2) decreasing PPIX delivery to the hepatobiliary system and relieving PPIX-mediated bile duct blockage; (3) the retained PPIX in hepatocytes can be further metabolized to conjugated products to facilitate their excretion; and (4) prevention of PPIX-mediated bile duct blockage decreases PPIX accumulation in the body and attenuates both phototoxicity and hepatotoxicity.

FIG. 12A shows the appearance of skin in EPP mice before light exposure. FIG. 12B shows the appearance of skin in EPP mice pretreated with or without K31 followed by light exposure.

DETAILED DESCRIPTION

Figures 1A, 1B, 1C, 1D, 1E, 1F:
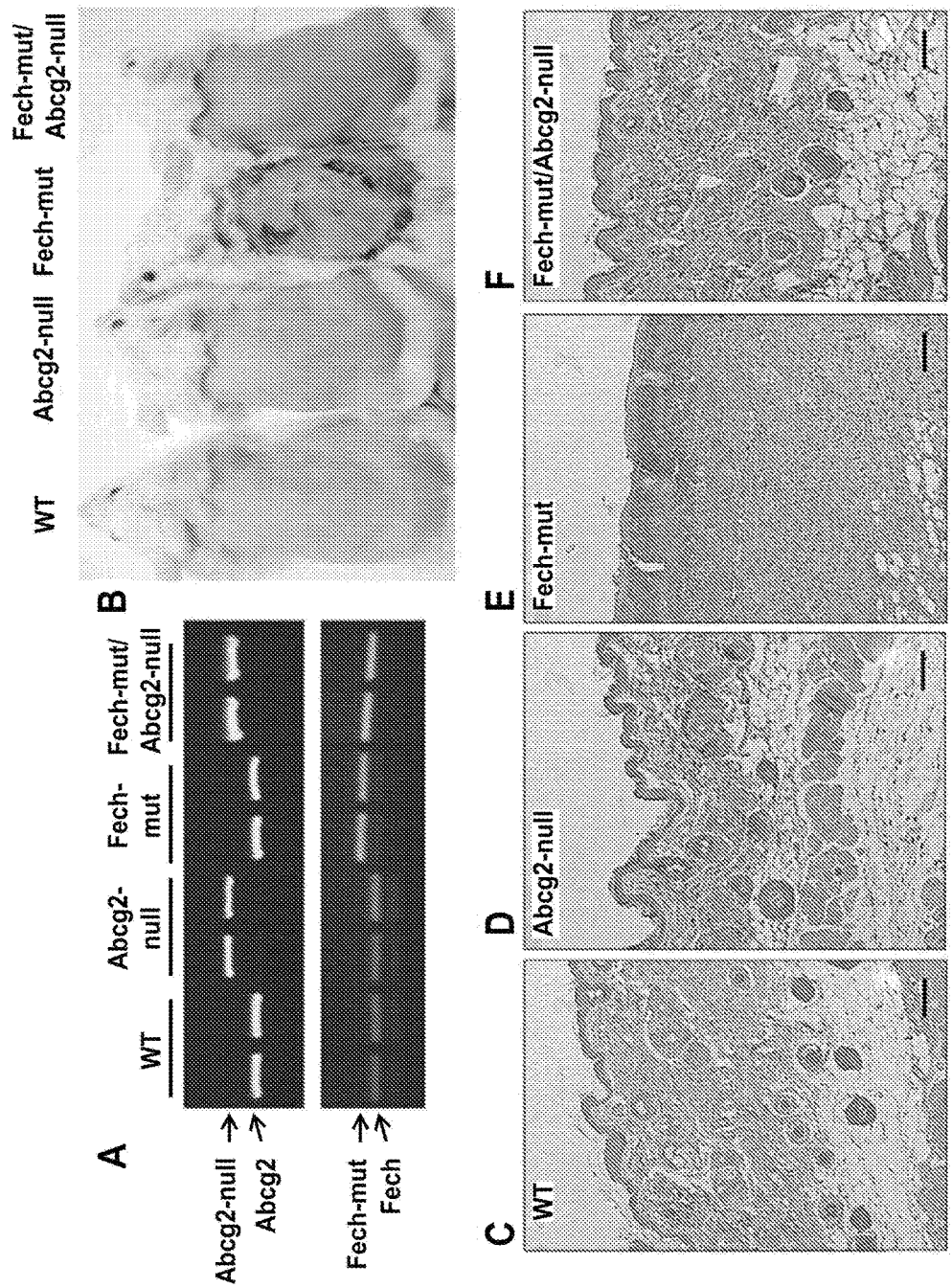
FIGS. 1A, 1B, 1C, 1D, 1E, and 1F show the role of ABCG2 in EPP-associated phototoxicity.

Before the present compounds, compositions, articles, devices, and/or methods are disclosed and described, it is to be understood that they are not limited to specific synthetic methods or specific recombinant biotechnology methods unless otherwise specified, or to particular reagents unless otherwise specified, as such may, of course, vary. It is also to be understood that the terminology used herein is for the purpose of describing particular embodiments only and is not intended to be limiting.

Definitions

As used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

In this specification and in the claims which follow, reference will be made to a number of terms which shall be defined to have the following meanings:

"Optional" or "optionally" means that the subsequently described event or circumstance may or may not occur, and that the description includes instances where said event or circumstance occurs and instances where it does not.

"Primers" are a subset of probes which are capable of supporting some type of enzymatic manipulation and which can hybridize with a target nucleic acid such that the enzymatic manipulation can occur. A primer can be made from any combination of nucleotides or nucleotide derivatives or analogs available in the art which do not interfere with the enzymatic manipulation.

"Probes" are molecules capable of interacting with a target nucleic acid, typically in a sequence specific manner, for example through hybridization. The hybridization of nucleic acids is well understood in the art and discussed herein. Typically a probe can be made from any combination of nucleotides or nucleotide derivatives or analogs available in the art.

A DNA sequence that "encodes" a particular RNA is a DNA nucleic acid sequence that is transcribed into RNA. A DNA polynucleotide may encode an RNA (mRNA) that is translated into protein (and therefore the DNA and the mRNA both encode the protein), or a DNA polynucleotide may encode an RNA that is not translated into protein (e.g. tRNA, rRNA, microRNA (miRNA), a "non-coding" RNA (ncRNA), a guide RNA, etc.).

A "protein coding sequence" or a sequence that encodes a particular protein or polypeptide, is a nucleic acid sequence that is transcribed into mRNA (in the case of DNA) and is translated (in the case of mRNA) into a polypeptide in vitro or in vivo when placed under the control of appropriate regulatory sequences. The boundaries of the coding sequence are determined by a start codon at the 5' terminus (N-terminus) and a translation stop nonsense codon at the 3' terminus (C-terminus). A coding sequence can include, but is not limited to, cDNA from prokaryotic or eukaryotic mRNA, genomic DNA sequences from prokaryotic or eukaryotic DNA, and synthetic nucleic acids. A transcription termination sequence will usually be located 3' to the coding sequence.

The term "naturally-occurring" or "unmodified" or "wild type" as used herein as applied to a nucleic acid, a polypeptide, a cell, or an organism, refers to a nucleic acid, polypeptide, cell, or organism that is found in nature. For example, a polypeptide or polynucleotide sequence that is present in an organism (including viruses) that can be isolated from a source in nature and which has not been intentionally modified by a human in the laboratory is wild type (and naturally occurring).

"Administration" to a subject includes any route of introducing or delivering to a subject a therapeutic agent. Administration can be carried out by any suitable route, including oral, topical, intravenous, subcutaneous, transcutaneous, transdermal, intramuscular, intra-joint, parenteral, intra-arteriole, intradermal, intraventricular, intracranial, intraperitoneal, intralesional, intranasal, rectal, vaginal, by inhalation, via an implanted reservoir, parenteral (e.g., subcutaneous, intravenous, intramuscular, intra-articular, intra-synovial, intrasternal, intrathecal, intraperitoneal, intrahepatic, intralesional, and intracranial injections or infusion techniques), and the like. "Concurrent administration", "administration in combination", "simultaneous administration" or "administered simultaneously" as used herein, means that the compounds are administered at the same point in time or essentially immediately following one another. In the latter case, the two compounds are administered at times sufficiently close that the results observed are indistinguishable from those achieved when the compounds are administered at the same point in time. "Systemic administration" refers to the introducing or delivering to a subject a therapeutic agent via a route which introduces or delivers the therapeutic agent to extensive areas of the subject's body (e.g. greater than 50% of the body), for example through entrance into the circulatory or lymph systems. By contrast, "local administration" refers to the introducing or delivery to a subject a therapeutic agent via a route which introduces or delivers the therapeutic agent to the area or area immediately adjacent to the point of administration and does not introduce the therapeutic agent systemically in a therapeutically significant amount. For example, locally administered agents are easily detectable in the local vicinity of the point of administration, but are undetectable or detectable at negligible amounts in distal parts of the subject's body. Administration includes self-administration and the administration by another.

"Effective amount" of a therapeutic agent refers to a sufficient amount of a therapeutic agent to provide a desired effect. The amount of agent that is "effective" will vary from subject to subject, depending on many factors such as the age and general condition of the subject, the particular agent or agents, and the like. Thus, it is not always possible to specify a quantified "effective amount." However, an appropriate "effective amount" in any subject case may be determined by one of ordinary skill in the art using routine experimentation. Also, as used herein, and unless specifically stated otherwise, an "effective amount" of a therapeutic agent can also refer to an amount covering both therapeutically effective amounts and prophylactically effective amounts. An "effective amount" of a therapeutic agent necessary to achieve a therapeutic effect may vary according to factors such as the age, sex, and weight of the subject. Dosage regimens can be adjusted to provide the optimum therapeutic response. For example, several divided doses may be administered daily or the dose may be proportionally reduced as indicated by the exigencies of the therapeutic situation.

"Pharmaceutically acceptable" component can refer to a component that is not biologically or otherwise undesirable, i.e., the component may be incorporated into a pharmaceutical formulation of the invention and administered to a subject as described herein without causing significant undesirable biological effects or interacting in a deleterious manner with any of the other components of the formulation in which it is contained. When used in reference to administration to a human, the term generally implies the component has met the required standards of toxicological and manufacturing testing or that it is included on the Inactive Ingredient Guide prepared by the U.S. Food and Drug Administration.

"Pharmaceutically acceptable carrier" (sometimes referred to as a "carrier") means a carrier or excipient that is useful in preparing a pharmaceutical or therapeutic composition that is generally safe and non-toxic, and includes a carrier that is acceptable for veterinary and/or human pharmaceutical or therapeutic use. The terms "carrier" or "pharmaceutically acceptable carrier" can include, but are not limited to, phosphate buffered saline solution, water, emulsions (such as an oil/water or water/oil emulsion) and/or various types of wetting agents. As used herein, the term "carrier" encompasses, but is not limited to, any excipient, diluent, filler, salt, buffer, stabilizer, solubilizer, lipid, stabilizer, or other material well known in the art for use in pharmaceutical formulations and as described further herein.

"Pharmacologically active" (or simply "active"), as in a "pharmacologically active" derivative or analog, can refer to a derivative or analog (e.g., a salt, ester, amide, conjugate, metabolite, isomer, fragment, etc.) having the same type of pharmacological activity as the parent compound and approximately equivalent in degree.

"Therapeutic agent" refers to any composition that has a beneficial biological effect. Beneficial biological effects include both therapeutic effects, e.g., treatment of a disorder or other undesirable physiological condition, and prophylactic effects, e.g., prevention of a disorder or other undesirable physiological condition (e.g., a non-immunogenic cancer). The terms also encompass pharmaceutically acceptable, pharmacologically active derivatives of beneficial agents specifically mentioned herein, including, but not limited to, salts, esters, amides, proagents, active metabolites, isomers, fragments, analogs, and the like. When the terms "therapeutic agent" is used, then, or when a particular agent is specifically identified, it is to be understood that the term includes the therapeutic agent per se as well as pharmaceutically acceptable, pharmacologically active salts, esters, amides, proagents, conjugates, active metabolites, isomers, fragments, analogs, etc.

"Therapeutically effective amount" or "therapeutically effective dose" of a composition (e.g. a composition comprising a therapeutic agent) refers to an amount that is effective to achieve a desired therapeutic result. In some embodiments, a desired therapeutic result is the control of type I diabetes. In some embodiments, a desired therapeutic result is the control of obesity. Therapeutically effective amounts of a given therapeutic agent will typically vary with respect to factors such as the type and severity of the disorder or disease being treated and the age, gender, and weight of the subject. The term can also refer to an amount of a therapeutic agent, or a rate of delivery of a therapeutic agent (e.g., amount over time), effective to facilitate a desired therapeutic effect, such as pain relief. The precise desired therapeutic effect will vary according to the condition to be treated, the tolerance of the subject, the therapeutic agent and/or agent formulation to be administered (e.g., the potency of the therapeutic agent, the concentration of agent in the formulation, and the like), and a variety of other factors that are appreciated by those of ordinary skill in the art. In some instances, a desired biological or medical response is achieved following administration of multiple dosages of the composition to the subject over a period of days, weeks, or years.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range which includes the endpoints, wherein n and m are integers and indicate the number of carbons. Examples include $C_{1-4}$, $C_{1-6}$, and the like.

As used herein, the term "$C_{n-m}$ alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In some embodiments, the alkyl group has 1 to 6, 1 to 4, or 1 to 3 carbon atoms.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms.

As used herein, the term "$C_{n-m}$ alkoxycarbonyl" refers to a group of formula —C(O)O— alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonyl" refers to a group of formula —C(O)— alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylcarbonylamino" refers to a group of formula —NHC(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonylamino" refers to a group of formula —NHS(O)$_2$-alkyl, wherein the alkyl group has n to m carbon atoms. In some embodiments, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n-m}$ alkylaminosulfonyl" refers to a group of formula —S(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonyl" refers to a group of formula —S(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n-m}$ alkylaminosulfonylamino" refers to a group of formula —NHS(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonylamino" refers to a group of formula —NHS(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminocarbonylamino", employed alone or in combination with other terms, refers to a group of formula —NHC(O)NH$_2$.

As used herein, the term "$C_{n-m}$ alkylaminocarbonylamino" refers to a group of formula —NHC(O)NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "$C_{n-m}$ alkylcarbamyl" refers to a group of formula —C(O)—NH(alkyl), wherein the alkyl group has n to m carbon atoms. In some embodiments, the alkyl group has 1 to 6, 1 to 4, or 1 to 3 carbon atoms.

As used herein, the term "thio" refers to a group of formula —SH.

As used herein, the term "$C_{n-m}$ alkylsulfinyl" refers to a group of formula —S(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonyl" refers to a group of formula —S(O)$_2$-alkyl, wherein the alkyl group has n to m carbon atoms. In some embodiments, the alkyl group has 1 to 6, 1 to 4, or 1 to 3 carbon atoms.

As used herein, the term "amino" refers to a group of formula —NH$_2$.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to about 20 carbon atoms, from 6 to about 15 carbon atoms, or from 6 to about 10 carbon atoms. In some embodiments, the aryl group is a substituted or unsubstituted phenyl.

As used herein, the term "carbamyl" to a group of formula —C(O)NH$_2$.

As used herein, the term "carbonyl", employed alone or in combination with other terms, refers to a —C(=O)— group, which may also be written as C(O).

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "di($C_{n-m}$-alkyl)carbamyl" refers to a group of formula —C(O)N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "halo" refers to F, Cl, Br, or I. In some embodiments, a halo is F, Cl, or Br. In some embodiments, a halo is F or Cl.

As used herein, "$C_{n-m}$ haloalkoxy" refers to a group of formula —O-haloalkyl having n to m carbon atoms. An example haloalkoxy group is OCF$_3$. In some embodiments, the haloalkoxy group is fluorinated only. In some embodiments, the alkyl group has 1 to 6, 1 to 4, or 1 to 3 carbon atoms.

As used herein, the term "$C_{n-m}$ haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3-10}$). Ring-forming carbon atoms of a cycloalkyl group can be optionally substituted by oxo or sulfido (e.g., C(O) or C(S)). Cycloalkyl groups also include cycloalkylidenes. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In some embodiments, cycloalkyl is cyclopropyl, cyclobutyl, cyclopentyl, cyclohexyl, cyclopentyl, or adamantyl. In some embodiments, the cycloalkyl has 6-10 ring-forming carbon atoms. In some embodiments, cycloalkyl is adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl has 5-10 ring atoms and 1, 2, 3 or 4 heteroatom ring members independently selected from nitrogen, sulfur and oxygen. In some embodiments, the heteroaryl has 5-6 ring atoms and 1 or 2 heteroatom ring members independently selected from nitrogen, sulfur and oxygen. In some embodiments, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl has 4-10, 4-7 or 4-6 ring atoms with 1 or 2 heteroatoms independently selected from nitrogen, oxygen, or sulfur and having one or more oxidized ring members.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone-enol pairs, amide-imidic acid pairs, lactam-lactim pairs, enamine-imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

In some embodiments, the compounds described herein can contain one or more asymmetric centers and thus occur as racemates and racemic mixtures, enantiomerically enriched mixtures, single enantiomers, individual diastereomers and diastereomeric mixtures (e.g., including (R)- and (S)-enantiomers, diastereomers, (D)-isomers, (L)-isomers, (+) (dextrorotatory) forms, (−) (levorotatory) forms, the racemic mixtures thereof, and other mixtures thereof). Additional asymmetric carbon atoms can be present in a substituent, such as an alkyl group. All such isomeric forms, as well as mixtures thereof, of these compounds are expressly included in the present description. The compounds described herein can also or further contain linkages wherein bond rotation is restricted about that particular linkage, e.g. restriction resulting from the presence of a ring or double bond (e.g., carbon-carbon bonds, carbon-nitrogen bonds such as amide bonds). Accordingly, all cis/trans and E/Z isomers and rotational isomers are expressly included in the present description. Unless otherwise mentioned or indicated, the chemical designation of a compound encompasses the mixture of all possible stereochemically isomeric forms of that compound.

Optical isomers can be obtained in pure form by standard procedures known to those skilled in the art, and include, but are not limited to, diastereomeric salt formation, kinetic resolution, and asymmetric synthesis. See, for example, Jacques, et al., Enantiomers, Racemates and Resolutions (Wiley Interscience, New York, 1981); Wilen, S. H., et al., Tetrahedron 33:2725 (1977); Eliel, E. L. Stereochemistry of Carbon Compounds (McGraw-Hill, N Y, 1962); Wilen, S. H. Tables of Resolving Agents and Optical Resolutions p. 268 (E. L. Eliel, Ed., Univ. of Notre Dame Press, Notre Dame, IN 1972), each of which is incorporated herein by reference in their entireties. It is also understood that the compounds described herein include all possible regioisomers, and mixtures thereof, which can be obtained in pure form by standard separation procedures known to those skilled in the art, and include, but are not limited to, column chromatography, thin-layer chromatography, and high-performance liquid chromatography.

Unless specifically defined, compounds provided herein can also include all isotopes of atoms occurring in the intermediates or final compounds. Isotopes include those atoms having the same atomic number but different mass numbers. Unless otherwise stated, when an atom is designated as an isotope or radioisotope (e.g., deuterium, [$^{11}$C], [$^{18}$F]), the atom is understood to comprise the isotope or radioisotope in an amount at least greater than the natural abundance of the isotope or radioisotope. For example, when an atom is designated as "D" or "deuterium", the position is understood to have deuterium at an abundance that is at least 3000 times greater than the natural abundance of deuterium, which is 0.015% (i.e., at least 45% incorporation of deuterium).

All compounds, and pharmaceutically acceptable salts thereof, can be found together with other substances such as water and solvents (e.g. hydrates and solvates) or can be isolated.

In some embodiments, preparation of compounds can involve the addition of acids or bases to affect, for example, catalysis of a desired reaction or formation of salt forms such as acid addition salts.

Example acids can be inorganic or organic acids and include, but are not limited to, strong and weak acids. Some example acids include hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Some weak acids include, but are not limited to acetic acid, propionic acid, butanoic acid, benzoic acid, tartaric acid, pentanoic acid, hexanoic acid, heptanoic acid, octanoic acid, nonanoic acid, and decanoic acid.

Example bases include lithium hydroxide, sodium hydroxide, potassium hydroxide, lithium carbonate, sodium carbonate, potassium carbonate, and sodium bicarbonate. Some example strong bases include, but are not limited to, hydroxide, alkoxides, metal amides, metal hydrides, metal dialkylamides and arylamines, wherein; alkoxides include lithium, sodium and potassium salts of methyl, ethyl and t-butyl oxides; metal amides include sodium amide, potassium amide and lithium amide; metal hydrides include sodium hydride, potassium hydride and lithium hydride; and metal dialkylamides include lithium, sodium, and potassium salts of methyl, ethyl, n-propyl, iso-propyl, n-butyl, tert-butyl, trimethylsilyl and cyclohexyl substituted amides.

The present application also includes pharmaceutically acceptable salts of the compounds described herein. As used herein, "pharmaceutically acceptable salts" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the present application include the conventional non-toxic salts of the parent compound formed, for example, from non-toxic inorganic or organic acids. The pharmaceutically acceptable salts of the present application can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, non-aqueous media like ether, ethyl acetate, alcohols (e.g., methanol, ethanol, iso-propanol, or butanol) or acetonitrile (MeCN) are preferred. Lists of suitable salts are found in *Remington's Pharmaceutical Sciences,* 17th ed., Mack Publishing Company, Easton, Pa., 1985, p. 1418 and *Journal of Pharmaceutical Science,* 66, 2 (1977). Conventional methods for preparing salt forms are described, for example, in *Handbook of Pharmaceutical Salts: Properties, Selection, and Use,* Wiley-VCH, 2002.

In some embodiments, the compounds provided herein, or salts thereof, are substantially isolated. By "substantially isolated" is meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon.

Compositions

Disclosed are the components to be used to prepare the disclosed compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made at a number of positions on the compound are discussed, specifically contemplated is each and every combination and permutation of compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the disclosed compositions. Thus, if there are a variety of additional steps that can be performed it is understood that each of these additional steps can be performed with any specific embodiment or combination of embodiments of the disclosed methods.

Accumulation of Protoporphyrin IX (PPIX) in the skin leads to phototoxicity in Erythropoietic protoporphyria (EPP) patients. PPIX is a tetrapyrrole rich in electrons. When EPP patients are exposed to light, PPIX gets excited and releases its energy to oxygen that can produce free radicals and result in skin damage. Symptoms of skin reactions include purpura, erythema, edema, and a burning sensation in the skin. Therefore, EPP patients must avoid light by decreasing outdoor activities and/or using protective clothing, which significantly decrease their social and work activities and overall quality of life. Current therapies for phototoxicity in EPP patients focus on decreasing the permeation of light into the skin and/or managing skin lesions resulting from light-excited PPIX. Beta-carotene has been used in EPP patients because of its antioxidant effects as well as its ability to increase skin pigmentation and reduce penetration of light into the skin, but is marginally effective. Afamelanotide reduces the skin symptoms in EPP patients by increasing melanin synthesis and decreasing the penetration of light into the skin. Despite these treatment options, no therapy currently addresses the underlying cause of phototoxicity in EPP, which is the accumulation of PPIX in the skin. Similarly, is the accumulation of PPIX has been shown to be the underlying cause of phototoxicity in X-linked protoporphyria (XLP).

The compositions can include a small molecule ABCG2 inhibitor. ABCG2 inhibitors are known in the art, and have been described (see, for example, Ricci et al. J Develop Drugs, 2015, 4:138, which is attached as an Appendix to this filing and incorporated herein by reference). Example ABCG2 inhibitors are also described in U.S. Patent Application Publication No. 2017/0224837 to Chang et al., which is incorporated herein by reference in its entirety.

Examples of ABCG2 inhibitors include, for example, 1,4-dihydropyridines; Artesunate; AST1306; Bifendate-chalcone hybrids; Botryllamides; Cadmium; Calcium Channel Blockers (e.g., nicardipine, nitrendipine, nimodipine, dipyridamole); Camptothecin analogs (e.g., ST1481, CHO793076); Cannabinoids; CCT129202; Chalcone; Curcumin; Cyclosporins (e.g., Cyclosporin A); Dihydropyridines and Pyridines; Dimethoxyaurones; Dofequidar Fumarate; EGFR Inhibitors: Flavones & Benzoflavones: Flavonoids; Bergamotin; 6'7'-dihydroxyberganottin; Tangeretin; Nobiletin; Hesperidin; Hesperetin; Quercetin; Kaempferol; Fumitremorgin C; Fumitremorgin C analogs (e.g., KO143); Gefitinib; GF120918: BNP1350; GW583340; GW2974; HM30181 and Derivatives Thereof; Cathelicidin (e.g. Human Cathelicidin); Imatinib Mesylate: MBL-II-141; ML753286; Lapatinib; LY294002; MBLI-87; Methoxy Stilbenes; Mithramycin A; Quercetin Derivatives; Naphthopyrones Nilotinib; Novobiocin; NP-1250 Olomnoucine II and Purvalanol A; Organic Chlorine and Pyrethroid; OSI-930; Phytoestrogens/Flavonoids; Piperazinobenzopyranones; Phenalkylaminlobenzopyranones; Ponadnib; PZ-39; Quinazolines; Quizartinib; Sildenafil; Sorafenib; Substituted Chromones; Sunitinib; Tandutinib; Tariquidar; Terpenoids; CI1033; Toremifene; XR9577; WK-X-34: WK-X-50; WK-X-84; YHO-13177; and YHO-13351.

In some embodiments, the ABCG2 inhibitor can comprise fumitremorgin C, KO143, GF120918, YHO-13351, curcumin, CID44640177, CID1434724, CID46245505, CCT129202, artesunate, ST1481, dihydropyridine, dofequidar fumarate, gefitinib, imatinib mesylate, lapatinib, WK-X-34, YHO-13177, MBL-II-141, ML753286, or any combination thereof.

In some embodiments, the ABCG2 inhibitor can comprise furnitremorgin C, KO143, GF120918, YHO-13351, curcumin, CID44640177, CID1434724, CID46245505, CCT129202, artesunate, ST1481, dihydropyridine, dofequidar fumarate, gefitinib, imatinib mesylate, lapatintib, WK-X-34 YHO-13177, or any combination thereof.

The structures of some of these ABCG2 inhibitors are provided below.

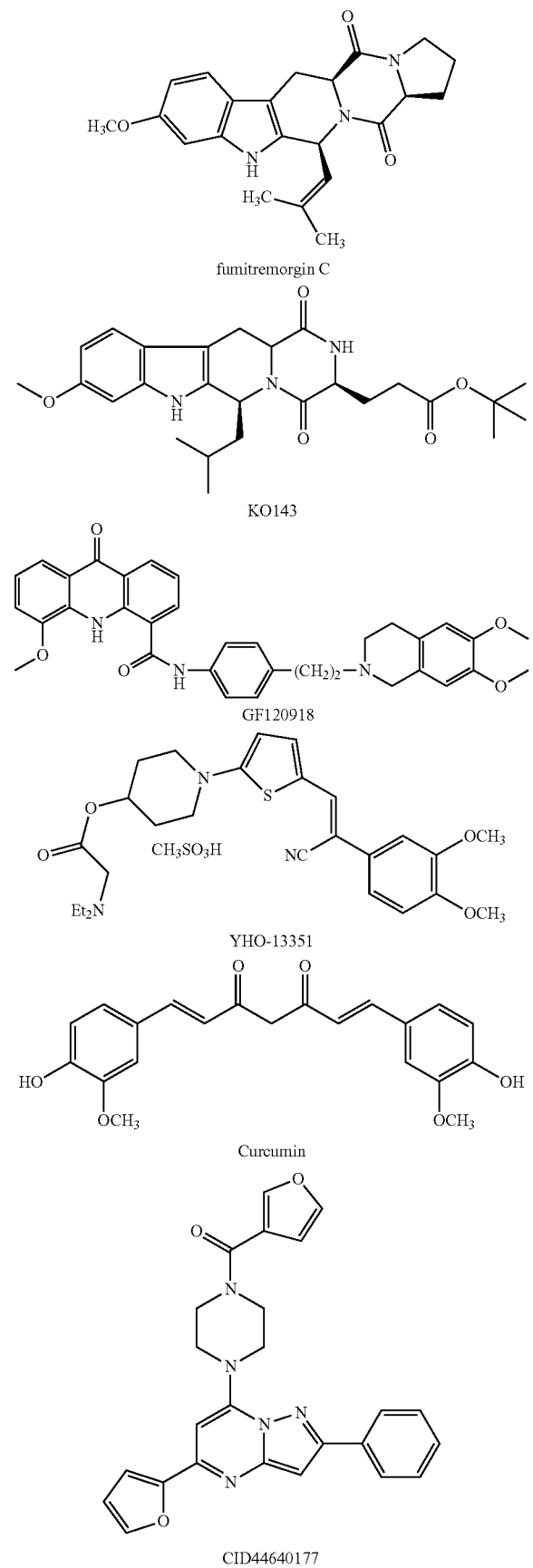

-continued
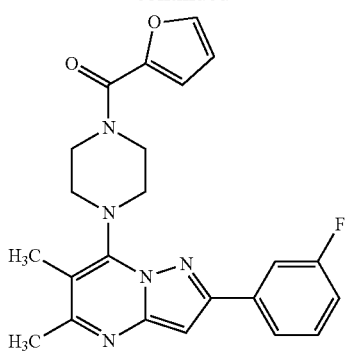
CID1434724
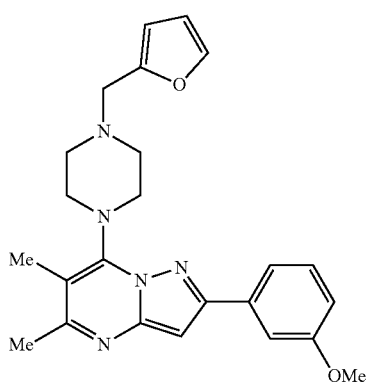
CID46245505
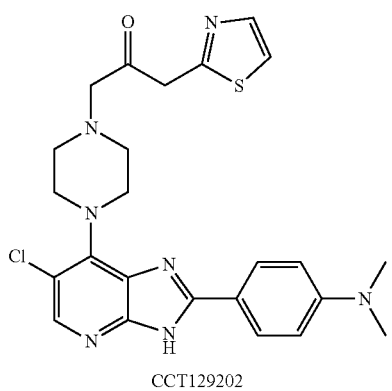
CCT129202
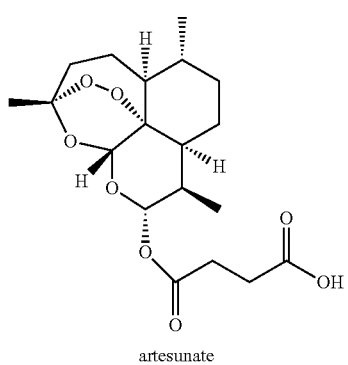
artesunate
-continued
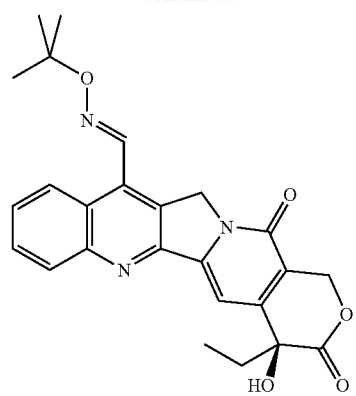
ST1481
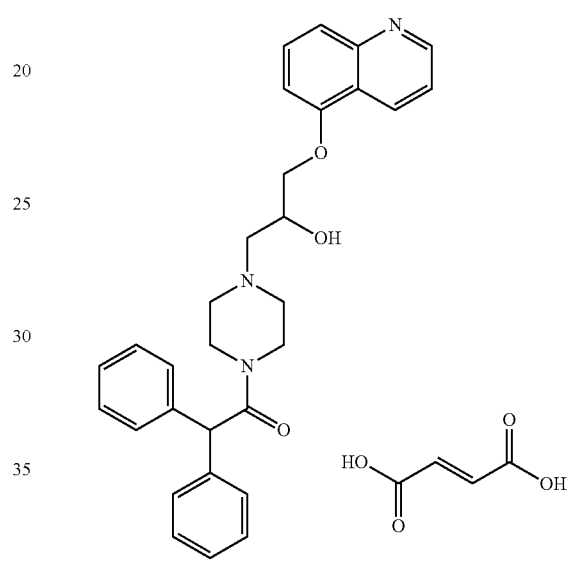
dofequidar fumarate
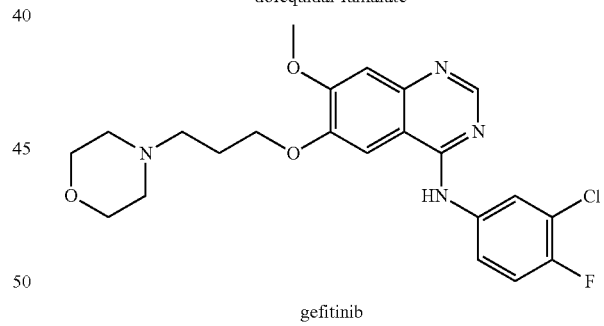
gefitinib
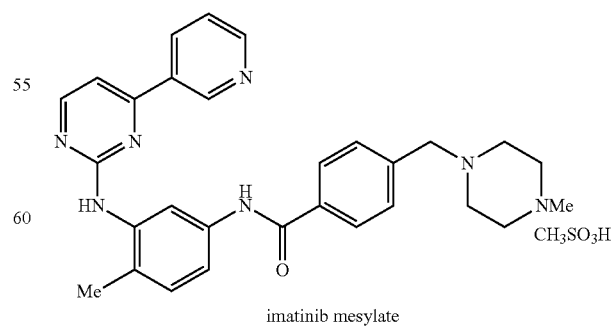
imatinib mesylate -continued

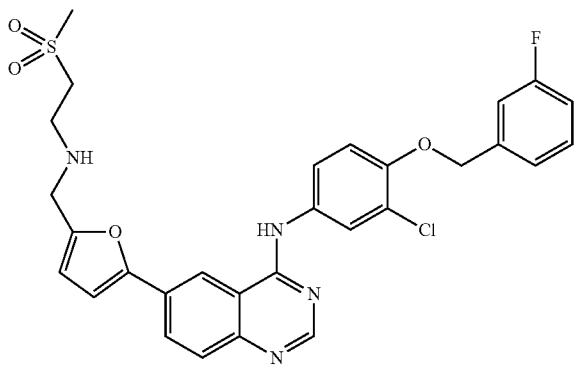

lapatinib

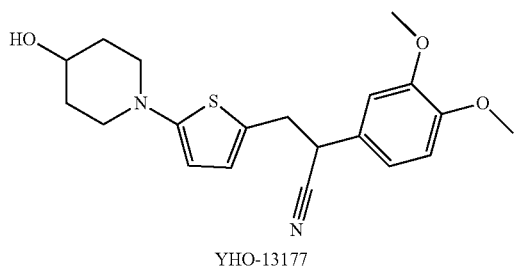

YHO-13177

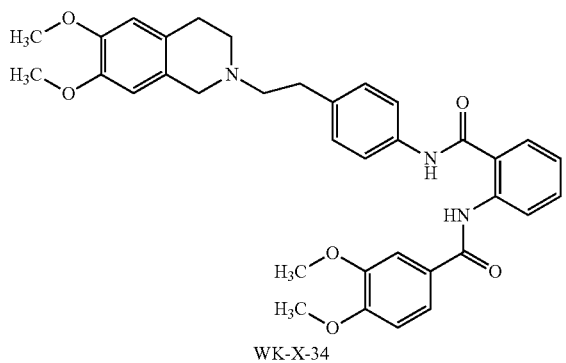

WK-X-34

In some embodiments, the ABCG2 inhibitor can be defined by Formula I below

Formula I

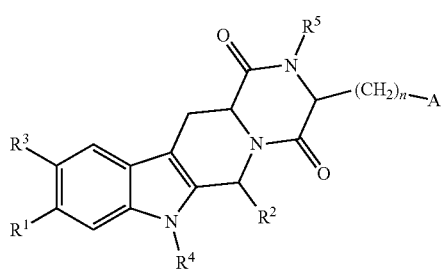

wherein
A is selected from the group consisting of

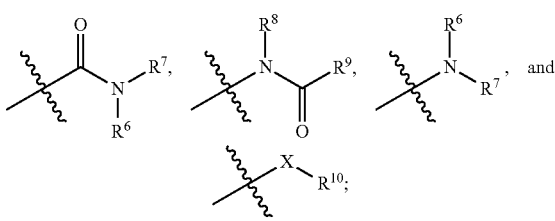

n is an integer of from 0 to 6;

X, when present, is selected from the group consisting of $CH_2$, O and S;

$R^1$ is selected from the group consisting of H, halo, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, CN, $NO_2$, $OR^a$, $SR^a$, $C(O)R^b$, $C(O)NR^cR^d$, $C(O)OR^a$, $OC(O)R^b$, $OC(O)NR^cR^d$, $NR^cR^d$, $NR^cOR^d$, $NR^cC(O)R^b$, $NR^cC(O)OR^a$, $NR^cC(O)NR^cR^d$, $C(=NR^e)R^b$, $C(=NR^e)NR^cR^d$, $NR^cC(=NR^e)NR^cR^d$, $NR^cS(O)R^b$, $NR^cS(O)_2R^b$, $NR^cS(O)_2NR^cR^d$, $S(O)R^b$, $S(O)NR^cR^d$, $S(O)_2R^b$, and $S(O)_2NR^cR^d$, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl are optionally substituted with 1, 2, 3, or 4 independently selected $R^A$ groups;

$R^2$ and $R^3$ are independently selected from the group consisting of H, halo, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, CN, $NO_2$, $OR^a$, and $SR^a$, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl are optionally substituted with 1, 2, 3, or 4 independently selected $R^A$ groups;

$R^4$ and $R^5$ are independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups;

$R^6$ and $R^7$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^6$ and $R^7$, together with the N atom to which they are attached, form a 4-9 membered heterocycloalkyl group or a 5-6 membered heteroaryl group, each optionally substituted with 1, 2, or 3 independently selected $R^A$ groups;

$R^8$ and $R^9$ are independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^4$ groups, or $R^8$ and $R^9$, together with the atoms to which they are attached, form a 4-9 membered heterocycloalkyl group or a 5-6 membered heteroaryl group, each optionally substituted with 1, 2, or 3 independently selected $R^A$ groups;

$R^{10}$ is selected from the group consisting of $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups;

each $R^a$, $R^b$, $R^c$, and $R^d$ is independently selected from H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl; wherein the $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl are each optionally substituted with 1, 2, 3, or 4 independently selected $R^A$ groups;

each $R^e$ is independently selected from H, CN, $C_{1-6}$ alkyl, $C_{1-6}$ haloalkyl, $C_{1-6}$ alkylthio, $C_{1-6}$ alkylsulfonyl, $C_{1-6}$ alkylcarbonyl, $C_{1-6}$ alkylaminosulfonyl, carbamyl, $C_{1-6}$ alkylcarbamyl, di($C_{1-6}$ alkyl)carbamyl, aminosulfonyl, $C_{1-6}$ alkylaminosulfonyl, and di($C_{1-6}$ alkyl)aminosulfonyl; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

In some embodiments, both $R^4$ and $R^5$ can be hydrogen.

In some embodiments, $R^2$ and $R^3$ are independently selected from the group consisting of H and $C_{1-6}$ alkyl, wherein said $C_{1-6}$ alkyl is optionally substituted with 1, 2, 3, or 4 independently selected $R^A$ groups.

In some embodiments, $R^2$ can be an isobutyl group.

In some embodiments, $R^3$ can be hydrogen. In other embodiments, $R^3$ can be methyl.

In some embodiments, $R^1$ can be selected from the group consisting of H, $C_{1-6}$ alkyl, $C_{2-6}$ alkenyl, $C_{2-6}$ alkynyl, $C_{1-4}$ haloalkyl, and $OR^a$; wherein said $C_{1-6}$ alkyl, $C_{2-6}$ alkenyl, $C_{2-6}$ alkynyl, and $C_{1-4}$ haloalkyl are optionally substituted with 1, 2, 3, or 4 independently selected $R^A$ groups; and wherein $R^a$, when present, is selected from H, $C_{1-6}$ alkyl, $C_{2-6}$ alkenyl, $C_{2-6}$ alkynyl, $C_{1-4}$ haloalkyl; wherein the $C_{1-6}$ alkyl, $C_{2-6}$ alkenyl, $C_{2-6}$ alkynyl, and $C_{1-4}$ haloalkyl are each optionally substituted with 1, 2, 3, or 4 independently selected $R^A$ groups.

In certain embodiments, $R^1$ can be hydrogen. In other embodiments, $R^1$ can be selected from the group consisting of hydroxy, $C_{1-4}$ alkyl, and $C_{1-4}$ alkoxy, wherein said $C_{1-4}$ alkyl and $C_{1-4}$ alkoxy are each optionally substituted with 1, 2, 3, or 4 independently selected $R^A$ groups. For example, in certain embodiments, $R^1$ can be a methoxy group.

In some embodiments, X when present, is selected from the group consisting of O and S.

The compositions can include a small molecule defined by Formula IA below

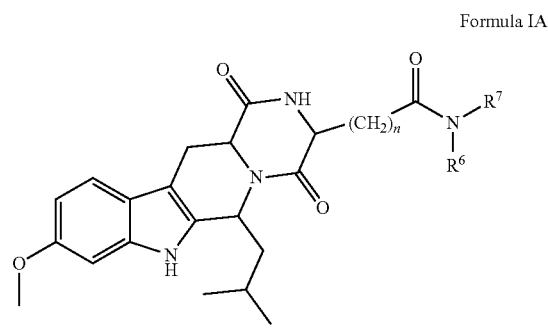

Formula IA wherein n is an integer of from 0 to 6;

$R^6$ and $R^7$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^6$ and $R^7$, together with the N atom to which they are attached, form a 4-9 membered heterocycloalkyl group or a 5-6 membered heteroaryl group, each optionally substituted with 1, 2, or 3 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

In some of these embodiments, n can be an integer of from 1 to 4.

In some of these embodiments, $R^6$ and $R^7$ are each independently selected from the group consisting of H, $C_{1-6}$ alkyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups. In other embodiments, $R^6$ and $R^7$, together with the N atom to which they are attached, form a 4-9 membered heterocycloalkyl group or a 5-6 membered heteroaryl group, each optionally substituted with 1, 2, or 3 independently selected $R^A$ groups.

The compositions can include a small molecule defined by Formula IB below

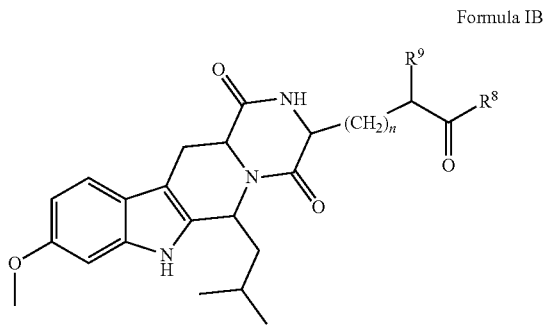

Formula IB

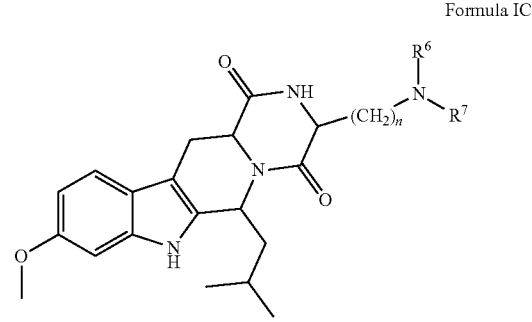

Formula IC wherein
n is an integer of from 0 to 6;

$R^8$ and $R^9$ are independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^8$ and $R^9$, together with the atoms to which they are attached, form a 4-9 membered heterocycloalkyl group or a 5-6 membered heteroaryl group, each optionally substituted with 1, 2, or 3 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

In some of these embodiments, n can be an integer of from 1 to 4.

In some embodiments, $R^9$ is hydrogen.

In some embodiments, $R^8$ can be selected from the group consisting of H, $C_{1-6}$ alkyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups. In other embodiments, $R^8$ and $R^9$, together with the atoms to which they are attached, form a 4-9 membered heterocycloalkyl group or a 5-6 membered heteroaryl group, each optionally substituted with 1, 2, or 3 independently selected $R^A$ groups.

The compositions can include a small molecule defined by Formula IC below wherein
n is an integer of from 0 to 6;

$R^6$ and $R^7$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^6$ and $R^7$, together with the N atom to which they are attached, form a 4-9 membered heterocycloalkyl group or a 5-6 membered heteroaryl group, each optionally substituted with 1, 2, or 3 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

In some of these embodiments, n can be an integer of from 1 to 4.

In some of these embodiments, $R^6$ and $R^7$ are each independently selected from the group consisting of H, $C_{1-6}$ alkyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups. In other embodiments, $R^6$ and $R^7$, together with the N atom to which they are attached, form a 4-9 membered heterocycloalkyl group or a 5-6 membered heteroaryl group, each optionally substituted with 1, 2, or 3 independently selected $R^4$ groups.

In some embodiments, the ABCG2 inhibitor can be defined by Formula ID below

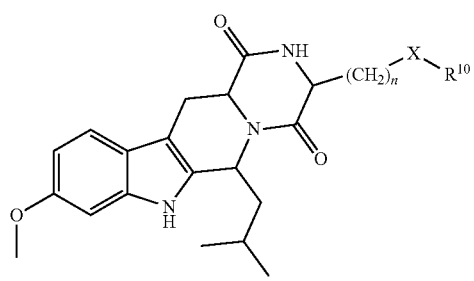

Formula ID wherein
n is an integer of from 0 to 6;
X is selected from the group consisting of $CH_2$, O and S;
$R^{10}$ is selected from the group consisting of $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^4$ groups; and
each $R^4$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO—$C_{1-3}$ alkyl, amino, $C_{1-6}$ alkylamino, di($C_{1-6}$ alkyl) amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;
or a pharmaceutically acceptable salt, ester, or N-oxide thereof.

In some embodiments, X when present, is selected from the group consisting of O and S. In some embodiments, X is O. In some embodiments, X is S.

In some embodiments, n is an integer of from 1 to 4 (e.g., n is 3).

The ABCG2 inhibitors described above (e.g., the ABCG2 inhibitors described by Formula I, Formula IA, Formula IB, Formula IC, and/or Formula ID) can also be used in conjunction with other therapeutic methods involving the inhibition of ABCG2. For example, these ABCG2 inhibitors can be used to enhance the chemotherapeutic treatment of tumor cells, reduce resistance of a cancer cell to a chemotherapeutic agent, decrease ABCG2 transporter activity in a cancer cell, or a combination thereof. Such methods are described, for example, in U.S. Pat. Nos. 9,937,217; 9,314,448; and 9,056,111, each of which is hereby incorporated herein by reference in its entirety. As such, the ABCG2 inhibitors described above (e.g., the ABCG2 inhibitors described by Formula I, Formula IA, Formula IB, Formula IC, and/or Formula ID) can be used in the methods described, for example, in U.S. Pat. Nos. 9,937,217; 9,314,448; and 9,056,111.

Pharmaceutical Carriers/Delivery of Pharmaceutical Products

As described above, the compositions can also be administered in vivo in a pharmaceutically acceptable carrier. By "pharmaceutically acceptable" is meant a material that is not biologically or otherwise undesirable, i.e., the material may be administered to a subject, along with the nucleic acid or vector, without causing any undesirable biological effects or interacting in a deleterious manner with any of the other components of the pharmaceutical composition in which it is contained. The carrier would naturally be selected to minimize any degradation of the active ingredient and to minimize any adverse side effects in the subject, as would be well known to one of skill in the art.

The compositions may be administered orally, parenterally (e.g., intravenously), by intramuscular injection, by intraperitoneal injection, transdermally, extracorporeally, topically or the like, including topical intranasal administration or administration by inhalant. As used herein, "topical intranasal administration" means delivery of the compositions into the nose and nasal passages through one or both of the nares and can comprise delivery by a spraying mechanism or droplet mechanism, or through aerosolization of the nucleic acid or vector. Administration of the compositions by inhalant can be through the nose or mouth via delivery by a spraying or droplet mechanism. Delivery can also be directly to any area of the respiratory system (e.g., lungs) via intubation. The exact amount of the compositions required will vary from subject to subject, depending on the species, age, weight and general condition of the subject, the severity of the allergic disorder being treated, the particular nucleic acid or vector used, its mode of administration and the like. Thus, it is not possible to specify an exact amount for every composition. However, an appropriate amount can be determined by one of ordinary skill in the art using only routine experimentation given the teachings herein.

Parenteral administration of the composition, if used, is generally characterized by injection. Injectables can be prepared in conventional forms, either as liquid solutions or suspensions, solid forms suitable for solution of suspension in liquid prior to injection, or as emulsions. A more recently revised approach for parenteral administration involves use of a slow release or sustained release system such that a constant dosage is maintained. See, e.g., U.S. Pat. No. 3,610,795, which is incorporated by reference herein.

The materials may be in solution, suspension (for example, incorporated into microparticles, liposomes, or cells). These may be targeted to a particular cell type via antibodies, receptors, or receptor ligands. The following references are examples of the use of this technology to target specific proteins to tumor tissue (Senter, et al., *Bioconjugate Chem.*, 2:447-451, (1991); Bagshawe, K. D., *Br. J. Cancer*, 60:275-281, (1989); Bagshawe, et al., *Br. J. Cancer*, 58:700-703, (1988); Senter, et al., *Bioconjugate Chem.*, 4:3-9, (1993); Battelli, et al., *Cancer Immunol. Immunother.*, 35:421-425, (1992); Pietersz and McKenzie, *Immunolog. Reviews*, 129:57-80, (1992); and Roffler, et al., *Biochem. Pharmacol*, 42:2062-2065, (1991)). Vehicles such as "stealth" and other antibody conjugated liposomes (including lipid mediated drug targeting to colonic carcinoma), receptor mediated targeting of DNA through cell specific ligands, lymphocyte directed tumor targeting, and highly specific therapeutic retroviral targeting of murine glioma cells in vivo. The following references are examples of the use of this technology to target specific proteins to tumor tissue (Hughes et al., *Cancer Research,* 49:6214-6220, (1989); and Litzinger and Huang, *Biochimica et Biophysica Acta,* 1104:179-187, (1992)). In general, receptors are involved in pathways of endocytosis, either constitutive or ligand induced. These receptors cluster in clathrin-coated pits, enter the cell via clathrin-coated vesicles, pass through an acidified endosome in which the receptors are sorted, and then either recycle to the cell surface, become stored intracellularly, or are degraded in lysosomes. The internalization pathways serve a variety of functions, such as nutrient uptake, removal of activated proteins, clearance of macromolecules, opportunistic entry of viruses and toxins, dissociation and degradation of ligand, and receptor-level regulation. Many receptors follow more than one intracellular pathway, depending on the cell type, receptor concentration, type of ligand, ligand valency, and ligand concentration. Molecular and cellular mechanisms of receptor-mediated endocytosis has been reviewed (Brown and Greene, *DNA and Cell Biology* 10:6, 399-409 (1991)).

Pharmaceutically Acceptable Carriers

The compositions, including antibodies, can be used therapeutically in combination with a pharmaceutically acceptable carrier.

Suitable carriers and their formulations are described in *Remington: The Science and Practice of Pharmacy* (19th ed.) ed. A. R. Gennaro, Mack Publishing Company, Easton, PA 1995. Typically, an appropriate amount of a pharmaceutically-acceptable salt is used in the formulation to render the formulation isotonic. Examples of the pharmaceutically-acceptable carrier include, but are not limited to, saline, Ringer's solution and dextrose solution. The pH of the solution is preferably from about 5 to about 8, and more preferably from about 7 to about 7.5. Further carriers include sustained release preparations such as semipermeable matrices of solid hydrophobic polymers containing the antibody, which matrices are in the form of shaped articles, e.g., films, liposomes or microparticles. It will be apparent to those persons skilled in the art that certain carriers may be more preferable depending upon, for instance, the route of administration and concentration of composition being administered.

Pharmaceutical carriers are known to those skilled in the art. These most typically would be standard carriers for administration of drugs to humans, including solutions such as sterile water, saline, and buffered solutions at physiological pH. The compositions can be administered intramuscularly or subcutaneously. Other compounds will be administered according to standard procedures used by those skilled in the art.

Pharmaceutical compositions may include carriers, thickeners, diluents, buffers, preservatives, surface active agents and the like in addition to the molecule of choice. Pharmaceutical compositions may also include one or more active ingredients such as antimicrobial agents, antiinflammatory agents, anesthetics, and the like.

The pharmaceutical composition may be administered in a number of ways depending on whether local or systemic treatment is desired, and on the area to be treated. Administration may be topically (including ophthalmically, vaginally, rectally, intranasally), orally, by inhalation, or parenterally, for example by intravenous drip, subcutaneous, intraperitoneal or intramuscular injection. The disclosed antibodies can be administered intravenously, intraperitoneally, intramuscularly, subcutaneously, intracavity, or transdermally.

Preparations for parenteral administration include sterile aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

Formulations for topical administration may include ointments, lotions, creams, gels, drops, suppositories, sprays, liquids and powders. Conventional pharmaceutical carriers, aqueous, powder or oily bases, thickeners and the like may be necessary or desirable.

Compositions for oral administration include powders or granules, suspensions or solutions in water or non-aqueous media, capsules, sachets, or tablets. Thickeners, flavorings, diluents, emulsifiers, dispersing aids or binders may be desirable.

Some of the compositions may potentially be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines and substituted ethanolamines.

Therapeutic Uses

Effective dosages and schedules for administering the compositions may be determined empirically, and making such determinations is within the skill in the art. The dosage ranges for the administration of the compositions are those large enough to produce the desired effect in which the symptoms of the disorder are effected. The dosage should not be so large as to cause adverse side effects, such as unwanted cross-reactions, anaphylactic reactions, and the like. Generally, the dosage will vary with the age, condition, sex and extent of the disease in the patient, route of administration, or whether other drugs are included in the regimen, and can be determined by one of skill in the art. The dosage can be adjusted by the individual physician in the event of any counterindications. Dosage can vary, and can be administered in one or more dose administrations daily, for one or several days. Guidance can be found in the literature for appropriate dosages for given classes of pharmaceutical products. For example, guidance in selecting appropriate doses for antibodies can be found in the literature on therapeutic uses of antibodies, e.g., *Handbook of Monoclonal Antibodies,* Ferrone et al., eds., Noges Publications, Park Ridge, N.J., (1985) ch. 22 and pp. 303-357; Smith et al., *Antibodies in Human Diagnosis and Therapy,* Haber et al., eds., Raven Press, New York (1977) pp. 365-389. A typical daily dosage of the antibody used alone might range from about 1 µg/kg to up to 100 mg/kg of body weight or more per day, depending on the factors mentioned above.

Methods of Treating Erythropoietic Protoporphyria (EPP) or X-Linked Protoporphyria (XLP)

It is understood and herein contemplated that efflux of PPIX and as a consequence PPIX accumulation (i.e., the causative issue with phototoxicity) is dependent on activity of ABCG2. Thus, the disclosed inhibitors of ABCG2 can prevent the PPIX efflux and as a consequence treat EPP and XLP as well as any symptom associate therewith. Thus, in one aspect, disclosed herein are methods of treating, preventing, reducing, or inhibiting Erythropoietic protoporphyria (EPP) or X-linked protoporphyria (XLP) in a subject comprising administering to the subject an any therapeutic agent disclosed herein that inhibits ABCG2 activity.

As used herein, "treat," "treating," "treatment," and grammatical variations thereof as used herein, include the administration of a composition with the intent or purpose of partially or completely preventing, delaying, curing, healing, alleviating, relieving, altering, remedying, ameliorating, improving, stabilizing, mitigating, and/or reducing the intensity or frequency of one or more a diseases or conditions, a symptom of a disease or condition, or an underlying cause of a disease or condition. Treatments according to the invention may be applied preventively, prophylactically, palliatively or remedially. Prophylactic treatments are administered to a subject prior to onset (e.g., before obvious signs of EPP or XLP), during early onset (e.g., upon initial signs and symptoms of EPP or XLP), or after an established development of cancer. Prophylactic administration can occur for day(s) to years prior to the manifestation of symptoms of an infection.

A "decrease" can refer to any change that results in a smaller gene expression, protein production, amount of a symptom, disease, composition, condition, or activity. A substance is also understood to decrease the genetic output of a gene when the genetic output of the gene product with the substance is less relative to the output of the gene product without the substance. Also, for example, a decrease can be a change in the symptoms of a disorder such that the symptoms are less than previously observed. A decrease can be any individual, median, or average decrease in a condition, symptom, activity, composition in a statistically significant amount. Thus, the decrease can be a 1, 2, 3, 4, 5, 6, 7, 8, 9, 10, 15, 20, 25, 30, 35, 40, 45, 50, 55, 60, 65, 70, 75, 80, 85, 90, 95, or 100% decrease so long as the decrease is statistically significant.

"Inhibit," "inhibiting," and "inhibition" mean to decrease an activity, response, condition, disease, or other biological parameter. This can include but is not limited to the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

The terms "prevent," "preventing," "prevention," and grammatical variations thereof as used herein, refer to a method of partially or completely delaying or precluding the onset or recurrence of a disease and/or one or more of its attendant symptoms or barring a subject from acquiring or reacquiring a disease or reducing a subject's risk of acquiring or reacquiring a disease or one or more of its attendant symptoms.

It is understood and herein contemplated that treatment, inhibition, prevention, or reducing EPP or XLP not necessarily related to a curative result, but can include an alleviation of the symptoms of EPP or XLP including, but not limited to phototoxicity, purpura, erythema, edema, or burning sensation in the skin. Thus, in one aspect, disclosed herein are methods of treating, preventing, reducing, or inhibiting phototoxicity, purpura, erythema, edema, or burning sensation in the skin in a subject comprising administering to a subject any of the therapeutic agents disclosed herein that inhibits ABCG2 activity.

In addition to the skin, the liver is another target organ of PPIX toxicity in EPP, and its severity is impacted by the polymorphisms of genes regulating porphyrin homeostasis. The liver is responsible for PPIX elimination from the body through the hepatobiliary system. Because PPIX is highly hydrophobic, excessive PPIX in bile precipitates and leads to bile duct blockage and cholestatic liver injury. This is a vicious cycle because PPIX-mediated bile duct blockage can result in further accumulation of PPIX in the body. Multiple pharmacological approaches have been attempted to manage EPP-associated liver injury in the clinic, but none of them produced satisfactory outcomes. Liver transplant is effective, but the re-occurrence of EPP-associated liver injury is common because the liver transplant cannot restore FECH function in the bone marrow and cannot prevent PPIX accumulation in the liver. It is understood and herein contemplated that the disclosed ABCG2 inhibitor therapeutic agents disclosed herein can be used for the management of EPP-associated liver injury. Accordingly, in one aspect, disclosed herein are methods of reducing PPIX efflux from hepatocytes in a subject comprising administering to the subject a therapeutic agent that inhibits ABCG2 activity.

In EPP, PPIX is predominantly produced in the bone marrow and delivered to other organs, including the skin and liver, through the circulatory system by RBCs and plasma. Efflux of PPIX from RBCs into plasma is dependent on the transporter ABCG2, and exposure to light promotes PPIX efflux. These data led to the hypothesis that suppression of ABCG2 will decrease the disposition of PPIX to the skin and mitigate phototoxicity in EPP. In addition, retention of PPIX in hepatocytes and Kupffer cells, but not in the biliary system, attenuates EPP-associated hepatotoxicity. ABCG2 is expressed in hepatocytes and is responsible for PPIX efflux from hepatocytes into the biliary system. Therefore, it was also hypothesized that suppression of ABCG2 will decrease the amount of PPIX in the biliary system and attenuate PPIX-mediated bile duct blockage and cholestatic liver injury. Accordingly, in one aspect, disclosed herein are methods of reducing PPIX efflux from red blood cells in a subject comprising administering to the subject a therapeutic agent that inhibits ABCG2 activity.

In one aspect, the therapeutic agent for use in the disclosed methods can include, but is not limited to any of the small molecules disclosed herein as well as GF120918, MBL-II-141, ML753286, as well as, antibodies, oligonucleotides, small interfering RNA, RNAi, peptides, proteins, and/or targeted nucleic acid integration system. Reducing or inhibiting expression of a gene or the protein it encodes can have unforeseen consequences especially if induced gene expression or activity is inhibited at an off-target side. In one aspect, the ABCG2 inhibitory therapeutic agent can be engineered to be expressed in specific tissues (for example, under control of a tissue specific promoter), expressed under inducible conditions (a cre-lox, flp, or tet inducible promoter system that is activated by administration of a triggering compound such as tetracycline or where the ABCG2 knock out locus is transfected with a construct that expresses Cre in order to remove the floxed cassette), or target specific tissues (such as, for example, a tissue specific diabody or bivalent construct). In one aspect, the therapeutic agent can be a targeted nucleic acid integration system such as, for example a CRISPR/Cas9 system where the guide RNA (gRNA) targets the ABCG2 gene.

Antibodies

As noted above, the disclosed methods of treatment can comprise the administration of an anti-ABCG2 antibody, including immunotoxins, variants, or fragments thereof.

Antibodies Generally

The term "antibodies" is used herein in a broad sense and includes both polyclonal and monoclonal antibodies. In addition to intact immunoglobulin molecules, also included in the term "antibodies" are fragments or polymers of those immunoglobulin molecules, and human or humanized versions of immunoglobulin molecules or fragments thereof and including bivalent single-chain antibodies, diabodies, triabodies, tetrabodies, as long as they are chosen for their ability to interact with ABCG2 such that ABCG2 is inhibited from allowing PPIX efflux. The antibodies can be tested for their desired activity using the in vitro assays described herein, or by analogous methods, after which their in vivo therapeutic and/or prophylactic activities are tested according to known clinical testing methods. There are five major classes of human immunoglobulins: IgA, IgD, IgE, IgG and IgM, and several of these may be further divided into subclasses (isotypes), e.g., IgG-1, IgG-2, IgG-3, and IgG-4; IgA-1 and IgA-2. One skilled in the art would recognize the comparable classes for mouse. The heavy chain constant domains that correspond to the different classes of immunoglobulins are called alpha, delta, epsilon, gamma, and mu, respectively.

The term "monoclonal antibody" as used herein refers to an antibody obtained from a substantially homogeneous population of antibodies, i.e., the individual antibodies within the population are identical except for possible naturally occurring mutations that may be present in a small subset of the antibody molecules. The monoclonal antibodies herein specifically include "chimeric" antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, as long as they exhibit the desired antagonistic activity.

The disclosed monoclonal antibodies can be made using any procedure which produces mono clonal antibodies. For example, disclosed monoclonal antibodies can be prepared using hybridoma methods, such as those described by Kohler and Milstein, *Nature*, 256:495 (1975). In a hybridoma method, a mouse or other appropriate host animal is typically immunized with an immunizing agent to elicit lymphocytes that produce or are capable of producing antibodies that will specifically bind to the immunizing agent. Alternatively, the lymphocytes may be immunized in vitro.

The monoclonal antibodies may also be made by recombinant DNA methods. DNA encoding the disclosed monoclonal antibodies can be readily isolated and sequenced using conventional procedures (e.g., by using oligonucleotide probes that are capable of binding specifically to genes encoding the heavy and light chains of murine antibodies). Libraries of antibodies or active antibody fragments can also be generated and screened using phage display techniques, e.g., as described in U.S. Pat. No. 5,804,440 to Burton et al. and U.S. Pat. No. 6,096,441 to Barbas et al.

In vitro methods are also suitable for preparing monovalent antibodies. Digestion of antibodies to produce fragments thereof, particularly, Fab fragments, can be accomplished using routine techniques known in the art. For instance, digestion can be performed using papain. Examples of papain digestion are described in WO 94/29348 published Dec. 22, 1994 and U.S. Pat. No. 4,342,566. Papain digestion of antibodies typically produces two identical antigen binding fragments, called Fab fragments, each with a single antigen binding site, and a residual Fc fragment. Pepsin treatment yields a fragment that has two antigen combining sites and is still capable of cross-linking antigen.

In one aspect, the ABCG2 binding antibodies can comprise fragments of antibodies. As used herein, the term "antibody or fragments thereof" encompasses chimeric antibodies and hybrid antibodies, with dual or multiple antigen or epitope specificities, and fragments, such as F(ab')2, Fab', Fab, Fv, scFv, and the like, including hybrid fragments. Thus, fragments of the antibodies that retain the ability to bind their specific antigens are provided. For example, fragments of antibodies which maintain ABCG2 binding activity are included within the meaning of the term "antibody or fragment thereof." Such antibodies and fragments can be made by techniques known in the art and can be screened for specificity and activity according to the methods set forth in the Examples and in general methods for producing antibodies and screening antibodies for specificity and activity (See Harlow and Lane. *Antibodies, A Laboratory Manual*. Cold Spring Harbor Publications, New York, (1988)).

Also included within the meaning of "antibody or fragments thereof" are conjugates of antibody fragments and antigen binding proteins (single chain antibodies). Conjugated antibodies or fragments refer to antibodies or fragments that are operatively linked or otherwise physically or functionally associated with an effector moiety or tag, such as inter alia a toxic substance, a radioactive substance, fluorescent substance, a liposome, or an enzyme as described, for example, in U.S. Pat. No. 4,704,692, the contents of which are hereby incorporated by reference.

The fragments, whether attached to other sequences or not, can also include insertions, deletions, substitutions, or other selected modifications of particular regions or specific amino acids residues, provided the activity of the antibody or antibody fragment is not significantly altered or impaired compared to the non-modified antibody or antibody fragment. These modifications can provide for some additional property, such as to remove/add amino acids capable of disulfide bonding, to increase its bio-longevity, to alter its secretory characteristics, etc. In any case, the antibody or antibody fragment must possess a bioactive property, such as specific binding to its cognate antigen. Functional or active regions of the antibody or antibody fragment may be identified by mutagenesis of a specific region of the protein, followed by expression and testing of the expressed polypeptide. Such methods are readily apparent to a skilled practitioner in the art and can include site-specific mutagenesis of the nucleic acid encoding the antibody or antibody fragment. (Zoller, M. J. *Curr. Opin. Biotechnol.* 3:348-354, 1992).

As used herein, the term "antibody" or "antibodies" can also refer to a human antibody and/or a humanized antibody. Many non-human antibodies (e.g., those derived from mice, rats, or rabbits) are naturally antigenic in humans, and thus can give rise to undesirable immune responses when administered to humans. Therefore, the use of human or humanized antibodies in the methods serves to lessen the chance that an antibody administered to a human will evoke an undesirable immune response.

Human Antibodies

The disclosed human antibodies can be prepared using any technique. The disclosed human antibodies can also be obtained from transgenic animals. For example, transgenic, mutant mice that are capable of producing a full repertoire of human antibodies, in response to immunization, have been described (see, e.g., Jakobovits et al., *Proc. Natl. Acad. Sci. USA*, 90:2551-255 (1993); Jakobovits et al., *Nature*, 362:255-258 (1993); Bruggermann et al., *Year in Immunol.*, 7:33 (1993)). Specifically, the homozygous deletion of the antibody heavy chain joining region (J(H)) gene in these chimeric and germ-line mutant mice results in complete inhibition of endogenous antibody production, and the successful transfer of the human germ-line antibody gene array into such germ-line mutant mice results in the production of human antibodies upon antigen challenge. Antibodies having the desired activity are selected using Env-CD4-coreceptor complexes as described herein.

Humanized Antibodies

Antibody humanization techniques generally involve the use of recombinant DNA technology to manipulate the DNA sequence encoding one or more polypeptide chains of an antibody molecule. Accordingly, a humanized form of a non-human antibody (or a fragment thereof) is a chimeric antibody or antibody chain (or a fragment thereof, such as an sFv, Fv, Fab, Fab', F(ab')2, or other antigen-binding portion of an antibody) which contains a portion of an antigen binding site from a non-human (donor) antibody integrated into the framework of a human (recipient) antibody.

To generate a humanized antibody, residues from one or more complementarity determining regions (CDRs) of a recipient (human) antibody molecule are replaced by residues from one or more CDRs of a donor (non-human) antibody molecule that is known to have desired antigen binding characteristics (e.g., a certain level of specificity and affinity for the target antigen). In some instances, Fv framework (FR) residues of the human antibody are replaced by corresponding non-human residues. Humanized antibodies may also contain residues which are found neither in the recipient antibody nor in the imported CDR or framework sequences. Generally, a humanized antibody has one or more amino acid residues introduced into it from a source which is non-human. In practice, humanized antibodies are typically human antibodies in which some CDR residues and possibly some FR residues are substituted by residues from analogous sites in rodent antibodies. Humanized antibodies generally contain at least a portion of an antibody constant region (Fc), typically that of a human antibody (Jones et al., *Nature*, 321:522-525 (1986), Reichmann et al., *Nature*, 332:323-327 (1988), and Presta, *Curr. Opin. Struct. Biol.*, 2:593-596 (1992)).

Methods for humanizing non-human antibodies are well known in the art. For example, humanized antibodies can be generated according to the methods of Winter and co-workers (Jones et al., *Nature*, 321:522-525 (1986), Riechmann et al., *Nature*, 332:323-327 (1988), Verhoeyen et al., *Science*, 239:1534-1536 (1988)), by substituting rodent CDRs or CDR sequences for the corresponding sequences of a human antibody. Methods that can be used to produce humanized antibodies are also described in U.S. Pat. No. 4,816,567 (Cabilly et al.), U.S. Pat. No. 5,565,332 (Hoogenboom et al.), U.S. Pat. No. 5,721,367 (Kay et al.), U.S. Pat. No. 5,837,243 (Deo et al.), U.S. Pat. No. 5,939,598 (Kucherlapati et al.), U.S. Pat. No. 6,130,364 (Jakobovits et al.), and U.S. Pat. No. 6,180,377 (Morgan et al.).

Administration of Antibodies

Administration of the antibodies can be done as disclosed herein. Nucleic acid approaches for antibody delivery also exist. The anti-ABCG2 antibodies and antibody fragments can also be administered to patients or subjects as a nucleic acid preparation (e.g., DNA or RNA) that encodes the antibody or antibody fragment, such that the patient's or subject's own cells take up the nucleic acid and produce and secrete the encoded antibody or antibody fragment. The delivery of the nucleic acid can be by any means, as disclosed herein, for example.

Transgenic Cells and Animals

An EPP mouse model was developed by a loss-of-function mutation of FECH (Fech-mut). To test the hypotheses, an EPP mouse model with ABCG2 deficiency (Fech-mut/Abcg2-null) was generated. It was found that deficiency of ABCG2 abolished both phototoxicity and hepatotoxicity in EPP mice. It was also found that Abcg2-null mice failed to develop PPIX accumulation and hepatotoxicity when these mice were challenged with liver-specific porphyrinogenic chemicals. The metabolomic analysis revealed that deficiency of ABCG2 protects against PPIX-mediated phototoxicity and hepatotoxicity by modulating PPIX distribution, metabolism, and excretion.

In various embodiments, provided herein are genetically modified cells and non-human animals (e.g., rodents, e.g., mice or rats) that comprise in their genome (e.g., in their germline genome) a nucleic acid sequence encoding a null mutation of the ABCG2 gene. In some aspects the modified cells can further comprise a mutation of the FECH gene.

The term "cell" includes any cell that is suitable for expressing a recombinant nucleic acid sequence. Cells include those of prokaryotes and eukaryotes (single-cell or multiple-cell), bacterial cells (e.g., strains of *E. coli, Bacillus* spp., *Streptomyces* spp., etc.), mycobacteria cells, fungal cells, yeast cells (e.g., *S. cerevisiae, S. pombe, P. pastoris, P. methanolica*, etc.), plant cells, insect cells (e.g., SF-9, SF-21, baculovirus-infected insect cells, *Trichoplusia ni*, etc.), non-human animal cells, human cells, or cell fusions such as, for example, hybridomas or quadromas. In some embodiments, the cell is a human, monkey, ape, hamster, rat, or mouse cell. In some embodiments, the cell is eukaryotic and is selected from the following cells: CHO (e.g., CHO K1, DXB-11 CHO, Veggie-CHO), COS (e.g., COS-7), retinal cell, Vero, CV1, kidney (e.g., HEK293, 293 EBNA, MSR 293, MDCK, HaK, BHK), HeLa, HepG2, W138, MRC 5, Colo205, HB 8065, HL-60, (e.g., BHK21), Jurkat, Daudi, A431 (epidermal), CV-1, U937, 3T3, L cell, C127 cell, SP2/0, NS-0, MMT 060562, Sertoli cell, BRL 3A cell, HT1080 cell, myeloma cell, tumor cell, and a cell line derived from an aforementioned cell. In some embodiments, the cell comprises one or more viral genes, e.g. a retinal cell that expresses a viral gene (e.g., a PER.C6™ cell). In some embodiments, the cell is an ES cell.

In one aspect, the transgenic cell can comprise a selection cassette that provides for inducible and/or tissue specific expression. A selection cassette is a nucleotide sequence inserted into a targeting construct to facilitate selection of cells (e.g., bacterial cells, ES cells) that have integrated the construct of interest. A number of suitable selection cassettes are known in the art (Neo, Hyg, Pur, CM, SPEC, etc.). In addition, a selection cassette may be flanked by recombination sites, which allow deletion of the selection cassette upon treatment with recombinase enzymes. Commonly used recombination sites are loxP and Frt, recognized by Cre and Flp enzymes, respectively, but others are known in the art. A selection cassette may be located anywhere in the construct outside the coding region. In one embodiment, the selection cassette is inserted upstream of human ABCG2 null inserted sequence.

The selection cassette used in this method may be removed by methods known by the skilled artisan. For example, ES cells bearing the ABCG2 knock out locus may be transfected with a construct that expresses Cre in order to remove the floxed cassette. The selection cassette may optionally be removed by breeding to mice that express Cre recombinase. Optionally, the selection cassette is retained in the mice.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Genetic Deficiency of the Transporter ABCG2 Protects Against Phototoxicity and Hepatotoxicity in Erythropoietic Protoporphyria (EPP)

Results
Deficiency of ABCG2 Protects Against EPP-Associated Phototoxicity

Figures 2A, 2B, 2C:
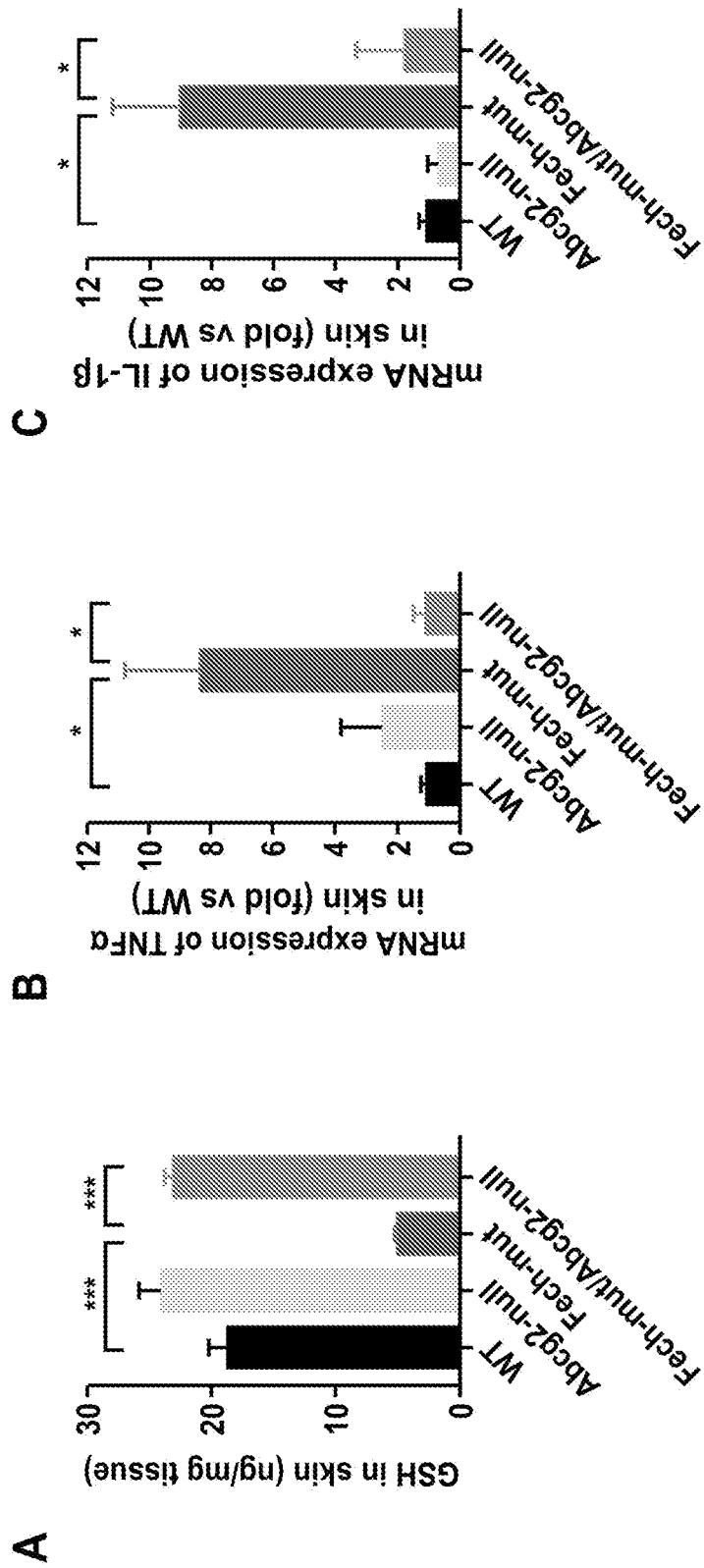
FIGS. 2A, 2B, and 2C show oxidative stress and inflammation in the skin of WT, Abcg2-null, Fech-mut, and Fech-mut/Abcg2-null mice after the exposure to UV light. The back skin of mice was shaved and exposed to UV light (395-410 nm) for 30 min each day for 5 days.

Fech-mut/Abcg2-null mice have a loss-of-function mutation of FECH and are deficient in ABCG2 (FIG. 1A). When Fech-mut/Abcg2-null and Fech-mut mice were exposed to light with the excitation wavelength of PPIX, Fech-mut mice developed severe skin lesions, but these phenotypes were absent in Fech-mut/Abcg2-null mice (FIGS. 1B, 1C, 1D, 1E, and 1F). In addition, oxidative stress and inflammation were observed in the skin of Fech-mut mice after light exposure, but not in Fech-mut/Abcg2-null mice (FIGS. 2A, 2B, and 2C). These data indicate that ABCG2 is the key mediator of EPP-associated phototoxicity. Next the PPIX levels in RBCs, serum, and the skin of EPP mouse models were analyzed. It was found that deficiency of ABCG2 significantly increased PPIX levels in RBCs but decreased PPIX levels in serum and skin (FIGS. 3A, 3B, and 3C), indicating that dysfunction of ABCG2 blocks PPIX efflux from RBCs into plasma and therefore decreases PPIX distribution to the skin and attenuates PPIX-mediated phototoxicity (FIG. 3D).

Deficiency of ABCG2 Protects Against EPP-Associated Hepatotoxicity

Figures 4A, 4B, 4C, 4D:
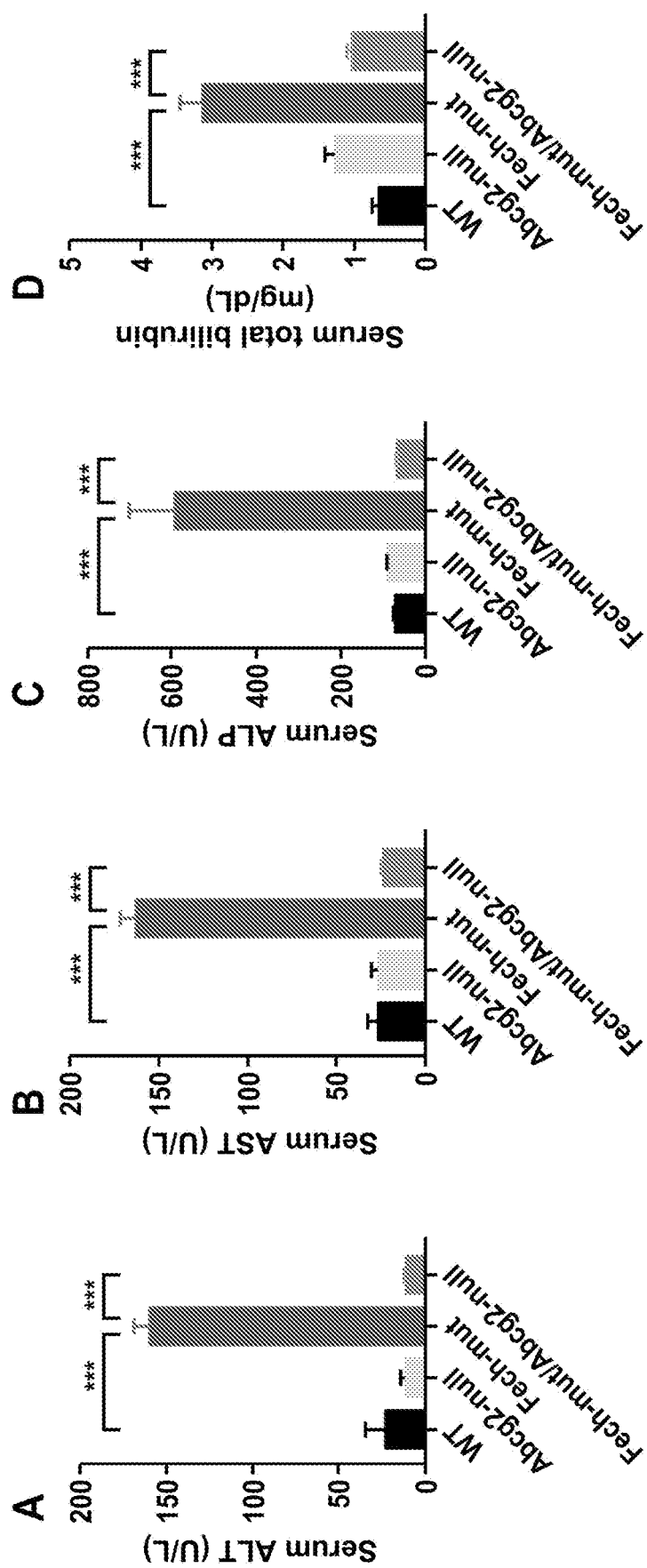

As expected, liver damage occurred in Fech-mut mice, but it was abolished in Fech-mut/Abcg2-null mice (FIG. 4). Compared to Fech-mut mice, the serum biomarkers of liver damage were significantly decreased in Fech-mut/Abcg2-null mice (FIGS. 4A, 4B, 4C, and 4D). The decrease of serum alkaline phosphatase (ALP) activity in Fech-mut/Abcg2-null mice (FIG. 4C) indicates the attenuation of cholestatic liver damage. Indeed, PPIX levels in the liver of Fech-mut/Abcg2-null mice were significantly decreased (FIG. 4E), and PPIX-mediated bile duct blockage and bile plugs were not observed in the liver of Fech-mut/Abcg2-null mice (FIGS. 4F, 4G, 4H, and 4I). Liver fibrosis is a critical step in the progression of EPP-associated liver damage. Liver fibrosis was observed in Fech-mut mice, but it was abrogated in Fech-mut/Abcg2-null mice (as measured by total fibrosis area and mRNA expression). The data showed that Fech-mut mice had expression levels of collagen 1a1 and 1a2 greater than 15-fold that of Fech-mut/Abcg2-null mice. Additionally, the fibrotic area in Fech-mut/Abcg2-null mice was at background levels compared to Fech-mut mice which had an 8-fold increase in fibrosis area. These data indicate that ABCG2 plays an essential role in the development of EPP-associated liver injury.

Figures 5A, 5B, 5C, 5D, 5E, 5F:
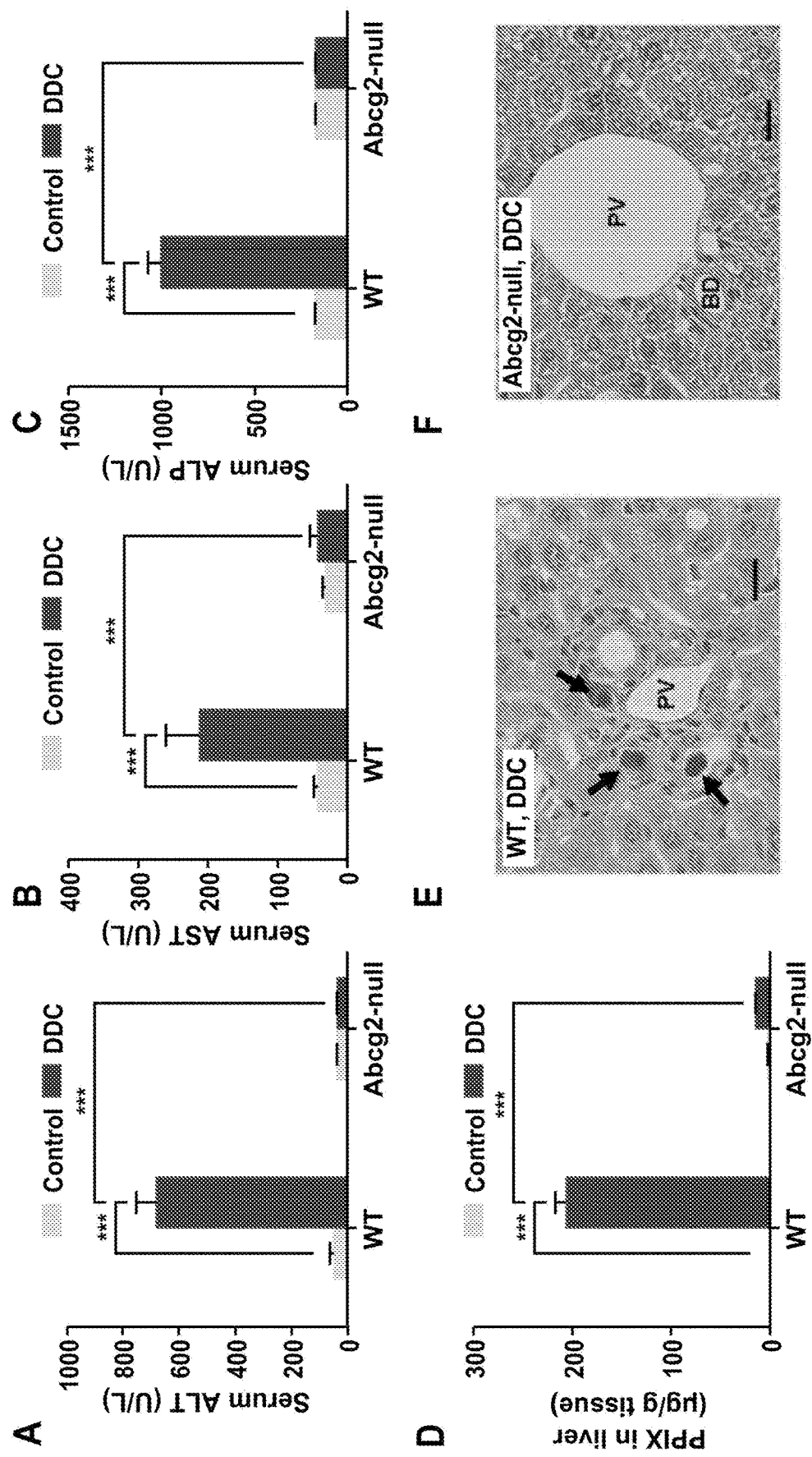
FIGS. 5A, 5B, 5C, 5D, 5E, and 5F show deficiency of ABCG2 abolishes DDC-induced PPIX accumulation and hepatotoxicity. WT and Abcg2-null mice were treated with DDC, a porphyrinogenic agent, for 14 days.
Figures 6A, 6B, 6C, 6D, 6E, 6F:
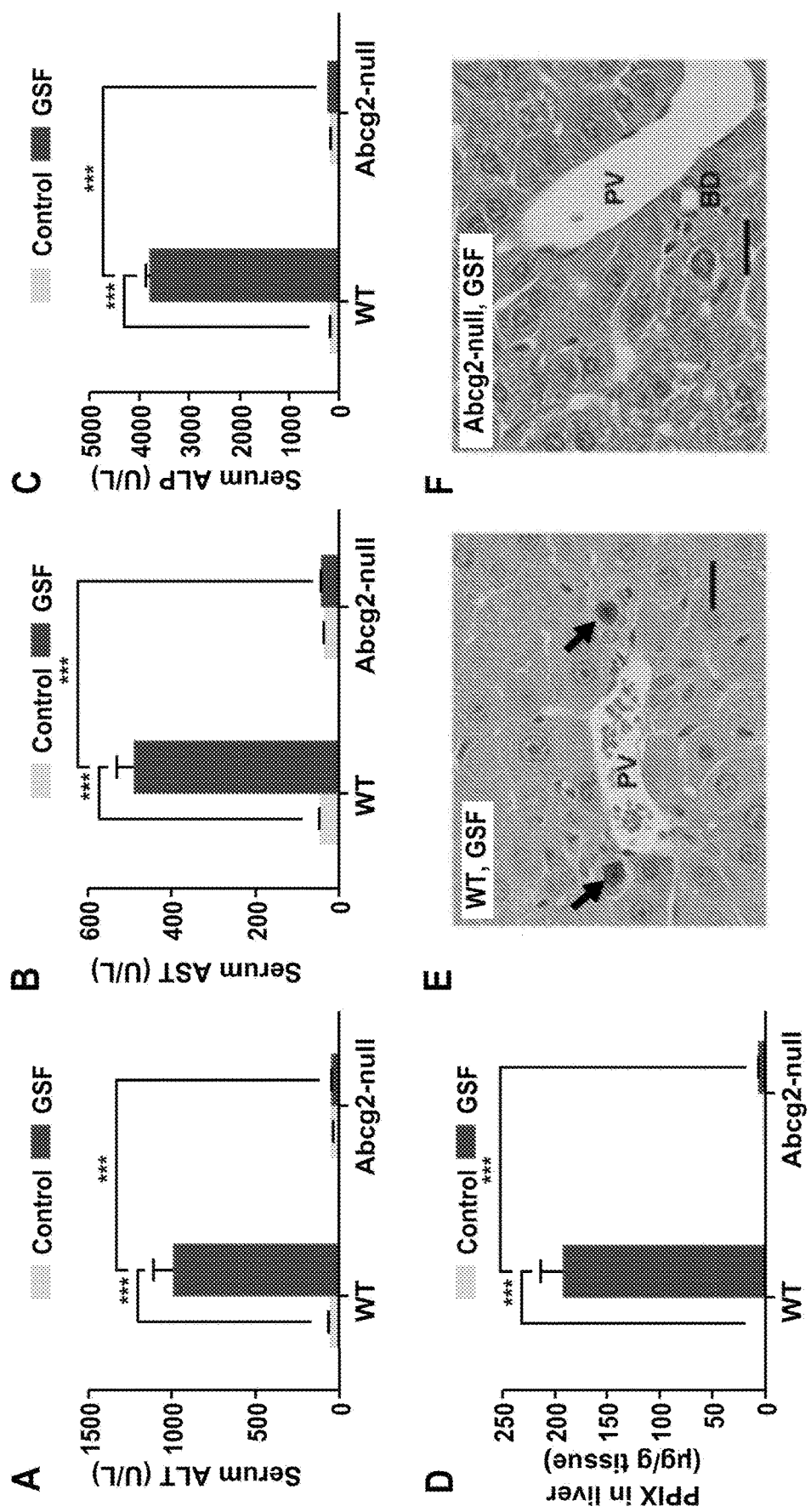
FIGS. 6A, 6B, 6C, 6D, 6E, and 6F show deficiency of ABCG2 abolishes griseofulvin (GSF)-induced PPIX accumulation and hepatotoxicity. WT and Abcg2-null mice were treated with GSF, a porphyrinogenic agent, for 14 days.
Figures 7A, 7B, 7C, 7D, 7E, 7F:
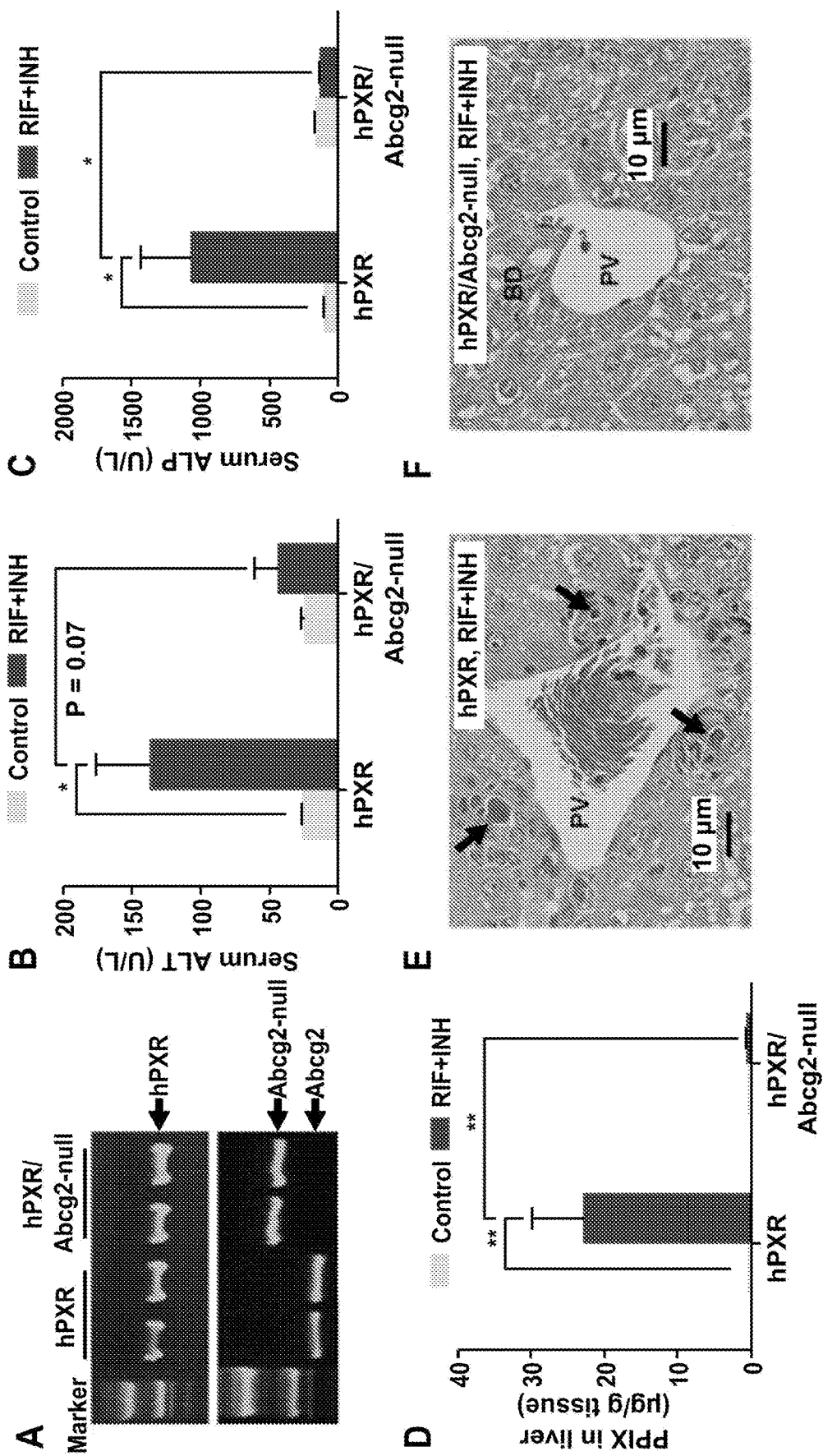
FIGS. 7A, 7B, 7C, 7D, 7E, and 7F show PPIX accumulation and hepatotoxicity in hPXR and hPXR/Abcg2-null mice treated with rifampicin (RIF) and isoniazid (INH).

Deficiency of ABCG2 Protects Against Chemically-Induced PPIX Accumulation and Hepatotoxicity To further determine the role of ABCG2 in PPIX-mediated liver injury, wild-type (WT) and Abcg2-null mice were challenged with DDC or GSF, two model chemicals that cause hepatic PPIX accumulation and hepatotoxicity. While DDC and GSF caused liver damage, PPIX accumulation, and bile plugs in WT mice, these effects failed to occur in Abcg2-null mice (FIG. 5 and FIG. 6). In addition to DDC and GSF, the previous study found that co-treatment with RIF and INH resulted in hepatic PPIX accumulation and hepatotoxicity through the human pregnane X receptor (hPXR)-mediated pathway. To determine the role of ABCG2 in RIF and INH-induced PPIX accumulation and hepatotoxicity, an hPXR mouse model deficient in ABCG2 (hPXR/Abcg2-null) was generated (FIG. 7A). Hepatotoxicity along with PPIX accumulation and bile plugs were observed in hPXR mice co-treated with RIF and INH, but these phenotypes were abolished in hPXR/Abcg2-null mice (FIGS. 7B, 7C, 7D, 7E, and 7F). These data further confirmed that PPIX-mediated liver injury is dependent on ABCG2.

Deficiency of ABCG2 Modulates PPIX Distribution, Metabolism, and Excretion

Figure 8A:
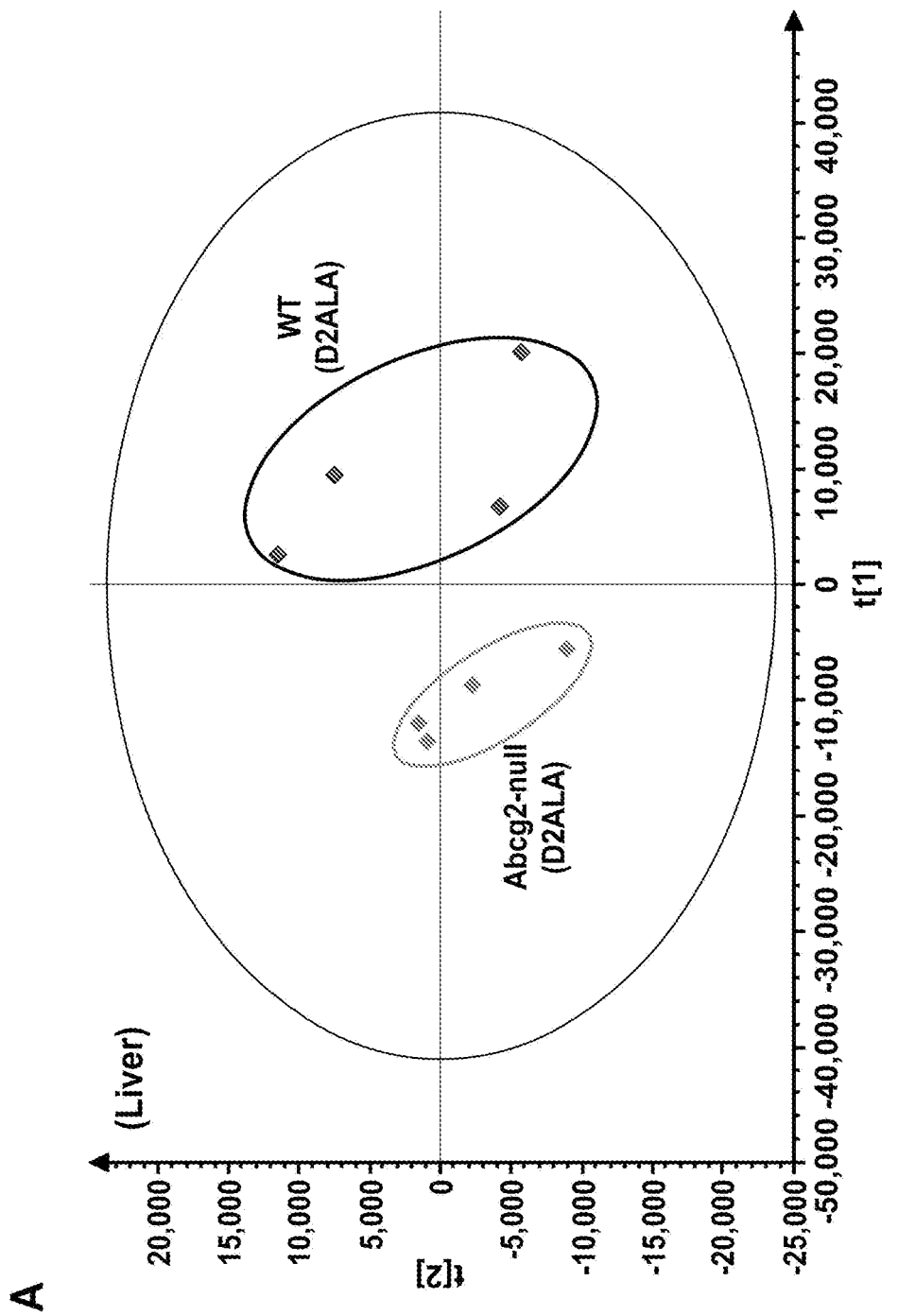
Figures 8B, 8C:
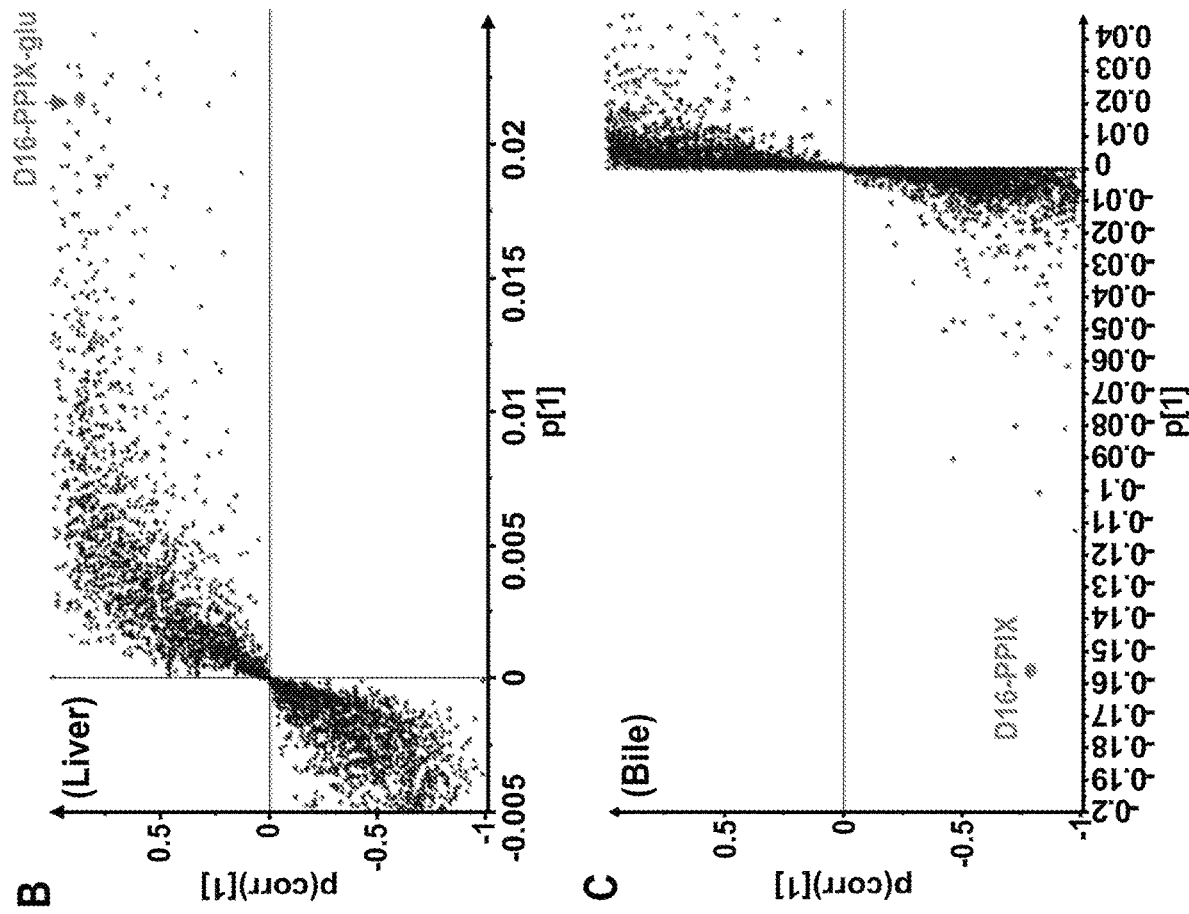
Figure 8H:
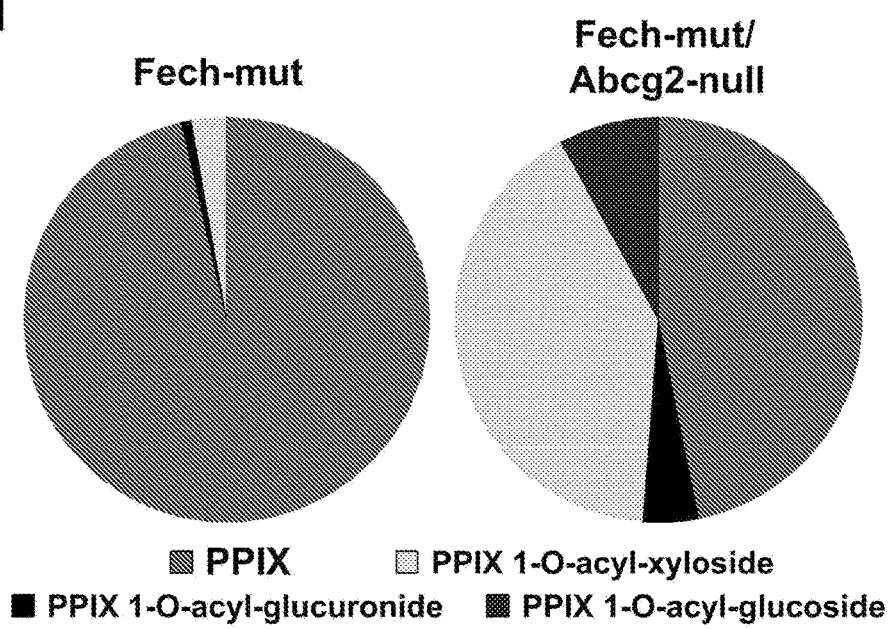
Figure 8I:
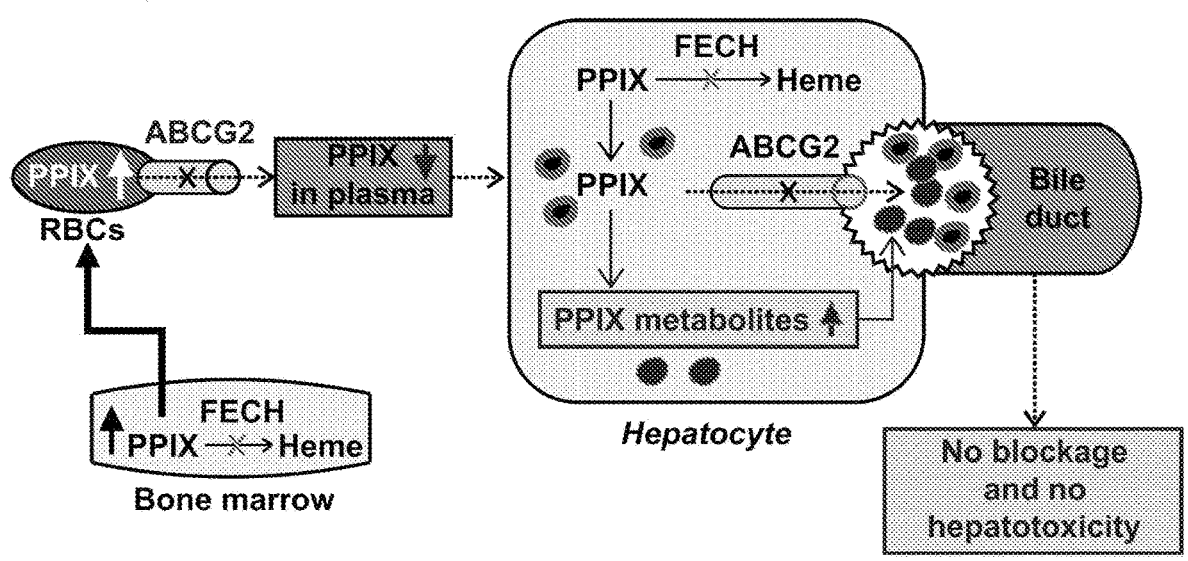
Figure 9A:
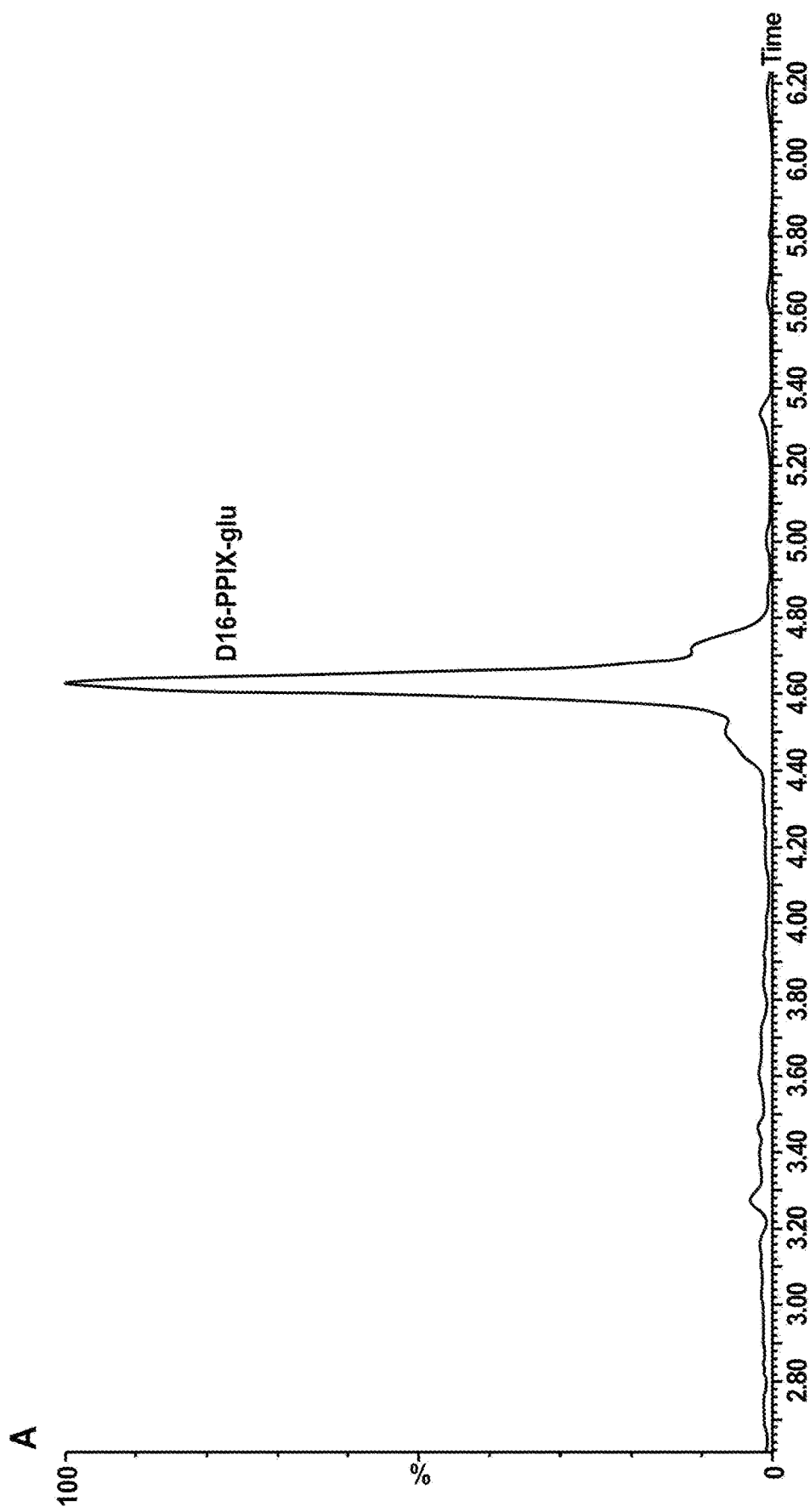
FIGS. 9A, 9B, 9C, and 9D show identification of protoporphyrin-1-O-acyl-glucouronide (PPIX-glu).
Figure 9B:
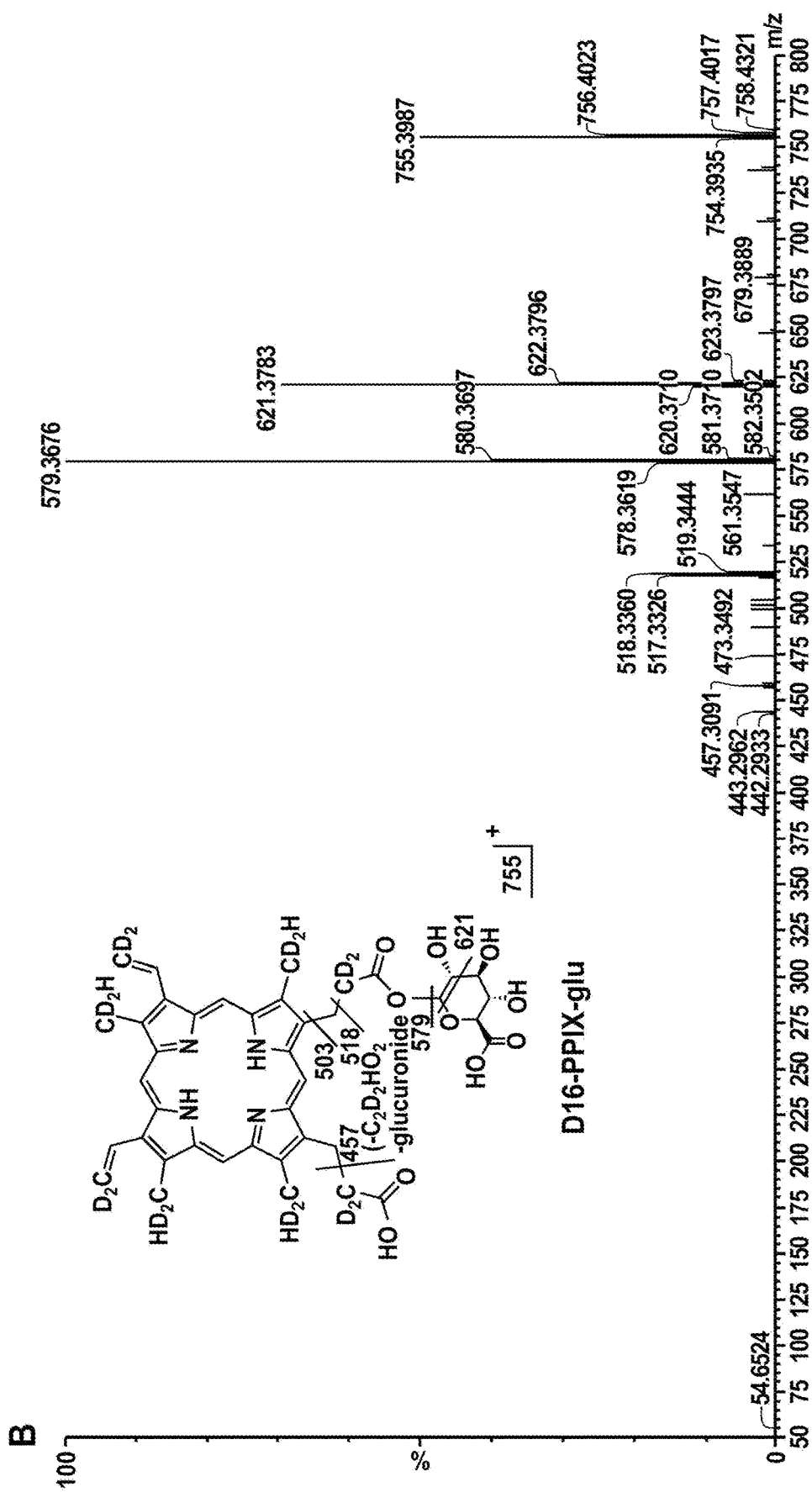
Figure 9C:
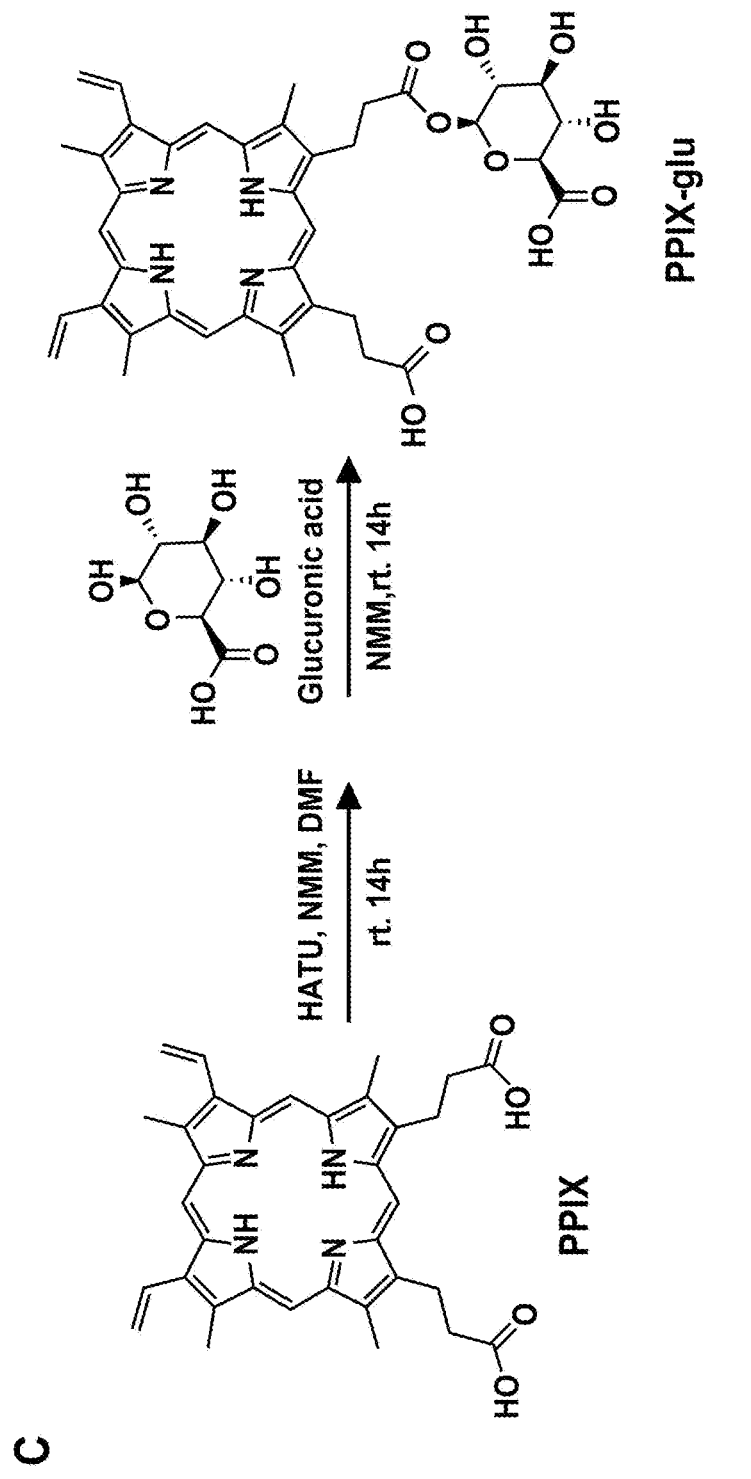
Figure 9D:
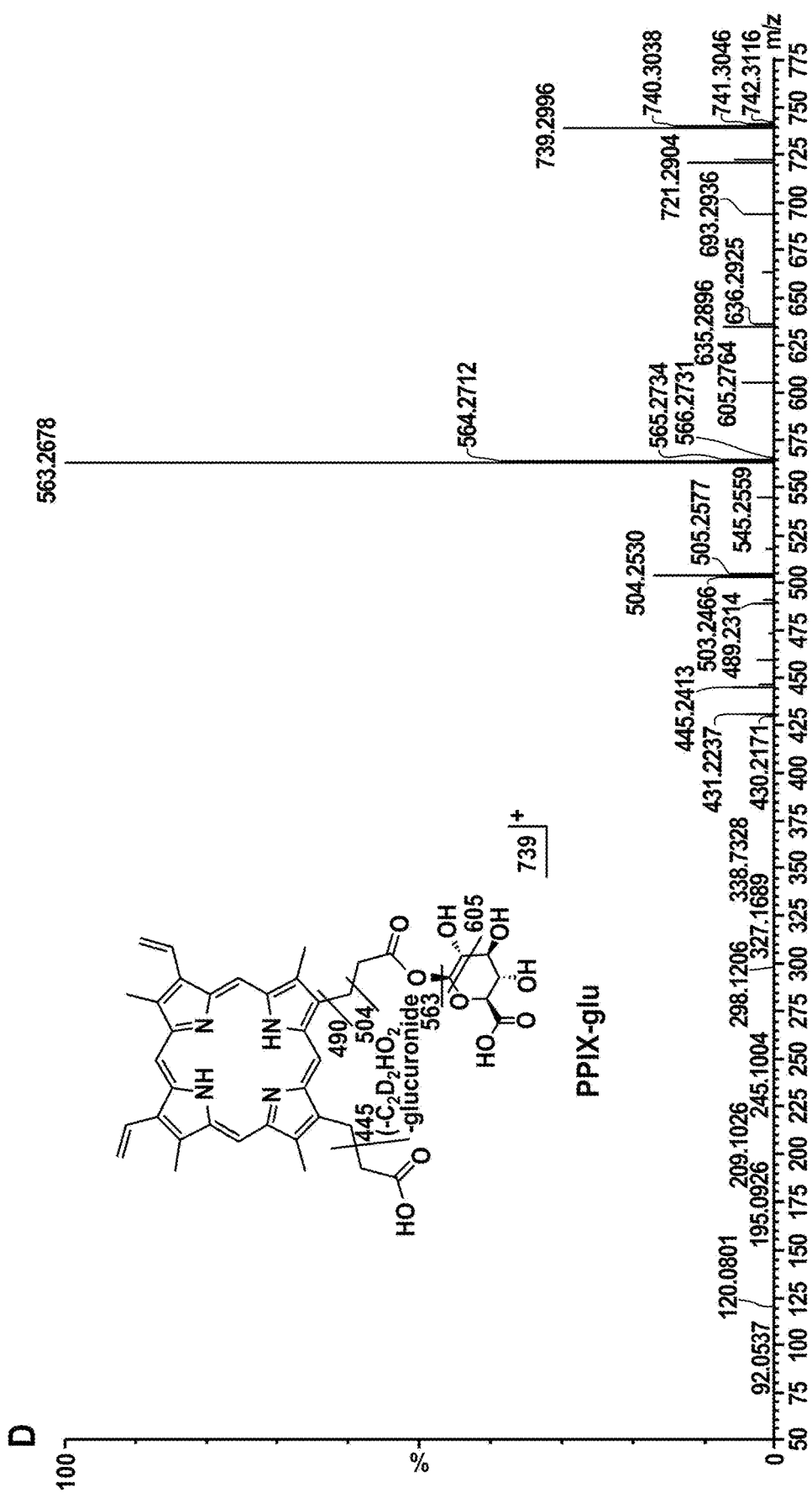

To understand the mechanisms by which deficiency of ABCG2 abolishes PPIX accumulation and hepatotoxicity, metabolomic analyses of liver and bile samples (FIGS. 8A, 8B, and 8C) were conducted in WT and Abcg2-null mice treated with deuterium-labeled aminolevulinic acid ($D_2$-ALA), a precursor of PPIX. As expected, $D_{16}$-PPIX was identified as a downstream metabolite of $D_2$-ALA. Consistent with the notion of PPIX as an ABCG2 substrate, the excretion of $D_{16}$-PPIX to bile was significantly decreased in Abcg2-null mice when compared to WT mice (FIG. 8D), indicating that deficiency of ABCG2 can directly decrease PPIX levels in the biliary system and thus prevent PPIX-mediated bile duct blockage. Interestingly, a small amount of $D_{16}$-PPIX was detected in the bile of Abcg2-null mice (FIG. 8D), indicating that transporter(s) other than ABCG2 might be involved in PPIX efflux, although they are less effective. We observed the compensatory changes of efflux transporters (for example, Mdr1, Mdr2, Bsep, Mrp2, Abcg5, and Abcg8) in the liver of ABCG2 deficient mice The metabolomic analysis also discovered D16-protoporphyrin-1-O-acyl-glucouronide ($D_{16}$-PPIX-glu), a conjugated metabolite of $D_{16}$-PPIX. The structure of $D_{16}$-PPIX-glu was verified by comparing it to the synthesized chemical standard of PPIX-glu (FIG. 9). Interestingly, $D_{16}$-PPIX-glu levels in the liver and bile of Abcg2-null mice were significantly increased when compared to WT mice (FIGS. 8E and 8F). PPIX-glu was also identified in the bile of Fech-mut/Abcg2-null mice (FIG. 8G). In addition to PPIX-glu, two known conjugated metabolites of PPIX, protoporphyrin-1-O-acyl-β-glucoside and protoporphyrin-1-O-acyl-β-xyloside, were identified in the bile of Fech-mut/Abcg2-null mice (FIG. 8G). Overall, the conjugated metabolites of PPIX were significantly increased in the bile of Fech-mut/Abcg2-null mice when compared to Fech-mut mice (FIG. 8H). The conjugated metabolites are considered detoxified metabolites because they are more hydrophilic and more readily excreted than the parent compound. Therefore, the data indicate that deficiency of ABCG2 in hepatocytes increases the conjugation pathways of PPIX and facilitates PPIX excretion in the EPP condition (FIG. 8I). Furthermore, deficiency of ABCG2 in RBCs decreased PPIX levels in plasma (FIG. 3B), which in turn decreased PPIX uptake by hepatocytes and decreased PPIX levels in the biliary system consequently attenuating PPIX-mediated bile duct blockage (FIG. 8I).

Discussion

Figures 10A, 10B:
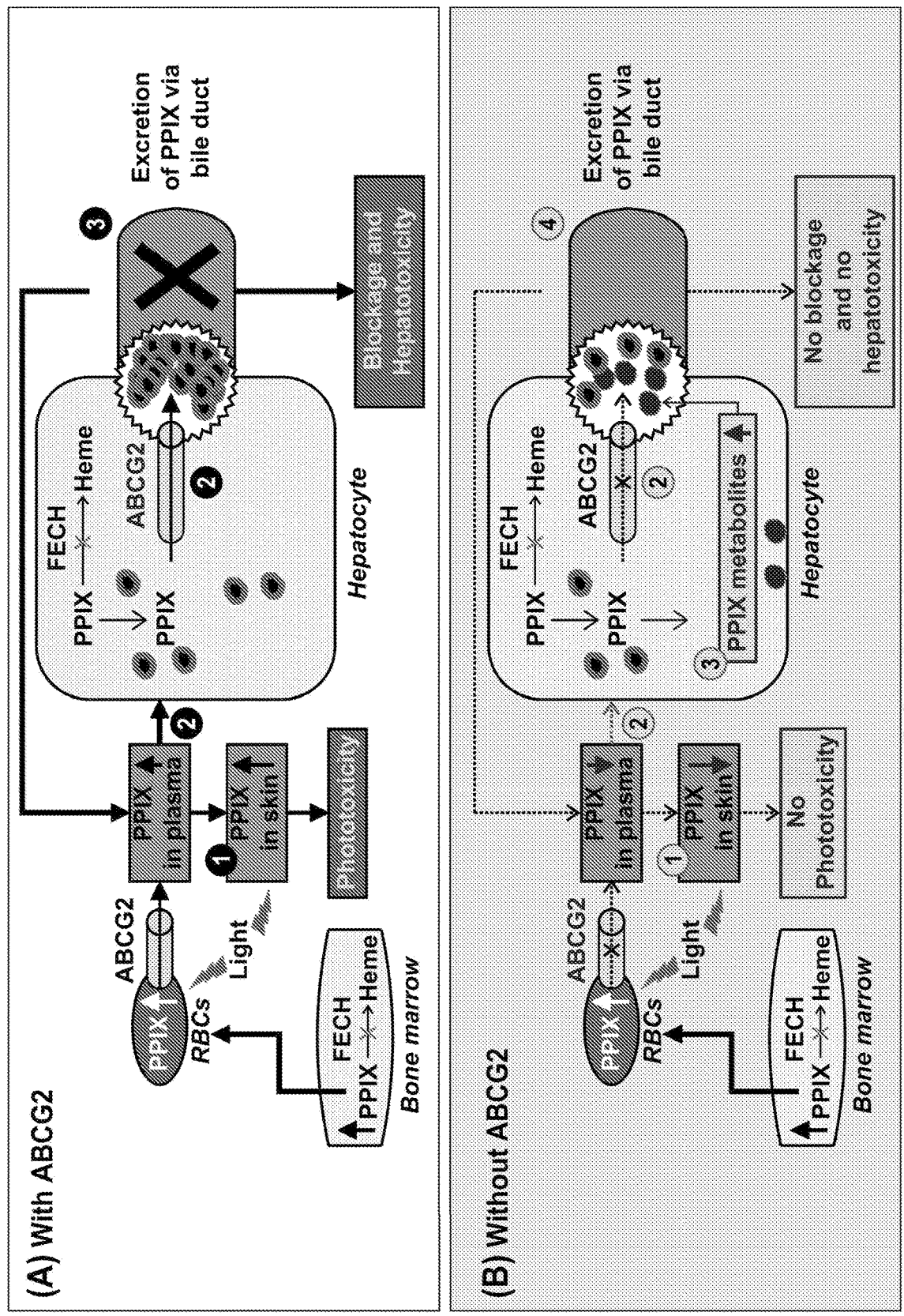
FIGS. 10A and 10B show a summary of the roles of ABCG2 in the pathophysiology of EPP. ABCG2 is expressed in red blood cells (RBCs) and hepatocytes.

Phototoxicity is the most common symptom in EPP patients. The work demonstrated that the phototoxicity in EPP is dependent on ABCG2. Compared to Fech-mut mice, PPIX levels were significantly increased in RBCs, but decreased in serum and the skin of Fech-mut/Abcg2-null mice. Concordantly, the phototoxicity observed in Fech-mut mice was abolished in Fech-mut/Abcg2-null mice. These data indicate that ABCG2 in RBCs drives phototoxicity in EPP by increasing PPIX distribution to the skin (FIG. 10A). In addition, ABCG2-dependent delivery of PPIX to the biliary system causes bile duct blockage, which further increases PPIX accumulation in the body and in turn potentiates phototoxicity (FIG. 10A). The data indicate that inhibition of ABCG2 can be used as a novel strategy for the management of EPP-associated phototoxicity, as ABCG2 deficiency decreases the accumulation of PPIX in the skin and prevent phototoxicity (FIG. 10B).

In EPP, PPIX in the liver comes mainly from the bone marrow through the circulatory system, followed by a less extent de novo synthesis in hepatocytes. Accumulation of PPIX in the liver causes liver damage that can be life-threatening because of liver failure. Here is demonstrated that EPP-associated hepatotoxicity is dependent on ABCG2, which builds up a high level of PPIX in the biliary system and results in bile duct blockage and cholestatic liver damage (FIG. 10A). That is, EPP-associated hepatotoxicity is dependent on ABCG2. It is shown herein that deficiency of ABCG2 abolishes hepatotoxicity in EPP by decreasing PPIX delivery to the hepatobiliary system and relieving PPIX-mediated bile duct blockage (FIG. 10B). In addition, deficiency of ABCG2 retains PPIX in hepatocytes where it can be metabolized to conjugated products to facilitate their excretion. Overall, deficiency of ABCG2 breaks the vicious cycle of PPIX accumulation in EPP patients, which decreases PPIX accumulation in the body and attenuate hepatotoxicity (FIG. 10B). These data indicate that ABCG2 is a target for the management of EPP-associated hepatotoxicity.

The work disclosed herein shifts current research paradigms for the roles of ABCG2 in porphyrin homeostasis and toxicities. A previous report showed that Abcg2-null mice are sensitive to an exogenous phototoxin, pheophorbide A (PPA), which is an analog of PPIX and a substrate of ABCG2. This phototoxicity model is totally different from EPP, because oral treatment with PPA bypasses ABCG2 in RBCs and PPA is directly delivered to the skin; whereas the distribution of PPIX to the skin in EPP is dependent on ABCG2 in RBCs and deficiency of ABCG2 decreases the distribution of PPIX to the skin. In addition, deficiency of ABCG2 in the intestines increases the bioavailability of PPA by preventing its efflux back into the intestinal lumen. Furthermore, PPA cannot be further metabolized through conjugation pathways because a methyl group already occupies one of the conjugation positions in PPA. Moreover, deficiency of ABCG2 in hepatocytes blocks the excretion of PPA through the biliary system, thus PPA comes back to the circulatory system and deposit more in the skin and increase phototoxicity.

Some pertinent questions for dysfunction of ABCG2 in EPP are: whether the accumulation of PPIX in RBCs is safe and what is the fate of the high level of PPIX in RBCs? Mean corpuscular hemoglobin (MCH) and total hemoglobin (tHb) in the blood of EPP mouse models was analyzed. The decreases of MCH and tHb were observed in Fech-mut mice, but not in Fech-mut/Abcg2-null mice. In addition, Fech-mut/Abcg2-null mice appear healthy with a normal breeding pattern compared to Fech-mut mice with difficulties in breeding. Spleen enlargement has been observed in EPP patients. Interestingly, deficiency of ABCG2 attenuates EPP-associated spleen enlargement, although the PPIX level in the spleen of Fech-mut/Abcg2-null mice was higher than Fech-mut mice. These data indicate that accumulation of PPIX in RBCs is safe in EPP with ABCG2 deficiency. RBCs have a lifespan of ~120 days; afterward they are recycled by macrophages in the spleen and liver. Therefore, the high level of PPIX in RBCs of Fech-mut/Abcg2-null mice end up in the macrophages of the spleen and liver, and this is protective because retention of PPIX in Kupffer cells, the resident liver macrophages, attenuates EPP-associated hepatotoxicity.

In summary, the current work demonstrated that the transporter ABCG2 is the key mediator in the pathophysiology of EPP, indicating that ABCG2 is a target for EPP therapy. The findings in EPP can also be applied for managing the toxicities of porphyrinogenic drugs/chemicals and another type of porphyria XLP, because they all have a similar biochemical basis as EPP in PPIX accumulation.

Materials and Methods

Animal Development, Characterization, and Maintenance

Fech-mut/Abcg2-null mice were generated by crossing Fech-mut mice with Abcg2-null mice. Abcg2-null mice were originally generated in Dr. Schinkel's group and obtained from Taconic Biosciences, Inc (Hudson, NY). Fech-mut mice were purchased from the Jackson Laboratory (Bar Harbor, ME), which were originally developed based on a loss-of-function mutation of FECH. Fech-mut/Abcg2-null mice were verified by PCR genotyping of Fech mutation and mouse Abcg2. hPXR/Abcg2-null mice were generated by crossing hPXR mice with Abcg2-null mice. hPXR mice were originally generated by bacterial artificial chromosome (BAC) transgenesis. hPXR/Abcg2-null mice were verified by PCR genotyping of human PXR, mouse Pxr, and mouse Abcg2. All mice (2-4 months old, male) were kept under standard 12 h light/dark cycle. The handling of mice was in accordance with study protocols approved by the institutional Animal Care and Use Committee.

Animal Studies to Determine the Role of ABCG2 in EPP-Associated Phototoxicity

WT, Abcg2-null, Fech-mut, and Fech-mut/Abcg2-null mice were used to determine the role of ABCG2 in EPP-associated phototoxicity. In brief, the back skin of mice was shaved and exposed to UV light (395-410 nm) for 30 min each day and continued for 5 days. On the 6th day, all mice were sacrificed. The back skin was harvested for histological analysis. Skin samples were also used for measurement of PPIX.

Animal Studies to Determine the Role of ABCG2 in EPP-Associated Hepatotoxicity

WT, Abcg2-null, Fech-mut, and Fech-mut/Abcg2-null mice were kept under the same environment and sacrificed at a similar age. Liver and blood samples were collected for evaluation of liver damage. Liver, bile, spleen, and blood samples were used for analysis of PPIX and its metabolites.

Animal Studies to Determine the Role of ABCG2 in Chemically-Induced PPIX Accumulation and Hepatotoxicity WT and Abcg2-null mice were treated with DDC (0.1% in diet) or GSF (2.5% in diet) for two weeks. In addition, hPXR and hPXR/Abcg2-null mice were treated with RIF (100 mg/Kg diet) and INH (400 mg/L drinking water) for four weeks. After the treatment, blood and liver samples were collected for evaluation of liver injury and analysis of PPIX.

Animal Studies to Determine the Role of ABCG2 in Modulating PPIX Distribution, Metabolism, and Excretion WT and Abcg2-null mice were treated with $D_2$-ALA (50 mg/Kg, ip), a stable isotope-labeled precursor of PPIX. One hour after $D_2$-ALA treatment, liver and bile samples were collected for metabolomic analysis. In brief, liver and bile samples were analyzed by the ultra-performance liquid chromatography coupled with a quadrupole time-of-flight mass spectrometer (UPLC-QTOFMS, Waters Corp, Milford, MA). Centroid and integrated mass chromatographic data were processed by MarkerLynx software (Waters Corp, Milford, MA) to generate a multivariate data matrix. These data were then exported to SIMCA-P+ software (Umetrics, Kinnelon, NJ) for multivariate data analysis. Principal component analysis (PCA) and orthogonal projection to latent structures-discriminant analysis (OPLS-DA) were conducted to represent the major latent variables in the data matrix. The variables that significantly contributed to the discrimination between groups were subjected to structure identification.

Statistics

Data are shown as means±standard error of the mean (S.E.M.). Statistical analysis was performed using GraphPad Prism 7.0. One-way analysis of variance (ANOVA) with Tukey's post hoc tests was used to compare differences among multiple groups. Two-tailed Student's t-tests were used to compare differences between two groups. A P value <0.05 was considered as statistically significant.

Chemical and Reagents

Protoporphyrin IX (PPIX), 3,5-diethoxycarbonyl-1,4-dihydrocollidine (DDC), griseofulvin (GSF), rifampicin (RIF), isoniazid (INH), N-methylmorpholine, and glucuronic acid were purchased from Sigma-Aldrich (St. Louis, MO). Deuterium-labeled aminolevulinic acid ($D_2$-ALA) was purchased from CDN Isotopes (Pointe-Claire, Quebec, Canada). 1-[bis(dimethylamino)methylene]-1H-1,2,3-triazolo[4,5-b]pyridinium 3-oxid hexafluorophosphate (HATU) was purchased from Oakwood Products, Inc. (West Columbia, SC). All solvents used for metabolite analysis were of the highest grade commercially available.

Sample Preparation for Metabolite Analysis

PPIX and/or its metabolites were analyzed in RBCs, serum, liver, skin, spleen, and bile. Briefly, PPIX was extracted from $3 \times 10^7$ RBCs using 100 µl of 80% of methanol. The mixture was sonicated for 10 s and centrifuged at 15,000 g for 10 min. Thirty µl of serum sample was added to 70 µl of methanol, and then vortexed and centrifuged at 15,000 g for 10 min. Liver and spleen samples were homogenized in water (100 mg of tissues in 500 µl of water), and then 200 µl of acetonitrile:methanol (1:1, v/v) was added to 100 µl of each homogenate, and followed by vortexing and centrifugation at 15,000 g for 10 min. Skin tissues were ground to powder under liquid nitrogen and then digested in the lysis buffer [0.1 M Tris. HCl (pH=8), 5 mM EDTA, 0.2% SDS, 0.2 M NaCl, and 0.2 mg/ml protease K] at 54° C. for 18 h (100 mg of the tissue powder in 500 µl of buffer). Two hundred µl of acetonitrile:methanol (1:1, v/v) was added to 100 µl of each skin mixture, and followed by vortexing and centrifugation at 15,000 g for 10 min. Two µl of bile sample was added to 80 µl of 50% aqueous acetonitrile, followed by vortexing for 30 s and centrifugation at 15,000 g for 10 min. Each supernatant was transferred to an autosampler vial and 1.0 µl was injected into UPLC-QTOFMS for metabolite analysis.

UPLC-QTOFMS Analysis

An Acquity BEH C18 column (2.1×100 mm, 1.7 µm, Waters, Milford, MA) was used for metabolite separation. The flow rate of mobile phase was 0.5 ml/min using a gradient ranging from 5% to 95% acetonitrile/water containing 2 mM $NH_4HCO_3$ and 0.05% of aqueous ammonia. The column temperature was maintained at 50° C. QTOFMS was operated in positive mode with electrospray ionization. The source and desolvation temperatures were set at 150° C. and 500° C., respectively. Argon was applied as collision gas. Nitrogen was applied as cone and desolvation gas. Capillary and cone voltages were set at 0.8 kV and 40 V, respectively. MS data (50-1,000 Da) were acquired in centroid format. Tandem mass fragmentation scans with collision energy ramping from 20 to 60 eV were used for structural elucidations of metabolites.

Synthesis of protoporphyrin-1-O-acyl-glucouronide (PPIX-glu)

Based on the MS/MS data, PPIX-glu was proposed as a novel metabolite of PPIX. To confirm its structure, PPIX-glu was synthesized. In brief, PPIX was first activated using HATU in presence of N-methylmorpholine at room temperature for 14 h, and then reacted with D-glucuronic acid to form PPIX-glu.

Clinical Chemistry

Liver injury was evaluated by analyzing serum alanine aminotransaminase (ALT), aspartate aminotransferase (AST), alkaline phosphatase (ALP) (Pointe Scientific Canton, MI), and total bilirubin (Sigma-Aldrich, St. Louis, MO). These liver injury biomarkers were analyzed according to the standard procedures provided by the manufacturers. Blood toxicity was evaluated by analyzing mean corpuscular hemoglobin (MCH) (HESKA HemaTrue; Loveland, CO) and total hemoglobin (tHb) (AVOXimeter 4000; Edison, NJ).

Histological Analysis

Liver and skin tissues were first fixed in 4% formaldehyde phosphate solution overnight and then dehydrated and embedded in paraffin. Four m sections were cut and stained. For hematoxylin and eosin (H&E) staining, tissue sections were stained in hematoxylin solution for 5 min, washed with tap water for 1 min, and then differentiated in 1% acetic acid solution for 1 min and followed by staining in eosin solution for 1 min. For Sirius Red Staining, tissue sections were stained in 0.1% PicroSirius Red solution for 1 h, and then washed with 1% acetic acid solution twice.

Fluorescence Analysis of PPIX

The frozen liver tissues were mounted in Tissue-Tek OCT compound (Sakura Finetek, Torrance, CA) and cut into 10 m sections. The liver sections were then analyzed by fluorescence microscopy (BZ-X710; Keyence Corporation, Osaka, Japan). PPIX was represented in red. Nuclei were stained with DAPI and represented in blue.

Quantitative PCR (qPCR) Analysis

Total mRNA was extracted from liver and skin tissues using TRIzol reagent (Invitrogen, Carlsbad, CA) and then complementary DNA (cDNA) was generated from 1 g of total RNA with a SuperScript II Reverse Transcriptase kit and random oligonucleotides (Invitrogen). qPCR analysis was conducted using 25 ng cDNA, 150 nM of each primer (TNF-α forward primer (SEQ ID NO: 1), TNF-α reverse primer (SEQ ID NO: 2), IL-1β forward primer (SEQ ID NO: 3), IL-1β reverse primer (SEQ ID NO: 4), collagen 1a1 forward primer (SEQ ID NO: 5), collagen 1a1 reverse primer (SEQ ID NO: 6), collagen 1a2 forward primer (SEQ ID NO: 7), collagen 1a2 reverse primer (SEQ ID NO: 8), Mdr1 forward primer (SEQ ID NO: 9), Mdr1 reverse primer (SEQ ID NO: 10), Mdr2 forward primer (SEQ ID NO: 11), Mdr2 reverse primer (SEQ ID NO: 12), Bsep forward primer (SEQ ID NO: 13), Bsep reverse primer (SEQ ID NO: 14), Mrp2 forward primer (SEQ ID NO: 15), Mrp2 reverse primer (SEQ ID NO: 16), Abcg5 forward primer (SEQ ID NO: 17), Abcg5 reverse primer (SEQ ID NO: 18), Abcg8 forward primer (SEQ ID NO: 19), and Abcg8 reverse primer (SEQ ID NO: 20)) and 5 μL of SYBR Green PCR Master Mix (Applied Biosystems, Foster City, CA) in a total volume of 10 μL. The qPCR plate was read on an ABI-Prism 7500 Sequence Detection System (Applied Biosystems, Foster City, CA) and quantified using comparative CT method.

Example 2: Development of ABCG2 Inhibitors and their Applications for Therapy in Erythropoietic Protoporphyria (EPP)

Although there are several structures with diverse scaffolds published as ABCG2 inhibitors, few of them work effectively in vivo. KO143, a structural analog of fumitremorgin C, is a potent and selective ABCG2 inhibitor. However, KO143 has a poor oral pharmacokinetic profile. It was found that KO143 was very unstable because of the quick hydrolysis of tert-butyl ester group in KO143 structure by carboxylesterase 1 (Scheme 1). The current work developed KO143 analogs with a focus on improving metabolic stability. The inhibitory activity and cytotoxicity of these new ABCG2 inhibitors were also determined. In addition, the efficacy of these new ABCG2 inhibitors was evaluated in an EPP mouse model.

Results

Table 1 shows new ABCG2 inhibitors developed based on Amide I and their inhibitory activity, cytotoxicity, and metabolic stability. $IC_{50}$, the half maximal inhibitory concentration; $CC_{50}$, the 50% cytotoxic concentration.

| Compound | $R_6$ | $R_7$ | $IC_{50}$ (μM) | $CC_{50}$ (μM) | HLM stability (% vs 0 min) 30 min | 60 min |
|---|---|---|---|---|---|---|
| KO143 | — | — | 0.18 | 22.3 | 12% | 3% |
| K2 | H | 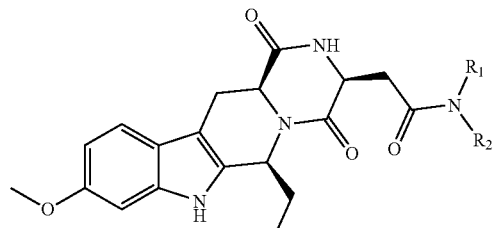 | 0.13 | 52.2 | 83% | 75% |
| K12 | H | | 3.23 | >100 | 74% | 51% |
| K14 | H | | 0.12 | 30.4 | 66% | 57% |
| K18 | Me | Me | 0.54 | >100 | 60% | 48% |
| K19 | H | Ph | 0.24 | 29.7 | 43% | 24% |
| K20 | | | 0.74 | 85.6 | 22% | 11% |
| K21 | Et | Et | 0.24 | 44.1 | 11% | 6% |
| K22 | | | 4.40 | >100 | | |
| K24 | | | 0.31 | 69.0 | 11% | 7% |
| K26 | Me | | 0.06 | 18.0 | 7% | 7% |
| K34 | H | | 0.44 | ≈100 | 73% | 63% |

Table 2 shows new ABCG2 inhibitors developed based on Amide II and their inhibitory activity, cytotoxicity, and metabolic stability. $IC_{50}$, the half maximal inhibitory concentration; $CC_{50}$, the 50% cytotoxic concentration.

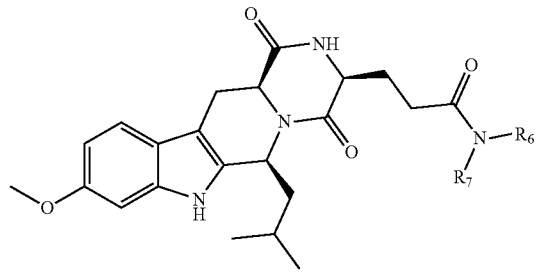

Amide I

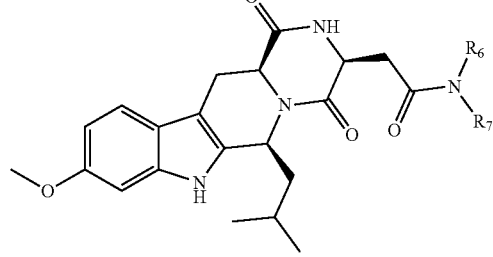

Amide II

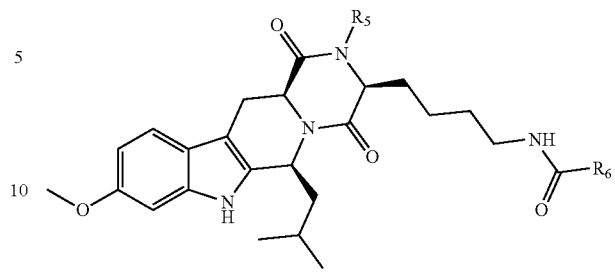

Amide III

| Compound | R₆ | R₇ | IC₅₀ (µM) | CC₅₀ (µM) | HLM stability (% vs 0 min) 30 min | HLM stability (% vs 0 min) 60 min |
|---|---|---|---|---|---|---|
| K3 | | H | 0.18 | 58.9 | 74% | 60% |
| K23 | | H | 0.13 | 46.6 | 45% | 26% |
| K25 | | | 3.14 | 26.5 | — | — |
| K31 | | H | 0.27 | >100 | 65% | 49% |
| K33 | | H | Bn | 0.25 | 31.1 | 37% | 18% |

Table 3 shows new ABCG2 inhibitors developed based on Amide III and their inhibitory activity, cytotoxicity, and metabolic stability. $IC_{50}$, the half maximal inhibitory concentration; $CC_{50}$, the 50% cytotoxic concentration.

| Compound | R₈ | R₅ | IC₅₀ (µM) | CC₅₀ (µM) | HLM stability (% vs 0 min) 30 min | HLM stability (% vs 0 min) 60 min |
|---|---|---|---|---|---|---|
| K8 | Benzyloxy | H | >1 | 71.7 | 42% | 16% |
| K10 | tert-butyl | H | 0.08 | 41.9 | 79% | 72% |
| K11 | tert-butyl | pivaloyl | 0.16 | 39.6 | 7% | 7% |
| K27 | cyclohexyl | cyclohexanecarbonyl | >1 | — | — | — |
| K28 | cyclohexyl | H | 0.14 | 42.6 | 32% | 21% |
| K29 | Ph | H | 0.49 | 30.8 | 64% | 51% |
| K30 | cyclopentyl | H | 0.12 | 43.7 | 35% | 18% |
| K32 | isopropyl | H | 0.12 | 81.9 | 65% | 49% |

Table 4 shows new ABCG2 inhibitors developed based on O-Ether and their inhibitory activity, cytotoxicity, and metabolic stability. $IC_{50}$, the half maximal inhibitory concentration; $CC_{50}$, the 50% cytotoxic concentration.

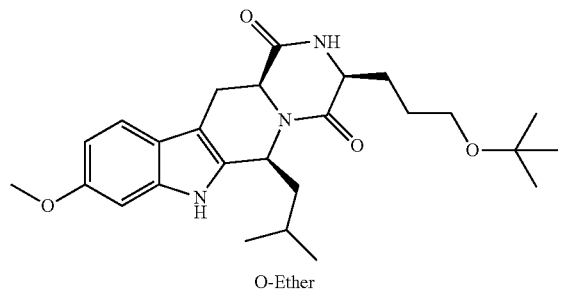 [SMILES: COc1ccc2c3c([nH]c2c1)[C@H](CC(C)C)N1C(=O)[C@H](CCCOC(C)(C)C)NC(=O)[C@@H]1C3]

O-Ether

| Compound | $IC_{50}$ (μM) | $CC_{50}$ (μM) | HLM stability (% vs 0 min) | |
|---|---|---|---|---|
| | | | 30 min | 60 min |
| K7 | 0.09 | >100 | 16% | 9% |

Pharmacokinetics.

Based upon inhibitory activity, cytotoxicity, and metabolic stability, K2, K31 and K34 were selected for pharmacokinetic studies in mice. All these three KO143 analogs showed better pharmacokinetic profiles than KO143, especially for K31 (FIG. 11).

Efficacy of K31 Against Phototoxicity in an EPP Mouse Model.

Figure 11:
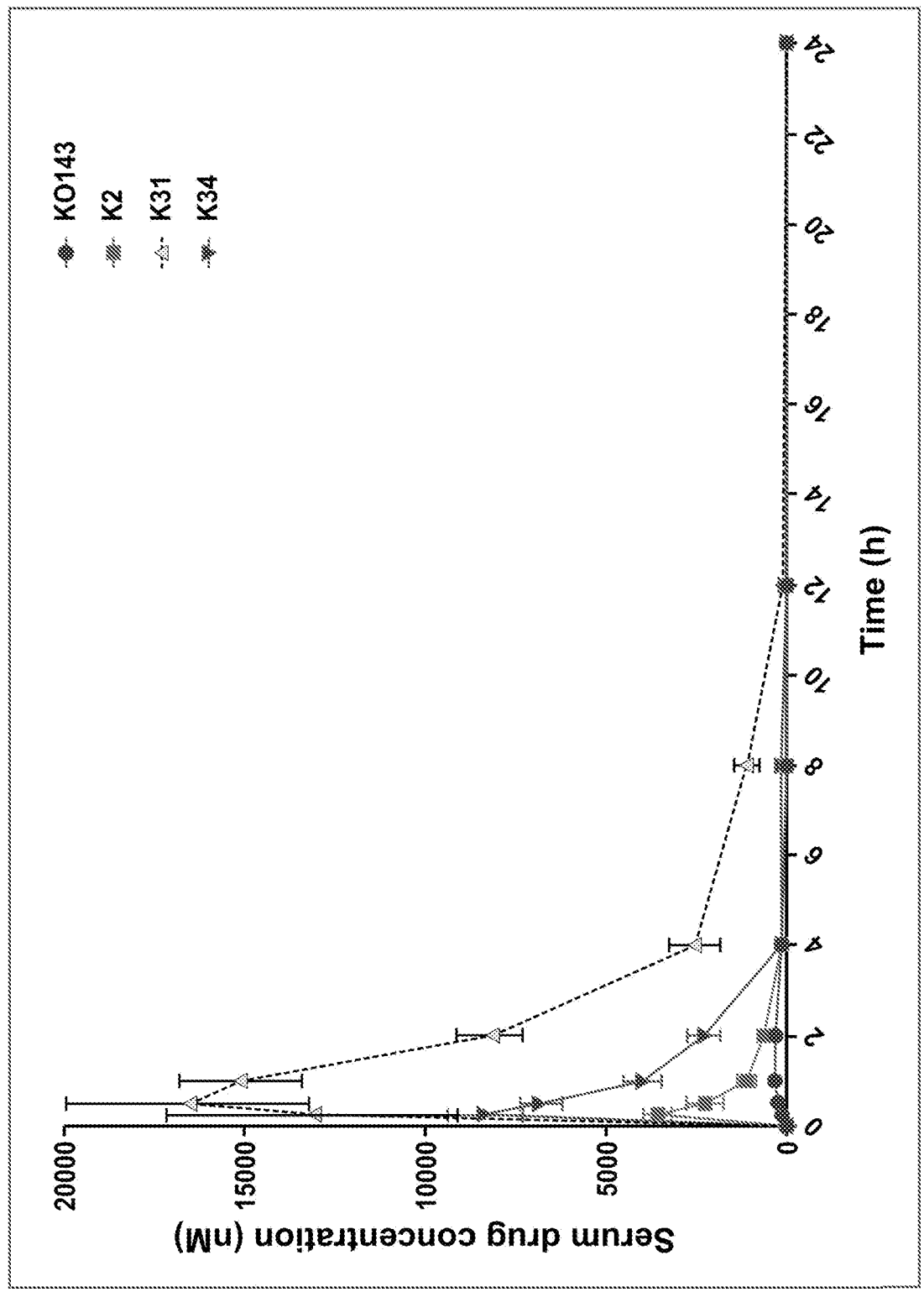
FIG. 11 shows the pharmacokinetic analysis of KO143, K2, K31 and K34 in mice.
Figure 12A:
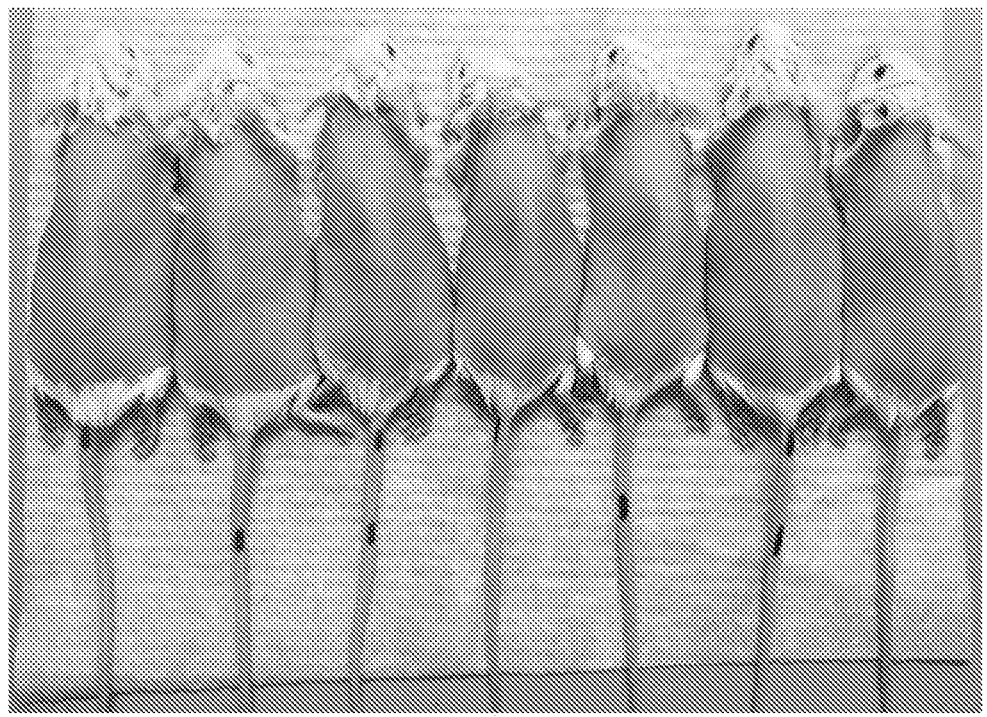
FIGS. 12A and 12B show the efficacy of K31 against EPP-associated phototoxicity. The Fech-mut mouse model was used as an EPP model.
Figure 12B:
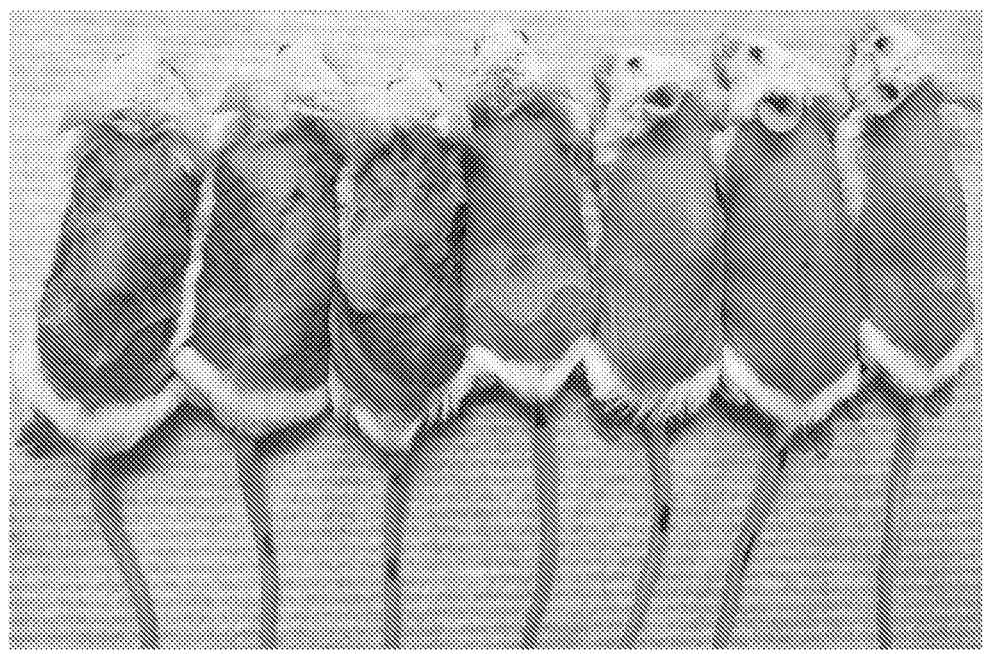
Figure 13:
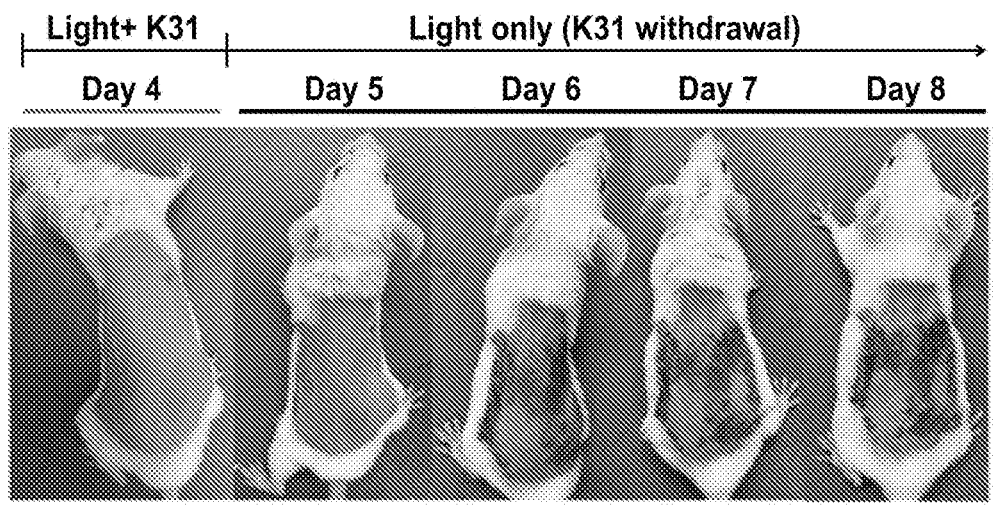
FIG. 13 shows the phototoxicity in Fech-mut mice after K31 withdrawal. The mice were pretreated with K31 followed by light exposure from day 1 to 4. From day 5, the mice were exposed to light only, but no K31 treatment.

K31 has a high ABCG2 inhibitory activity, low cytotoxicity, high metabolic stability, and an ideal pharmacokinetic profile (Table 2 and FIG. 11). Therefore, the effect of K31 on phototoxicity in an EPP mouse model was further investigated. It was found that treatment with K31 fully protected the EPP mice from phototoxicity (FIG. 12). A withdrawal test for K31 in Fech-mut mice also showed phototoxicity soon after the withdrawal of K31 (FIG. 13).

Effects of ABCG2 Inhibitors on PPIX Efflux from RBCs.

Figure 14:
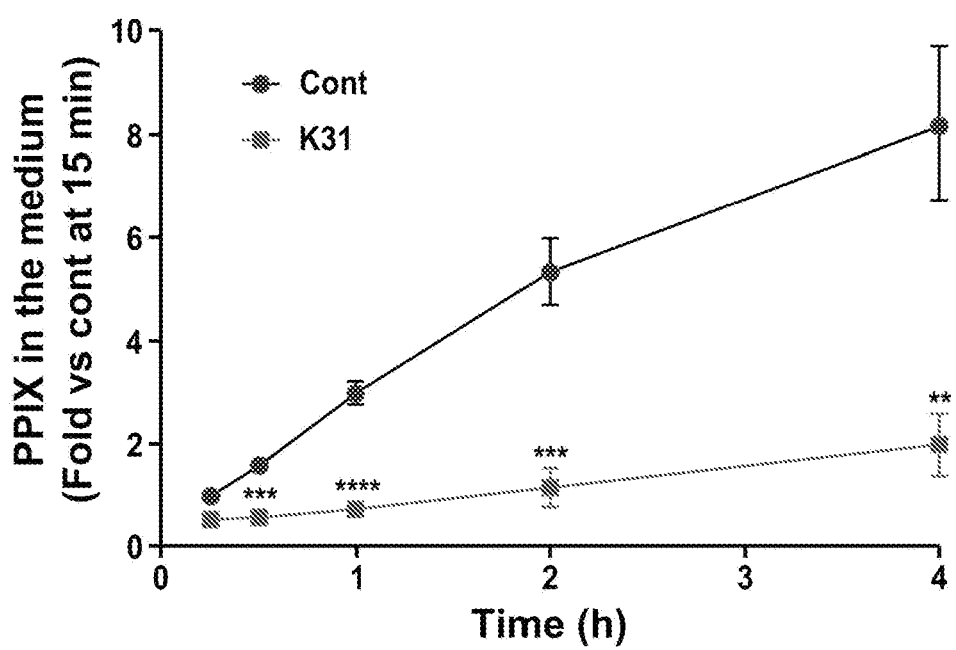
FIG. 14 shows the effect of K31 on PPIX efflux from the RBCs of Fech-mut mice. Results are expressed as means±S.E.M. (n=3). P<0.01, *P<0.001, ****P<0.0001.

The effect of K31 on PPIX efflux from RBCs was evaluated. As shown in FIG. 14, K31 significantly inhibited PPIX efflux from RBCs.

Summary and Discussion

In summary, the current work developed novel ABCG2 inhibitors with better metabolic stability. It was also shown herein that ABCG2 inhibitors can be used for the treatment of EPP-associated phototoxicity, the most common symptom in EPP patients.

In addition to EPP therapy, the newly developed ABCG2 inhibitors can be used for preventing multidrug resistance (MDR) in cancer therapy. A lot of clinically used anticancer drugs are substrates of ABCG2, whereas ABCG2 is overexpressed in cancer cells and pumps out anticancer drugs leading to MDR and failure of chemotherapy. Therefore, ABCG2 is a target to overcome MDR in cancer therapy. The newly developed ABCG2 inhibitors can be tested for preventing MDR in cancer therapy.

Methods

Design of ABCG2 Inhibitors

To develop stable ABCG2 inhibitors, herein we replaced the tert-butyl ester group with different carboxylesterase resistant groups, including amide and ether, based on the ester moiety. The structures of three series of amides (I, II, III) are disclosed in Scheme 1.

Scheme 1.

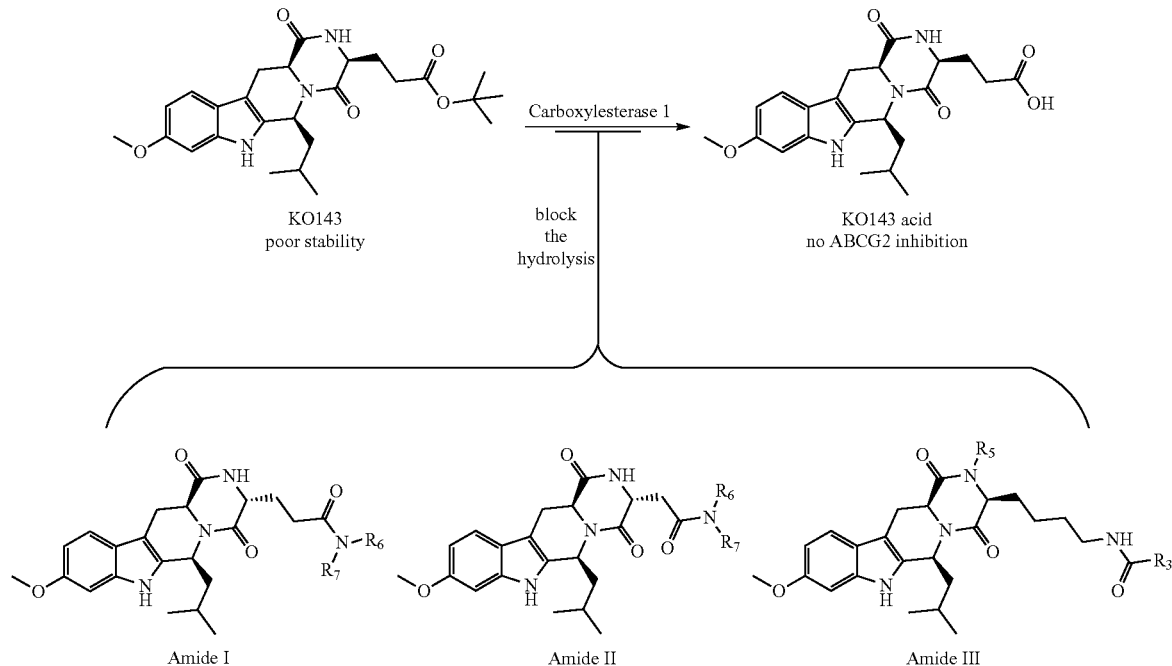

The hydrolysis of KO143 ester to KO143 acid by carboxylesterase 1, and the design of ABCG2 inhibitors to block the hydrolysis.

Chemical Synthesis.

25 target compounds (Table 1, Table 2, Table 3, and Table 4) were synthesized. The synthetic strategies used to prepare these compounds are detailed in Schemes 2-4 below.

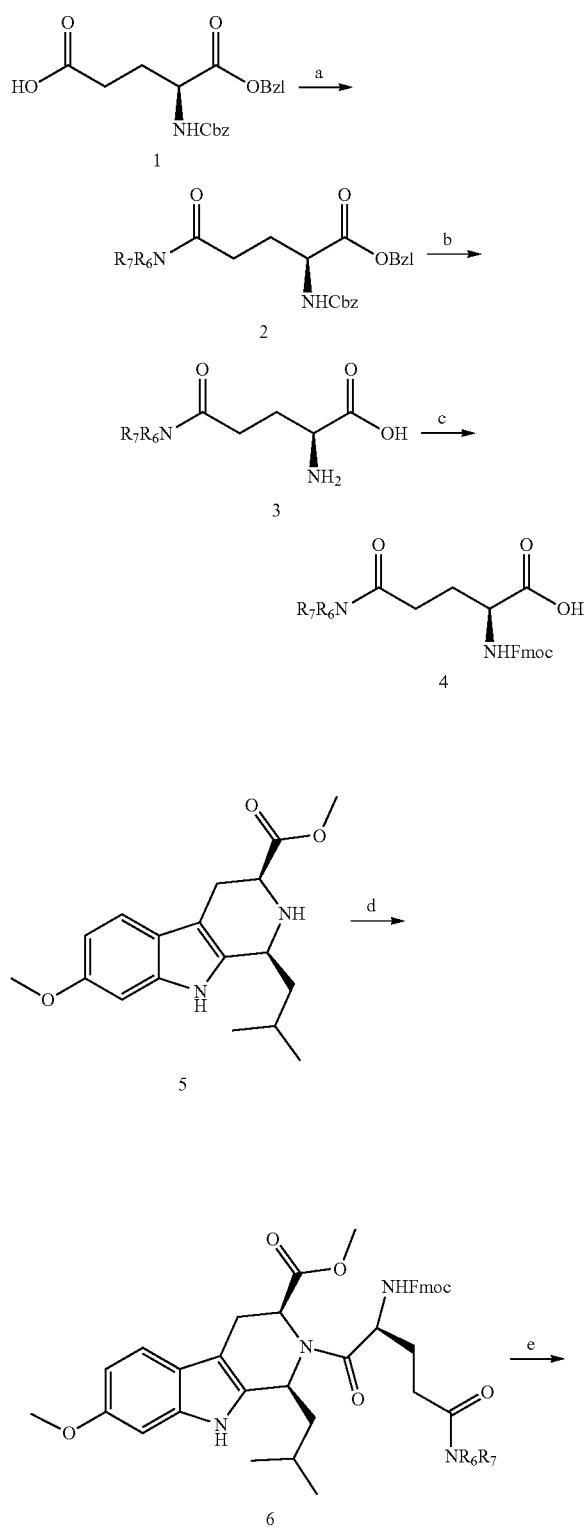

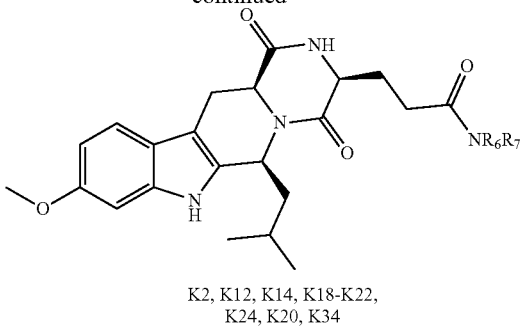

K2, K12, K14, K18-K22, K24, K20, K34

Reagents and conditions:
(a) $R_6R_7NH$, EDCl, HOBt, $CH_2Cl_2$, rt, overnight;
(b) Pd/C, MeOH, rt, 3-5 h;
(c) Fmoc N-hydroxysuccinimide ester, $NaHCO_3$, 1,4-dioxane, rt, overnight;
(d) compound 4, $SOCl_2$, DMF, $CH_2Cl_2$, 0° C. ~ rt, 2 h, then $Et_3N$, rt, overnight; or 2-chloro-1,3-dimethylimidazolinium hexafluorophosphate (CIP), DIEA N-methylpyrrolidone, rt, 5 days;
(e) piperidine, THF, rt, overnight.

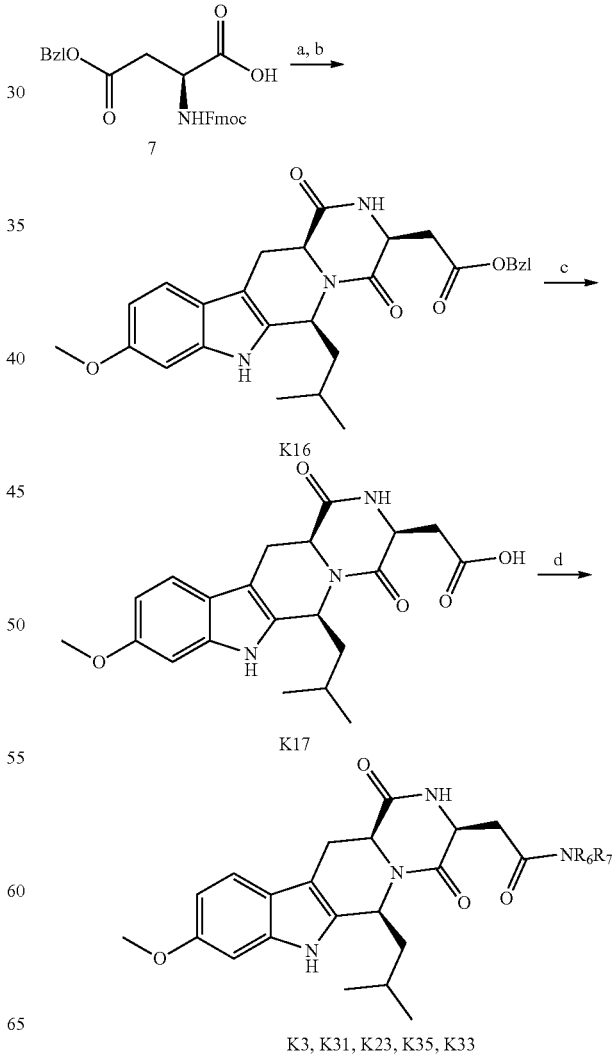

-continued

Reagents and conditions:
(a) compound 5, CIP, DIEA N-methylpyrrolidone, rt, 5 days;
(b) piperidine, THF, rt, overnight;
(c) Pd/C, MeOH, rt, 3 h;
(d) R₆R₇NH, EDCl, HOBt, CH₂Cl₂, rt, overnight.

Scheme 3. Synthesis of lysine-linked Ko143 analogs.

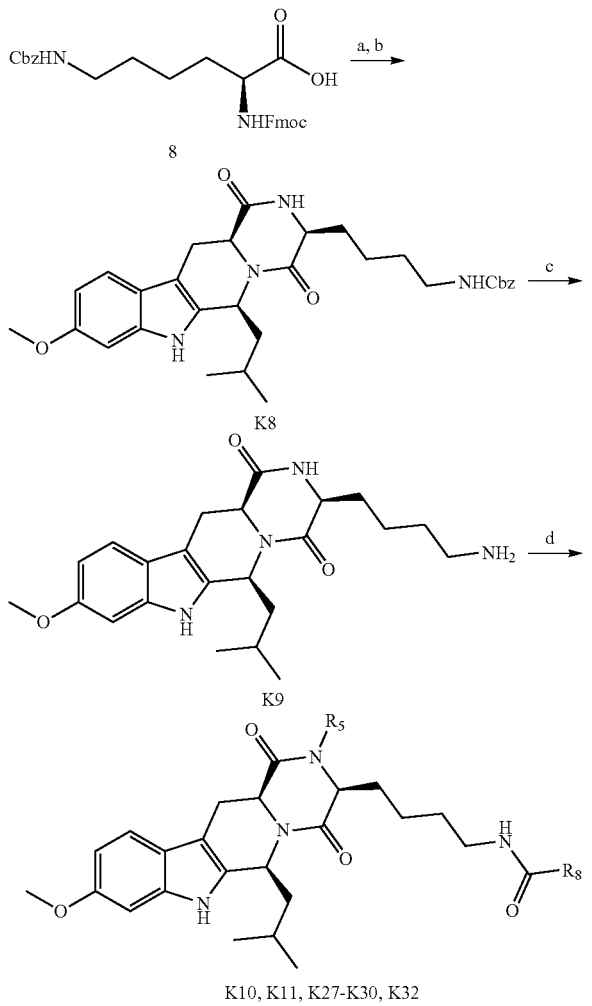

(a) compound 5, CIP, DIEA N-methylpyrrolidone, rt, 5 days;
(b) piperidine, THF, rt, overnight;
(c) Pd/C, HCl, MeOH, rt, 4 h;
(d) R₈COCl, Et₃N, CH₂Cl₂, 0° C.~rt, 4 h; or R₈COOH, EDCl, HOBt, CH₂Cl₂, rt, overnight.

The synthesis of example compounds is detailed below.

S)-benzyl 2-(((benzyloxy)carbonyl)amino)-5-(tert-butylamino)-5-oxopentanoate (2a)

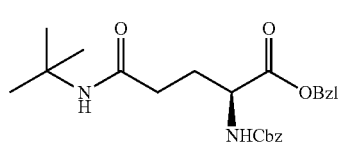

(S)-5-(benzyloxy)-4-(((benzyloxy)carbonyl)amino)-5-oxopentanoic acid (1) was purchased from Chem-Impex (Wood Dale, IL). To a solution of compound 1 (8 g, 21.5 mmol) in CH₂Cl₂ was added EDCI (7 g, 36 mmol), HOBt (4.9 g, 36.5 mmol) and tert-butylamine (3.37 mL, 32.3 mmol). The mixture was stirred at room temperature overnight, and then quenched with saturated aqueous NaHCO₃, and extracted with CH₂Cl₂. The combined organic phases were washed with brine, dried over MgSO₄ and concentrated. The residue was purified by silica gel chromatography (PE/EtOAc=2:1) to afford compound 2a (8.9 g, 97%) as a colorless oil. ¹H NMR (400 MHz, CDCl₃) δ 7.34 (m, 10H), 5.66 (d, J=8.0 Hz, 1H), 5.44 (brs, 1H), 5.23-5.12 (m, 2H), 5.10 (s, 2H), 4.37 (m, 1H), 2.24-2.06 (m, 3H), 1.99 (m, 1H), 1.29 (s, 9H). HRMS (ESI): m/z (M+Na)⁺ calcd for C₂₄H₃₀N₂O₅Na: 449.2052, found: 449.2062.

(S)-2-amino-5-(tert-butylamino)-5-oxopentanoic acid (3a)

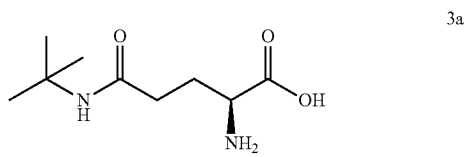

To a solution of compound 2a (8.9 g, 20.9 mmol) in MeOH was added 10% Pd/C (900 mg), and the suspension was hydrogenated at room temperature for 5 h until the starting material was consumed. Then the mixture was filtered, and the filtrate was concentrated to give compound 3a (2.09 g, 49%) as a white solid. HRMS (ESI): m/z (M+H)⁺ calcd for C₉H₁₉N₂O₃: 203.1396, found: 203.1392.

(S)-2-((((9H-fluoren-9-yl)methoxy)carbonyl)amino)-5-(tert-butylamino)-5-oxopentanoic acid (4a)

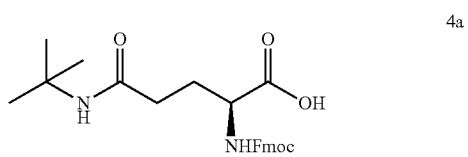

The acid 3a (7.16 g, 35.4 mmol) was dissolved in aqueous NaHCO₃ (8.92 g, 106.2 mmol, 100 mL H₂O), and a solution of Fmoc N-hydroxysuccinimide ester (11.94 g, 35.4 mmol) in 1,4-dioxane (100 mL) was added slowly. The reaction mixture was stirred at room temperature overnight. The resulting mixture was then concentrated to remove most of the organic solvent, and the aqueous residue was adjusted to pH=1 with concentrated HCl. The mixture was extracted with EtOAc, and the combined organic phases were washed with brine, dried over MgSO₄ and concentrated. The residue was purified by silica gel chromatography (CH₂Cl₂/MeOH=10:1) to afford compound 4a (13 g, 87%) as a white solid. ¹H NMR (400 MHz, CDCl₃) δ 7.76 (d, J=7.5 Hz, 2H), 7.59 (m, 2H), 7.40 (t, J=7.4 Hz, 2H), 7.31 (t, J=7.2 Hz, 2H), 6.06 (d, 1H), 5.76 (brs, 1H), 4.43-4.27 (m, 3H), 4.21 (t, J=6.9 Hz, 1H), 2.49 (m, 1H), 2.37 (m, 1H), 2.23-2.11 (m, 1H), 2.06 (m, 1H), 1.35 (s, 9H). HRMS (ESI): m/z (M−H)⁻ calcd for C₂₄H₂₇N₂O₅: 423.1920, found: 423.1922.

N-(tert-butyl)-3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)propanamide (K2)

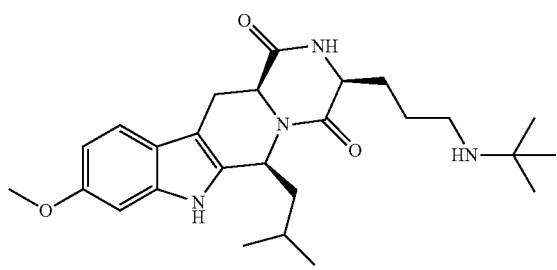

To a solution of compound 4a (8 g, 19 mmol) in dry CH$_2$Cl$_2$ was added dry DMF (0.3 mL, 3.8 mmol) followed by SOCl$_2$ (13.8 mL, 190 mmol) under nitrogen 0° C. The mixture was stirred at room temperature for 2 h until all the starting material was consumed. The mixture was concentrated and the residue was washed with CH$_2$Cl$_2$ three times to evaporate most of the left SOCl$_2$. The crude acyl chloride was redissolved in dry CH$_2$Cl$_2$, and the solution was added dropwise to a mixture of compound 5 (1.8 g, 5.7 mmol, see Li Y, Hayman E, Plesescu M, et al. Synthesis of potent BCRP inhibitor-Ko143. Tetrahedron Letters 2008; 49:1480-1483) and Et$_3$N (2.35 mL, 17 mmol) in CH$_2$Cl$_2$ at 0° C. Then the mixture was warmed to room temperature and stirred overnight. The reaction was quenched with saturated aqueous NaHCO$_3$, and extracted with CH$_2$Cl$_2$. The combined organic phases were washed with brine, dried over MgSO$_4$ and concentrated. The residue was purified by silica gel chromatography (PE/EtOAc=2:1) to afford 3.0 g crude (1S, 3S)-methyl 2-((S)-2-((((9H-fluoren-9-yl)methoxy)carbonyl)amino)-5-(tert-butylamino)-5-oxopentanoyl)-1-isobutyl-7-methoxy-2,3,4,9-tetrahydro-1H-pyrido[3,4-b]indole-3-carboxylate (6a). HRMS (ESI): m/z (M+H)$^+$ calcd for C$_{42}$H$_{51}$N$_4$O$_7$: 723.3758, found: 723.3754.

The above crude compound 6a was dissolved in THF (60 mL), then piperidine (3 mL) was added, and the mixture was stirred overnight at room temperature. The resulting mixture was concentrated, and the crude was dissolved in EtOAc. The organic phases were washed with brine, dried over MgSO$_4$ and concentrated. The residue was purified by silica gel chromatography (PE/EtOAc=1:1) followed by recrystallization in PE/EtOAc/CH$_2$Cl$_2$ to afford K2 (820 mg, 31%) as a light yellow solid. $^1$H NMR (400 MHz, CDCl$_3$) δ 7.92 (s, 1H), 7.62 (s, 1H), 7.44 (d, J=8.6 Hz, 1H), 6.89 (d, J=2.1 Hz, 1H), 6.83 (dd, J=8.6, 2.2 Hz, 1H), 5.45 (m, 2H), 4.05-3.95 (m, 2H), 3.85 (s, 3H), 3.52 (dd, J=15.8, 5.0 Hz, 1H), 3.04 (dd, J=15.8, 11.7 Hz, 1H), 2.42-2.34 (m, 3H), 2.30-2.20 (m, 1H), 1.73 (m, 1H), 1.59-1.48 (m, 2H), 1.36 (s, 9H), 1.06 (d, J=6.5 Hz, 3H), 0.83 (d, J=6.4 Hz, 3H). HRMS (ESI): m/z (M+H)$^+$ calcd for C$_{26}$H$_{37}$N$_4$O$_4$: 469.2815, found: 469.2818.

(S)-benzyl 2-(((benzyloxy)carbonyl)amino)-5-(cyclopropylamino)-5-oxopentanoate (2b)

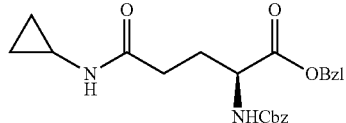

Compound 2b (2.0 g, 92%) was prepared as a white solid from cyclopropylamine (0.75 mL, 10.76 mmol) following a procedure similar to that described for the preparation of compound 2a. $^1$H NMR (400 MHz, CDCl$_3$) δ 7.33 (m, 10H), 5.86 (brs, 1H), 5.62 (m, 1H), 5.22-5.11 (m, 2H), 5.10 (s, 2H), 4.37 (m, 1H), 2.66 (m, 1H), 2.27-2.08 (m, 3H), 1.97 (m, 1H), 0.77-0.66 (m, 2H), 0.46 (m, 2H). HRMS (ESI): m/z (M+Na)$^+$ calcd for C$_{23}$H$_{26}$N$_2$O$_5$Na: 433.1739, found: 433.1741.

(S)-2-amino-5-(cyclopropylamino)-5-oxopentanoic acid (3b)

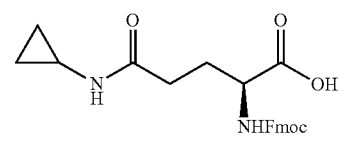

To a solution of compound 2b (2 g, 4.9 mmol) in THF/MeOH was added 10% Pd/C (200 mg), and the suspension was hydrogenated at room temperature for 3 h until the starting material was consumed. Then the mixture was dissolved with water and filtered, and the filtrate was concentrated and further lyophilized to give crude compound 3b (1.2 g). $^1$H NMR (400 MHz, DMSO) δ 3.11 (m, 1H), 2.60 (m, 1H), 2.19 (t, J=7.5 Hz, 2H), 1.86 (m, 2H), 0.58 (m, 2H), 0.37 (m, 2H). HRMS (ESI): m/z (M-H)$^-$ calcd for C$_8$H$_{13}$N$_2$O$_3$: 185.0926, found: 185.0942.

(S)-2-((((9H-fluoren-9-yl)methoxy)carbonyl)amino)-5-(cyclopropylamino)-5-oxopentanoic acid (4b)

Compound 4b (1.2 g, 60% yield for 2 steps) was prepared as a white solid from compound 3b (1.2 g) following a procedure similar to that described for the preparation of compound 4a. $^1$H NMR (400 MHz, DMSO) δ 7.89 (m, 3H), 7.73 (d, J=7.4 Hz, 2H), 7.60 (d, J=8.0 Hz, 1H), 7.42 (t, J=7.3 Hz, 2H), 7.33 (t, J=7.4 Hz, 2H), 4.33-4.14 (m, 3H), 3.92 (m, 1H), 2.58 (m, 1H), 2.12 (t, J=7.6 Hz, 2H), 1.97 (m, 1H), 1.76 (m, 1H), 0.62-0.50 (m, 2H), 0.41-0.31 (m, 2H). HRMS (ESI): m/z (M-H)$^-$ calcd for C$_{23}$H$_{23}$N$_2$O$_5$: 407.1607, found: 407.1541.

N-cyclopropyl-3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)propanamide (K12)

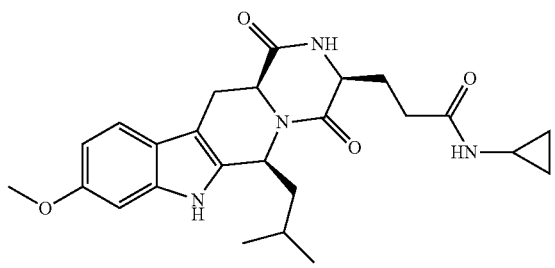

To a solution of compound 5 (158 mg, 0.5 mmol) in N-methylpyrrolidone was added compound 4b (306 mg, 0.75 mmol), DIEA (131 µL, 0.75 mmol) and CIP (140 mg, 0.5 mmol). The reaction mixture was stirred at room temperature for 24 hours. Second and third portions of compound 4b, DIEA and CIP were each added after 24 hours and the mixture was stirred for an additional 24 hours. After 4 days, the reaction was monitored by TLC until most of starting material was consumed. Then the resulting mixture was diluted with water and extracted with EtOAc. The organic phases were washed with brine, dried over MgSO$_4$ and concentrated. The residue was purified by silica gel chromatography (PE/EtOAc=1:1) to afford (1S,3S)-methyl 2-((S)-2-((((9H-fluoren-9-yl)methoxy)carbonyl)amino)-5-(cyclopropylamino)-5-oxopentanoyl)-1-isobutyl-7-methoxy-2,3,4,9-tetrahydro-1H-pyrido[3,4-b]indole-3-carboxylate (6b, 130 mg crude) as a light yellow solid. HRMS (ESI): m/z (M+H)$^+$ calcd for C$_{25}$H$_{32}$N$_4$O$_4$: 707.3445, found: 707.3452.

120 mg of the above compound 6b (0.17 mmol) was dissolved in THF, and piperidine (0.3 mL) was added. The mixture was stirred overnight at room temperature. The resulting mixture was concentrated, and the crude was dissolved in EtOAc. The organic phases were washed with brine, dried over MgSO$_4$ and concentrated. The residue was purified by silica gel chromatography (PE/EtOAc=2:1) to afford K12 (40 mg, 52%) as a white solid. $^1$H NMR (400 MHz, CDCl$_3$, ca 4:1 mixture of atropisomers) δ 7.90 (s, 0.8H), 7.85 (s, 0.2H), 7.60 (s, 0.2H), 7.51 (s, 0.8H), 7.44 (d, J=8.6 Hz, 1H), 6.89 (d, J=1.8 Hz, 1H), 6.83 (dd, J=8.7, 2.2 Hz, 1H), 5.89 (brs, 0.2H), 5.80 (brs, 0.8H), 5.44 (m, 1H), 4.02 (m, 2H), 3.85 (s, 3H), 3.52 (dd, J=15.8, 4.9 Hz, 1H), 3.04 (dd, J=15.7, 11.6 Hz, 1H), 2.78-2.68 (m, 1H), 2.40 (m, 2H), 2.30 (m, 1H), 1.71 (m, 1H), 1.54 (m, 2H), 1.06 (m, 3H), 0.87-0.75 (m, 5H), 0.60 (m, 0.4H), 0.52 (m, 1.6H). HRMS (ESI): m/z (M+H)$^+$ calcd for C$_{25}$H$_{32}$N$_4$O$_4$: 453.2502, found: 453.2508.

(S)-benzyl 2-(((benzyloxy)carbonyl)amino)-5-(cyclohexylamino)-5-oxopentanoate (2c)

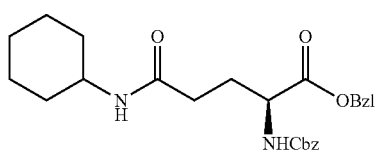

Compound 2c (2.14 g, 87%) was prepared as a white solid from cyclohexylamine (1.22 mL, 10.76 mmol) following a procedure similar to that described for the preparation of compound 2a. $^1$H NMR (400 MHz, CDCl$_3$) δ 7.44-7.32 (m, 10H), 5.71 (d, J=7.8 Hz, 1H), 5.58 (d, J=7.0 Hz, 1H), 5.25-5.14 (m, 2H), 5.13 (s, 2H), 4.41 (m, 1H), 3.81-3.68 (m, 1H), 2.28-2.13 (m, 3H), 2.07-1.97 (m, 1H), 1.89 (d, J=12.1 Hz, 2H), 1.76-1.62 (m, 3H), 1.44-1.27 (m, 2H), 1.23-1.01 (m, 3H). HRMS (ESI): m/z (M+Na)$^+$ calcd for C$_{26}$H$_{32}$N$_2$O$_5$Na: 475.2209, found: 475.2202.

(S)-2-amino-5-(cyclohexylamino)-5-oxopentanoic acid (3c)

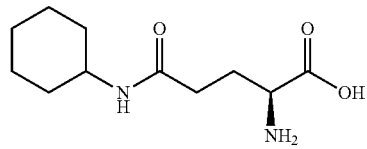

Compound 3c (1.06 g, 98%) was prepared as a white solid from compound 2c (2.14 g, 4.7 mmol) following a procedure similar to that described for the preparation of compound 3b. $^1$H NMR (400 MHz, D$_2$O) δ 3.64 (t, J=6.1 Hz, 1H), 3.49 (m, 1H), 2.35-2.21 (m, 2H), 2.02 (m, 2H), 1.72 (m, 2H), 1.68-1.57 (m, 2H), 1.51 (m, 1H), 1.31-1.01 (m, 5H). HRMS (ESI): m/z (M–H)$^-$ calcd for C$_{11}$H$_{19}$N$_2$O$_3$: 227.1396, found: 227.1402.

(S)-2-((((9H-fluoren-9-yl)methoxy)carbonyl)amino)-5-(cyclohexylamino)-5-oxopentanoic acid (4c)

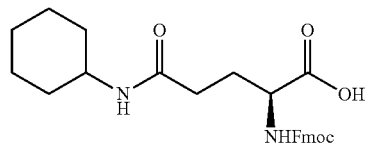

Compound 4c (2.09 g, 93%) was prepared as a white solid from compound 3c (1.05 g, 4.6 mmol) following a procedure similar to that described for the preparation of compound 4a. $^1$H NMR (400 MHz, DMSO) δ 12.57 (brs, 1H), 7.89 (d, J=7.5 Hz, 2H), 7.73 (d, J=7.4 Hz, 2H), 7.66 (t, J=8.1 Hz, 2H), 7.42 (dt, J=7.5, 3.8 Hz, 2H), 7.33 (t, J=7.5 Hz, 2H), 4.31-4.15 (m, 3H), 3.94 (m, 1H), 3.50 (d, J=7.4 Hz, 1H), 2.15 (t, J=7.6 Hz, 2H), 2.02-1.92 (m, 1H), 1.73 (m, 5H), 1.53 (m, 1H), 1.24 (m, 2H), 1.10 (m, 3H). HRMS (ESI): m/z (M–H)$^-$ calcd for C$_{26}$H$_{29}$N$_2$O$_5$: 449.2076, found: 449.2077.

N-cyclohexyl-3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)propanamide (K14)

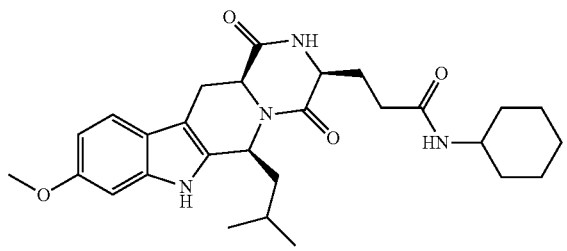

K14 (73 mg, 30%) was prepared as a light gray solid from compound 4c (1.01 g, 2.25 mmol) following a procedure similar to that described for the preparation of K12. $^1$H NMR (400 MHz, CDCl$_3$) δ 8.45 (brs, 1H), 7.83 (brs, 1H), 7.41 (d, J=8.7 Hz, 1H), 6.89 (d, J=2.1 Hz, 1H), 6.81 (dd, J=8.6, 2.0 Hz, 1H), 5.88 (brs, 1H), 5.52-5.43 (m, 1H), 4.06-3.93 (m, 2H), 3.84 (s, 3H), 3.83-3.72 (m, 1H), 3.51 (dd, J=15.8, 4.9 Hz, 1H), 3.04 (dd, J=15.7, 11.7 Hz, 1H), 2.51-2.24 (m, 4H), 1.97-1.87 (m, 2H), 1.77-1.66 (m, 3H), 1.58 (m, 3H), 1.36 (m, 2H), 1.23-1.09 (m, 3H), 1.03 (d, J=6.2 Hz, 3H), 0.81 (d, J=6.3 Hz, 3H). HRMS (ESI): m/z (M+H)$^+$ calcd for C$_{28}$H$_{39}$N$_4$O$_4$: 495.2971, found: 495.2969.

3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)-N,N-dimethylpropanamide (K18)

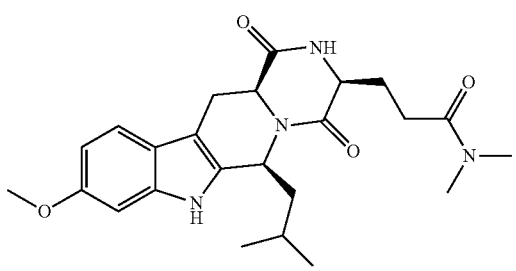

K18 was prepared as a white solid following a procedure similar to that described for the preparation of K12. $^1$H NMR (400 MHz, CDCl$_3$) δ 8.02 (s, 1H), 7.82 (s, 1H), 7.43 (d, J=8.5 Hz, 1H), 6.88 (d, J=2.0 Hz, 1H), 6.82 (dd, J=8.6, 2.0 Hz, 1H), 5.45 (m, 1H), 4.00 (m, 2H), 3.84 (s, 3H), 3.50 (dd, J=15.9, 5.0 Hz, 1H), 3.08-3.00 (m, 1H), 3.00 (s, 3H), 2.98 (s, 3H), 2.56 (m, 3H), 2.34 (m, 1H), 1.77-1.68 (m, 1H), 1.60-1.49 (m, 2H), 1.06 (d, J=6.4 Hz, 3H), 0.83 (d, J=6.3 Hz, 3H). HRMS (ESI): m/z (M+H)$^+$ calcd for C$_{24}$H$_{33}$N$_4$O$_4$: 441.2502, found: 441.2499.

(S)-benzyl 2-(((benzyloxy)carbonyl)amino)-5-oxo-5-(phenylamino)pentanoate (2d)

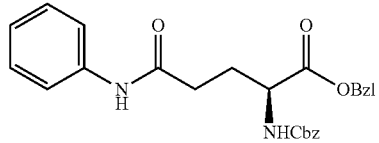

Compound 2d (2.2 g, 93%) was prepared as a white solid from aniline (0.98 mL, 10.76 mmol) following a procedure similar to that described for the preparation of compound 2a. $^1$H NMR (400 MHz, CDCl$_3$) δ 7.94 (brs, 1H), 7.53 (d, J=7.9 Hz, 2H), 7.39-7.28 (m, 12H), 7.10 (t, J=7.4 Hz, 1H), 5.63 (d, J=7.6 Hz, 1H), 5.22-5.13 (m, 2H), 5.09 (m, 2H), 4.47 (m, 1H), 2.37 (m, 3H), 2.03 (m, 1H). HRMS (ESI): m/z (M+Na)$^+$ calcd for C$_{26}$H$_{26}$N$_2$O$_5$Na: 469.1739, found: 469.1734.

(S)-2-amino-5-oxo-5-(phenylamino)pentanoic acid (3d)

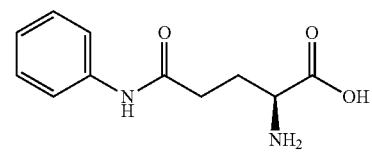

Compound 3d (1.08 g, 99%) was prepared as a white solid from compound 2d (2.2 g, 5.0 mmol) following a procedure similar to that described for the preparation of compound 3b $^1$H NMR (400 MHz, DMSO) δ 7.56 (d, J=7.7 Hz, 2H), 7.26 (t, J=7.9 Hz, 2H), 7.00 (t, J=7.4 Hz, 1H), 3.15 (m, 1H), 2.35 (s, 2H), 1.82 (m, 2H). HRMS (ESI): m/z (M−H)$^−$ calcd for C$_{11}$H$_{13}$N$_2$O$_3$: 221.0926, found: 221.0936.

(S)-2-((((9H-fluoren-9-yl)methoxy)carbonyl)amino)-5-oxo-5-(phenylamino)pentanoic acid (4d)

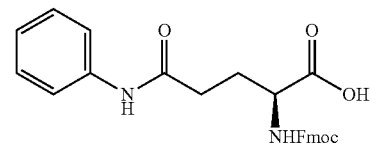

Compound 4d (1.88 g, 86%) was prepared as a light yellow solid from compound 3d (1.08 g, 4.9 mmol) following a procedure similar to that described for the preparation of compound 4a. $^1$H NMR (400 MHz, DMSO) δ 10.01 (s, 1H), 7.90 (d, J=7.4 Hz, 2H), 7.73 (d, J=7.5 Hz, 2H), 7.59 (d, J=7.9 Hz, 2H), 7.42 (t, J=7.3 Hz, 2H), 7.31 (m, 4H), 7.02 (t, J=7.4 Hz, 1H), 4.25 (m, 3H), 3.96 (m, 1H), 2.42 (t, J=7.6 Hz, 2H), 2.15-2.04 (m, 1H), 1.89 (m, 1H). HRMS (ESI): m/z (M−H)$^−$ calcd for C$_{26}$H$_{23}$N$_2$O$_5$: 443.1607, found: 443.1604.

3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)-N-phenylpropanamide (K19)

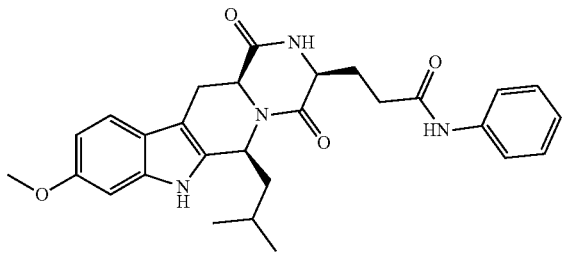

K19 (45 mg, 18%) was prepared as a light yellow solid from compound 4d (0.99 g, 2.25 mmol) following a procedure similar to that described for the preparation of K12. $^1$H NMR (400 MHz, CDCl$_3$) δ 9.55 (s, 1H), 7.52 (d, J=8.1 Hz, 2H), 7.38 (d, J=8.6 Hz, 1H), 7.29 (d, J=8.2 Hz, 2H), 7.12-7.03 (m, 1H), 6.87 (d, J=2.1 Hz, 1H), 6.76 (dd, J=8.5, 2.0 Hz, 1H), 5.46-5.36 (m, 1H), 3.99 (m, 2H), 3.82 (s, 3H), 3.47 (dd, J=15.6, 4.7 Hz, 1H), 3.39 (m, 1H), 3.05-2.92 (dd, J=15.6, 11.7 Hz, 1H), 2.52 (m, 2H), 2.39-2.26 (m, 2H), 1.65 (m, 1H), 1.60-1.46 (m, 2H), 1.01 (d, J=6.1 Hz, 3H), 0.77 (d, J=6.1 Hz, 3H). HRMS (ESI): m/z (M+H)$^+$ calcd for C$_{28}$H$_{33}$N$_4$O$_4$: 489.2502, found: 489.2481.

(S)-benzyl 2-(((benzyloxy)carbonyl)amino)-5-oxo-5-(pyrrolidin-1-yl)pentanoate (2e)

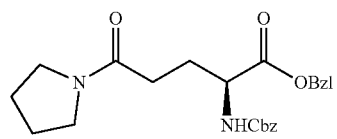

Compound 2e (2.3 g, 100%) was prepared as a colorless oil from pyrrolidine (0.88 mL, 10.76 mmol) following a procedure similar to that described for the preparation of compound 2a. $^1$H NMR (400 MHz, CDCl$_3$) δ 7.40-7.28 (m, 10H), 6.04 (d, J=7.4 Hz, 1H), 5.22-5.03 (m, 4H), 4.39 (m, 1H), 3.41 (t, J=6.7 Hz, 2H), 3.22 (t, J=6.6 Hz, 2H), 2.36-2.17 (m, 3H), 2.15-2.02 (m, 1H), 1.93-1.75 (m, 4H). HRMS (ESI): m/z (M+H)$^+$ calcd for C$_{24}$H$_{29}$N$_2$O$_5$: 425.2076, found: 425.2076.

(S)-2-amino-5-oxo-5-(pyrrolidin-1-yl)pentanoic acid (3e)

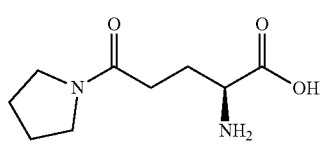

Compound 3e (1.07 g, 98%) was prepared as a white solid from compound 2e (2.3 g, 5.4 mmol) following a procedure similar to that described for the preparation of compound 3a. $^1$H NMR (400 MHz, MeOD) δ 3.61 (t, J=5.8 Hz, 1H), 3.53-3.44 (m, 2H), 3.42 (t, J=6.9 Hz, 2H), 2.61-2.54 (m, 2H), 2.16-2.09 (m, 2H), 2.02-1.93 (m, 2H), 1.92-1.83 (m, 2H). HRMS (ESI): m/z (M–H)$^-$ calcd for C$_9$H$_{15}$N$_2$O$_3$: 199.1083, found: 199.1049.

(S)-2-((((9H-fluoren-9-yl)methoxy)carbonyl)amino)-5-oxo-5-(pyrrolidin-1-yl)pentanoic acid (4e)

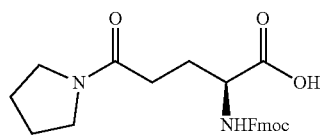

Compound 4e (1.76 g, 78%) was prepared as a white solid from compound 3e (1.07 g, 5.34 mmol) following a procedure similar to that described for the preparation of compound 4a. $^1$H NMR (400 MHz, DMSO) δ 7.90 (d, J=7.5 Hz, 2H), 7.72 (dd, J=7.1, 4.8 Hz, 2H), 7.66 (d, J=7.8 Hz, 1H), 7.42 (t, J=7.4 Hz, 2H), 7.32 (t, J=7.4 Hz, 2H), 4.32-4.16 (m, 3H), 3.98 (m, 1H), 3.42-3.29 (m, 4H), 2.40-2.21 (m, 2H), 2.00 (m, 1H), 1.88-1.69 (m, 5H). HRMS (ESI): m/z (M–H)$^-$ calcd for C$_{24}$H$_{25}$N$_2$O$_5$: 421.1763, found: 421.1749.

(3S,6S,12aS)-6-isobutyl-9-methoxy-3-(3-oxo-3-(pyrrolidin-1-yl)propyl)-2,3,12,12a-tetrahydropyrazino[1',2':1,6]pyrido[3,4-b]indole-1,4(6H,7H)-dione (K20)

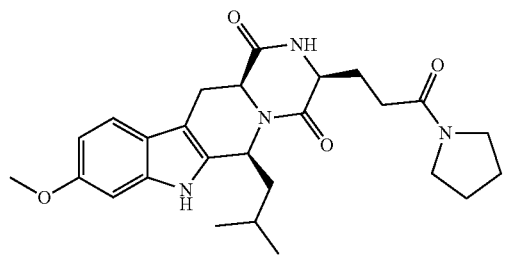

K20 (92 mg, 40%) was prepared as a white solid from Compound 4e (0.95 g, 2.25 mmol) following a procedure similar to that described for the preparation of K12. $^1$H NMR (400 MHz, CDCl$_3$) δ 8.08 (s, 2H), 7.42 (d, J=8.6 Hz, 1H), 6.88 (d, J=2.1 Hz, 1H), 6.82 (dd, J=8.6, 2.2 Hz, 1H), 5.45 (m, 1H), 4.00 (m, 2H), 3.84 (s, 3H), 3.54-3.44 (m, 3H), 3.38 (m, 2H), 3.04 (dd, J=15.8, 11.7 Hz, 1H), 2.61-2.43 (m, 3H), 2.40-2.27 (m, 1H), 2.02-1.92 (m, 2H), 1.91-1.81 (m, 2H), 1.77-1.68 (m, 1H), 1.60-1.47 (m, 2H), 1.06 (d, J=6.4 Hz, 3H), 0.82 (d, J=6.3 Hz, 3H). HRMS (ESI): m/z (M+H)$^+$ calcd for C$_{26}$H$_{35}$N$_4$O$_4$: 467.2658, found: 467.2629.

N,N-diethyl-3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)propanamide (K21)

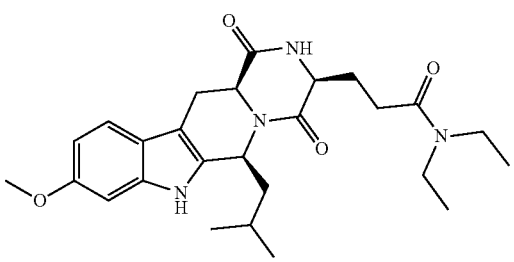

K21

K21 was prepared as a light yellow solid following a procedure similar to that described for the preparation of K12. $^1$H NMR (400 MHz, CDCl$_3$) δ 8.00 (s, 1H), 7.87 (s, 1H), 7.43 (d, J=8.6 Hz, 1H), 6.88 (d, J=1.8 Hz, 1H), 6.82 (dd, J=8.6, 2.0 Hz, 1H), 5.46 (m, 1H), 3.99 (m, 2H), 3.84 (s, 3H), 3.50 (dd, J=15.8, 4.9 Hz, 1H), 3.40 (m, 2H), 3.31 (m, 2H), 3.04 (dd, J=15.7, 11.7 Hz, 1H), 2.66-2.44 (m, 3H), 2.38-2.28 (m, 1H), 1.72 (m, 1H), 1.60-1.48 (m, 2H), 1.15 (m, 6H), 1.06 (d, J=6.3 Hz, 3H), 0.82 (d, J=6.3 Hz, 3H). HRMS (ESI): m/z (M+H)$^+$ calcd for C$_{26}$H$_{37}$N$_4$O$_4$: 469.2815, found: 469.2802.

(S)-benzyl 2-(((benzyloxy)carbonyl)amino)-5-oxo-5-(piperidin-1-yl)pentanoate (2f)

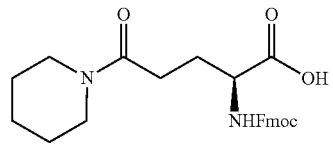

2f

Compound 2f (2.2 g, 93%) was prepared as a colorless oil from piperidine (0.98 mL, 10.76 mmol) following a procedure similar to that described for the preparation of compound 2a. $^1$H NMR (400 MHz, CDCl$_3$) δ 7.39-7.28 (m, 10H), 5.85 (d, J=7.6 Hz, 1H), 5.22-5.13 (m, 2H), 5.13-5.04 (m, 2H), 4.40 (m, 1H), 3.53-3.45 (m, 2H), 3.27-3.18 (m, 2H), 2.40-2.16 (m, 3H), 2.11-2.04 (m, 1H), 1.60 (m, 2H), 1.49 (m, 4H). HRMS (ESI): m/z (M+H)$^+$ calcd for C$_{25}$H$_{31}$N$_2$O$_5$: 439.2233, found: 439.2239.

(S)-2-amino-5-oxo-5-(piperidin-1-yl)pentanoic acid (3f)

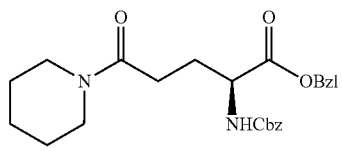

3f

Compound 3f (1.02 g, 95%) was prepared as a white solid from compound 2f (2.2 g, 5.0 mmol) following a procedure similar to that described for the preparation of compound 3a. $^1$H NMR (400 MHz, DMSO) δ 3.46-3.36 (m, 5H), 3.21-3.13 (m, 2H), 2.39 (m, 2H), 1.94-1.75 (m, 2H), 1.57 (m, 2H), 1.48 (m, 2H), 1.40 (m, 2H). HRMS (ESI): m/z (M−H)$^−$ calcd for C$_{10}$H$_{17}$N$_2$O$_3$: 213.1239, found: 213.1227.

(S)-2-((((9H-fluoren-9-yl)methoxy)carbonyl)amino)-5-oxo-5-(piperidin-1-yl)pentanoic acid (4f)

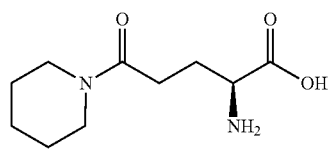

4f

Compound 4f (1.82 g, 88%) was prepared as a white solid from compound 3f (1.02 g, 4.76 mmol) following a procedure similar to that described for the preparation of compound 4a. $^1$H NMR (400 MHz, DMSO) δ 7.90 (d, J=7.4 Hz, 2H), 7.72 (m, 2H), 7.64 (m, 1H), 7.47-7.36 (t, J=7.2 Hz, 2H), 7.33 (t, J=7.2 Hz, 2H), 4.33-4.14 (m, 3H), 4.01 (m, 1H), 3.41 (m, 4H), 2.36 (m, 2H), 1.97 (m, 1H), 1.81 (m, 1H), 1.55 (m, 2H), 1.42 (m, 4H). HRMS (ESI): m/z (M−H)$^−$ calcd for C$_{25}$H$_{27}$N$_2$O$_5$: 435.1920, found: 435.1913.

(3S,6S,12aS)-6-isobutyl-9-methoxy-3-(3-oxo-3-(piperidin-1-yl)propyl)-2,3,12,12a-tetrahydropyrazino[1',2':1,6]pyrido[3,4-b]indole-1,4(6H,7H)-dione (K24)

K24

K24 (42 mg, 18%) was prepared as a white solid from compound 4f (0.97 g, 2.25 mmol) following a procedure similar to that described for the preparation of K12. $^1$H NMR (400 MHz, CDCl$_3$) δ 7.97 (s, 1H), 7.79 (s, 1H), 7.43 (d, J=8.6 Hz, 1H), 6.88 (d, J=2.1 Hz, 1H), 6.82 (dd, J=8.6, 2.2 Hz, 1H), 5.45 (dd, J=9.2, 4.2 Hz, 1H), 4.03-3.95 (m, 2H), 3.84 (s, 3H), 3.64-3.54 (m, 2H), 3.51 (dd, J=15.9, 5.0 Hz, 1H), 3.43-3.37 (m, 2H), 3.04 (dd, J=15.8, 11.7 Hz, 1H), 2.64-2.45 (m, 3H), 2.31 (m, 1H), 1.73 (m, 1H), 1.67-1.60 (m, 2H), 1.60-1.48 (m, 6H), 1.06 (d, J=6.5 Hz, 3H), 0.83 (d, J=6.4 Hz, 3H). HRMS (ESI): m/z (M+H)$^+$ calcd for C$_{27}$H$_{37}$N$_4$O$_4$: 481.2815, found: 481.2817.

(S)-benzyl 2-(((benzyloxy)carbonyl)amino)-5-morpholino-5-oxopentanoate (2 g)

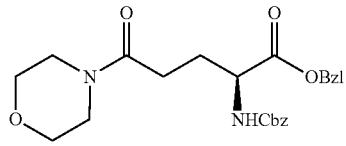

Compound 2g (2 g, 84%) was prepared as a light yellow solid from morpholine (0.94 mL, 10.76 mmol) following a procedure similar to that described for the preparation of compound 2a. $^1$H NMR (400 MHz, CDCl$_3$) δ 7.39-7.29 (m, 10H), 5.71 (d, J=7.6 Hz, 1H), 5.24-5.04 (m, 4H), 4.46-4.37 (m, 1H), 3.64-3.59 (m, 2H), 3.56 (m, 4H), 3.27 (m, 2H), 2.39-2.18 (m, 3H), 2.04 (m, 1H). HRMS (ESI): m/z (M+H)$^+$ calcd for C$_{24}$H$_{29}$N$_2$O$_6$: 441.2026, found: 441.2032.

(S)-2-amino-5-morpholino-5-oxopentanoic acid (3 g)

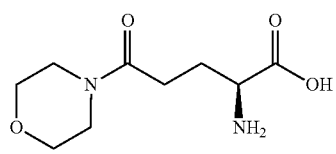

Compound 3g (0.98 g, 99%) was prepared as a white solid from compound 2g (2 g, 4.54 mmol) following a procedure similar to that described for the preparation of compound 3a. $^1$H NMR (400 MHz, DMSO) δ 3.77-3.17 (m, 10H), 2.45 (m, 1H), 2.01-1.76 (m, 2H). HRMS (ESI): m/z (M−H)$^−$ calcd for C$_9$H$_{15}$N$_2$O$_4$: 215.1032, found: 215.1031.

(S)-2-((((9H-fluoren-9-yl)methoxy)carbonyl)amino)-5-morpholino-5-oxopentanoic acid (4 g)

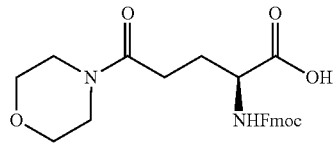

Compound 4g (1.57 g, 79%) was prepared as a white solid from compound 3g (0.98 g, 4.53 mmol) following a procedure similar to that described for the preparation of compound 4a. $^1$H NMR (400 MHz, DMSO) δ 12.59 (brs, 1H), 7.97-7.87 (m, 2H), 7.73 (m, 2H), 7.66 (m, 1H), 7.49-7.39 (m, 2H), 7.34 (m, 2H), 5.77 (m, 1H), 4.27 (m, 3H), 4.01 (m, 1H), 3.48-3.30 (m, 7H), 2.55 (m, 1H), 2.39 (m, 2H), 2.00 (m, 1H), 1.89-1.73 (m, 1H). HRMS (ESI): m/z (M−H)$^−$ calcd for C$_{24}$H$_{25}$N$_2$O$_6$: 437.1713, found: 437.1725.

(3S,6S,12aS)-6-isobutyl-9-methoxy-3-(3-morpholino-3-oxopropyl)-2,3,12,12a-tetrahydropyrazino[1',2':1,6]pyrido[3,4-b]indole-1,4(6H,7H)-dione (K22)

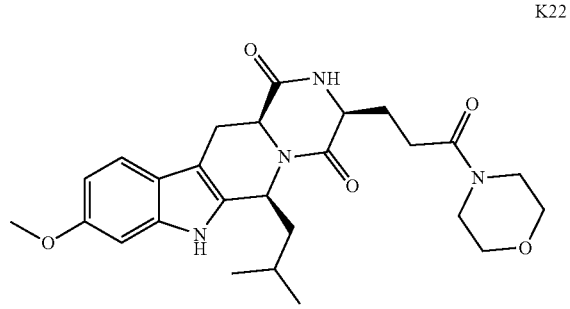 [SMILES: COc1ccc2c3c([nH]c2c1)[C@H](CC(C)C)N1C(=O)[C@H](CCC(=O)N2CCOCC2)NC(=O)[C@@H]1C3]

K22 (48 mg, 20%) was prepared as a white solid from Compound 4g (0.99 g, 2.25 mmol) following a procedure similar to that described for the preparation of K12. $^1$H NMR (400 MHz, CDCl$_3$) δ 8.00 (s, 1H), 7.62 (s, 1H), 7.43 (d, J=8.6 Hz, 1H), 6.88 (d, J=1.9 Hz, 1H), 6.83 (dd, J=8.6, 2.1 Hz, 1H), 5.44 (dd, J=9.3, 4.1 Hz, 1H), 4.01 (m, 2H), 3.84 (s, 3H), 3.73-3.61 (m, 6H), 3.55-3.43 (m, 3H), 3.04 (dd, J=15.7, 11.8 Hz, 1H), 2.67-2.43 (m, 3H), 2.34 (m, 1H), 1.78-1.72 (m, 1H), 1.60-1.48 (m, 2H), 1.06 (d, J=6.4 Hz, 3H), 0.82 (d, J=6.3 Hz, 3H). HRMS (ESI): m/z (M+H)$^+$ calcd for C$_{26}$H$_{35}$N$_4$O$_5$: 483.2607, found: 483.2609.

N-cyclohexyl-3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)-N-methylpropanamide (K26)

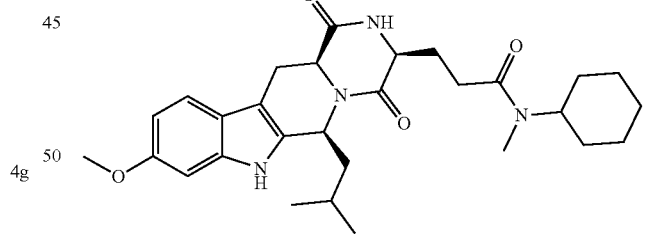

K26 was prepared as a white solid following a procedure similar to that described for the preparation of K12. $^1$H NMR (400 MHz, CDCl$_3$, around 1:1 mixture of atropisomers) δ 7.98 (s, 1H), 7.88 (s, 1H), 7.43 (d, J=8.6 Hz, 1H), 6.88 (d, J=2.1 Hz, 1H), 6.82 (dd, J=8.6, 2.2 Hz, 1H), 5.46 (dd, J=9.4, 4.6 Hz, 1H), 4.50-4.40 (m, 0.5H), 4.04-3.94 (m, 2H), 3.84 (s, 3H), 3.61-3.54 (m, 0.5H), 3.50 (dd, J=15.9, 5.0 Hz, 1H), 3.04 (dd, J=15.8, 11.7 Hz, 1H), 2.84 (s, 1.5H) 2.83 (s, 1.5H), 2.70-2.44 (m, 3H), 2.39-2.26 (m, 1H), 1.90-1.23 (m, 12H), 1.15 (m, 1H), 1.06 (d, J=6.4 Hz, 3H), 0.83 (d, J=6.2 Hz, 3H). HRMS (ESI): m/z (M+H)$^+$ calcd for C$_{29}$H$_{41}$N$_4$O$_4$: 509.3128, found: 509.3125.

3-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)-N-isopropylpropanamide (K34)

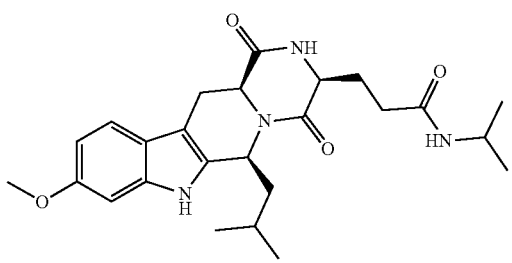

K34 was prepared as a light yellow solid following a procedure similar to that described for the preparation of K12. $^1$H NMR (400 MHz, CDCl$_3$) δ 8.17 (s, 1H), 7.76 (s, 1H), 7.42 (d, J=8.6 Hz, 1H), 6.89 (d, J=2.0 Hz, 1H), 6.82 (dd, J=8.6, 2.2 Hz, 1H), 5.66 (d, J=7.9 Hz, 1H), 5.47 (dd, J=9.2, 4.1 Hz, 1H), 4.13-4.07 (m, 1H), 4.06-3.96 (m, 2H), 3.85 (s, 3H), 3.51 (dd, J=15.8, 5.0 Hz, 1H), 3.04 (dd, J=15.6, 11.7 Hz, 1H), 2.48-2.23 (m, 4H), 1.74-1.65 (m, 1H), 1.61-1.47 (m, 2H), 1.17 (d, J=6.6 Hz, 6H), 1.04 (d, J=6.5 Hz, 3H), 0.82 (d, J=6.4 Hz, 3H). HRMS (ESI): m/z (M+H)$^+$ calcd for C$_{25}$H$_{35}$N$_4$O$_4$: 455.2658, found: 455.2663.

benzyl 2-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)acetate (K16)

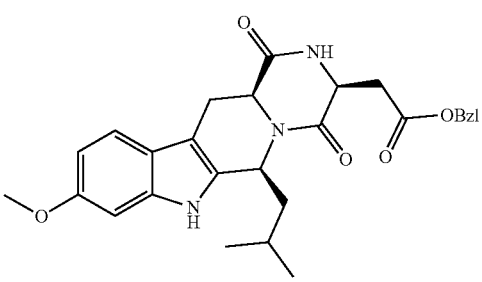

K16 (1.1 g, 37%) was prepared as a white solid from Fmoc-Asp(OBzl)-OH (10.8 g, 27 mmol) following a procedure similar to that described for the preparation of K12. $^1$H NMR (400 MHz, CDCl$_3$) δ 7.91 (s, 1H), 7.47-7.30 (m, 6H), 6.89 (d, J=2.0 Hz, 1H), 6.83 (dd, J=8.8, 2.0 Hz, 1H), 6.78 (s, 1H), 5.42 (dd, J=8.9, 3.3 Hz, 1H), 5.25-5.14 (m, 2H), 4.41-4.32 (dd, J=8.7, 3.8 Hz, 1H), 4.06 (dd, J=11.6, 4.5 Hz, 1H), 3.85 (s, 3H), 3.55 (dd, J=15.9, 4.6 Hz, 1H), 3.36 (dd, J=17.2, 3.9 Hz, 1H), 2.99 (dd, J=15.6, 11.7 Hz, 1H), 2.78 (dd, J=17.3, 9.3 Hz, 1H), 1.75 (m, 1H), 1.54 (m, 2H), 1.04 (d, J=6.2 Hz, 3H), 0.81 (d, J=6.1 Hz, 3H). HRMS (ESI): m/z (M+H)$^+$ calcd for C$_{28}$H$_{32}$N$_3$O$_5$: 490.2342, found: 490.2345.

2-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)acetic acid (K17)

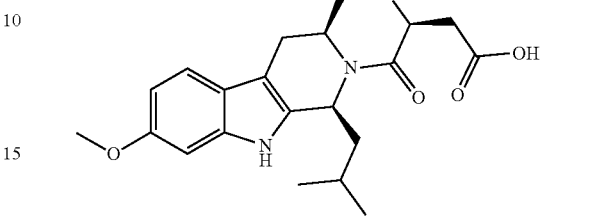

K17 (750 mg, 96%) was prepared as a light gray solid from K16 (950 mg, 4.33 mmol) following a procedure similar to that described for the preparation of compound 3a. $^1$H NMR (400 MHz, MeOD) δ 10.46 (brs, 1H), 7.40 (d, J=8.7 Hz, 1H), 6.92 (s, 1H), 6.74 (dd, J=8.9, 2.0 Hz, 1H), 5.44 (m, 1H), 4.42 (m, 1H), 4.23 (m, 1H), 3.83 (s, 3H), 3.66 (brs, 1H), 3.48 (dd, J=15.2, 4.5 Hz, 1H), 3.09-2.80 (m, 4H), 1.75 (m, 1H), 1.61 (m, 2H), 1.01 (d, J=6.1 Hz, 3H), 0.83 (d, J=6.3 Hz, 3H). HRMS (ESI): m/z (M+H)$^+$ calcd for C$_{21}$H$_{26}$N$_3$O$_5$: 400.1872, found: 400.1877.

N-(tert-butyl)-2-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)acetamide (K3)

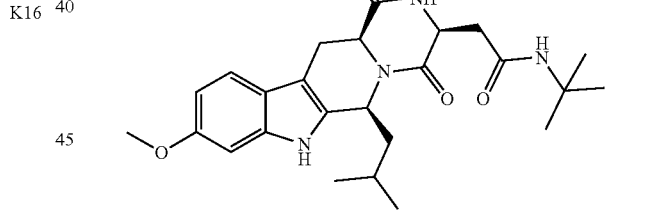

To a solution of K17 (105 mg, 0.26 mmol) in CH$_2$Cl$_2$ was added EDCI (100 mg, 0.52 mmol), HOBt (70 mg, 0.52 mmol) and tert-butylamine (55 μL, 0.52 mmol). The mixture was stirred overnight at room temperature. Then the resulting mixture was quenched with saturated aqueous NaHCO$_3$, and extracted with CH$_2$Cl$_2$. The combined organic phases were washed with brine, dried over MgSO$_4$ and concentrated. The residue was purified by silica gel chromatography (CH$_2$Cl$_2$/MeOH=40:1) to afford K3 (48 mg, 40%) as a white solid. $^1$H NMR (400 MHz, CDCl$_3$) δ 7.94 (s, 1H), 7.43 (d, J=8.6 Hz, 1H), 7.10 (s, 1H), 6.88 (d, J=2.0 Hz, 1H), 6.83 (dd, J=8.8, 2.0 Hz, 1H), 5.82 (s, 1H), 5.48-5.39 (m, 1H), 4.27 (dd, J=9.4, 4.9 Hz, 1H), 4.04 (dd, J=11.2, 4.2 Hz, 1H), 3.85 (s, 3H), 3.55 (dd, J=15.8, 4.7 Hz, 1H), 2.97 (m, 2H), 2.63 (dd, J=15.0, 8.6 Hz, 1H), 1.72 (m, 1H), 1.61-1.47 (m, 2H), 1.35 (s, 9H), 1.04 (d, J=6.3 Hz, 3H), 0.82 (d, J=6.2 Hz, 3H). HRMS (ESI): m/z (M+H)$^+$ calcd for C$_{25}$H$_{35}$N$_4$O$_4$: 455.2658, found: 455.2657.

2-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)-N-isopropylacetamide (K31)

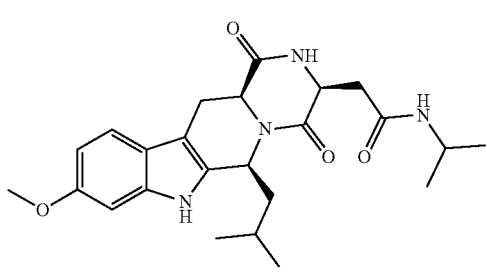

K31 (50 mg, 44%) was prepared as a white solid from isopropylamine hydrochloride (50 mg, 0.52 mmol) following a procedure similar to that described for the preparation of K3. $^1$H NMR (400 MHz, CDCl$_3$) δ 7.92 (s, 1H), 7.43 (d, J=8.6 Hz, 1H), 7.11 (s, 1H), 6.89 (d, J=2.0 Hz, 1H), 6.83 (dd, J=8.6, 2.0 Hz, 1H), 5.85 (d, J=7.6 Hz, 1H), 5.42 (dd, J=9.2, 4.0 Hz, 1H), 4.28 (dd, J=8.5, 3.8 Hz, 1H), 4.12-4.01 (m, 2H), 3.85 (s, 3H), 3.55 (dd, J=15.8, 4.9 Hz, 1H), 2.99 (m, 2H), 2.66 (dd, J=15.1, 8.5 Hz, 1H), 1.72 (m, 1H), 1.60-1.48 (m, 2H), 1.17 (m, 6H), 1.05 (d, J=6.4 Hz, 3H), 0.81 (d, J=6.4 Hz, 3H). HRMS (ESI): m/z (M+H)$^+$ calcd for C$_{24}$H$_{33}$N$_4$O$_4$: 441.2502, found: 441.2507.

N-cyclohexyl-2-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)acetamide (K23)

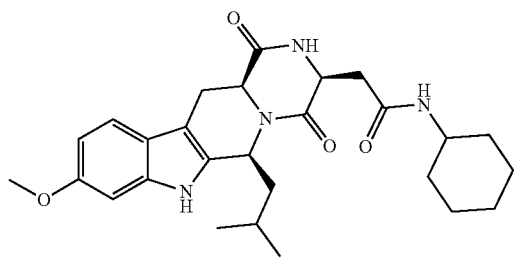

K23 (55 mg, 44%) was prepared as a light gray solid from cyclohexylamine (60 µL, 0.52 mmol) following a procedure similar to that described for the preparation of K3. $^1$H NMR (400 MHz, CDCl$_3$) δ 8.04 (s, 1H), 7.42 (d, J=8.6 Hz, 1H), 7.19 (s, 1H), 6.88 (d, J=2.1 Hz, 1H), 6.82 (dd, J=8.6, 2.2 Hz, 1H), 6.03 (d, J=8.2 Hz, 1H), 5.42 (dd, J=9.2, 4.0 Hz, 1H), 4.28 (dd, J=8.0, 4.0 Hz, 1H), 4.03 (dd, J=11.7, 4.7 Hz, 1H), 3.84 (s, 3H), 3.81-3.69 (m, 1H), 3.54 (dd, J=15.8, 4.8 Hz, 1H), 3.05-2.94 (m, 2H), 2.68 (dd, J=15.0, 8.2 Hz, 1H), 1.90 (m, 2H), 1.78-1.65 (m, 3H), 1.65-1.48 (m, 3H), 1.36 (m, 2H), 1.17 (m, 3H), 1.04 (d, J=6.4 Hz, 3H), 0.80 (d, J=6.3 Hz, 3H). HRMS (ESI): m/z (M+H)$^+$ calcd for C$_{27}$H$_{37}$N$_4$O$_4$: 481.2815, found: 481.2814.

(3S,6S,12aS)-6-isobutyl-9-methoxy-3-(2-oxo-2-(piperidin-1-yl)ethyl)-2,3,12,12a-tetrahydropyrazino[1',2':1,6]pyrido[3,4-b]indole-1,4(6H,7H)-dione (K25)

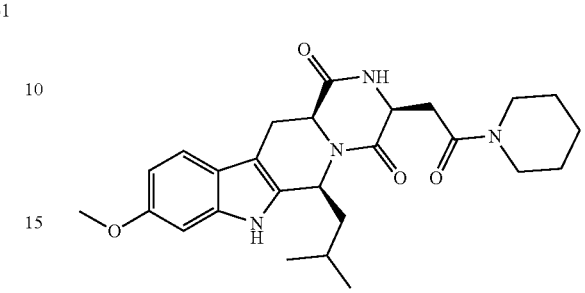

K25 (62 mg, 51%) was prepared as a white solid from piperidine (48 µL, 0.52 mmol) following a procedure similar to that described for the preparation of K3. $^1$H NMR (400 MHz, CDCl$_3$/d4-MeOD) δ 8.87 (s, 1H), 7.40 (d, J=8.5 Hz, 1H), 6.86 (d, J=1.1 Hz, 1H), 6.78 (dd, J=8.3, 1.5 Hz, 1H), 5.38 (dd, J=9.9, 4.1 Hz, 1H), 4.36 (d, J=9.7 Hz, 1H), 4.03 (dd, J=12.3, 4.8 Hz, 1H), 3.82 (s, 3H), 3.54 (m, 3H), 3.41 (m, 3H), 2.99-2.87 (dd, J=11.7, 15.52 Hz, 1H), 2.56 (dd, J=17.1, 10.6 Hz, 1H), 1.75-1.45 (m, 10H), 1.01 (d, J=6.1 Hz, 3H), 0.78 (d, J=6.3 Hz, 3H). HRMS (ESI): m/z (M+H)$^+$ calcd for C$_{26}$H$_{35}$N$_4$O$_4$: 467.2658, found: 467.2670.

N-benzyl-2-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)acetamide (K33)

K33

K33 (68 mg, 53%) was prepared as a white solid from benzylamine (57 µL, 0.52 mmol) following a procedure similar to that described for the preparation of K3. $^1$H NMR (400 MHz, CDCl$_3$) δ 7.94 (s, 1H), 7.45 (d, J=8.6 Hz, 1H), 7.39-7.33 (m, 2H), 7.32-7.26 (m, 3H), 7.17 (s, 1H), 6.91 (d, J=1.9 Hz, 1H), 6.86 (dd, J=8.7, 2.2 Hz, 1H), 6.45 (m, 1H), 5.46-5.37 (m, 1H), 4.47 (qd, J=14.8, 5.9 Hz, 2H), 4.34 (dd, J=8.0, 3.5 Hz, 1H), 4.05 (dd, J=11.7, 4.2 Hz, 1H), 3.87 (s, 3H), 3.56 (dd, J=15.8, 4.7 Hz, 1H), 3.06 (m, 2H), 2.75 (dd, J=15.1, 8.2 Hz, 1H), 1.65 (m, 1H), 1.52 (m, 2H), 1.04 (d, J=6.3 Hz, 3H), 0.81 (d, J=6.3 Hz, 3H). HRMS (ESI): m/z (M+H)$^+$ calcd for C$_{28}$H$_{33}$N$_4$O$_4$: 489.2502, found: 489.2509.

benzyl (4-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)butyl)carbamate (K8)

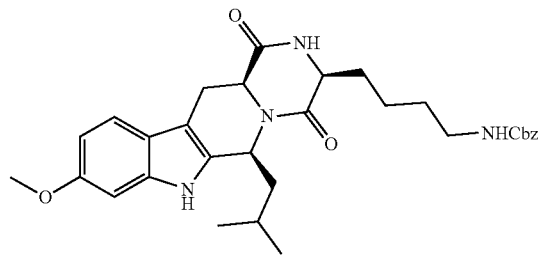

K8 was prepared as a white solid from Fmoc-Lys(Z)-OH following a procedure similar to that described for the preparation of K12. $^1$H NMR (400 MHz, CDCl$_3$) δ 7.92 (s, 1H), 7.44 (d, J=8.6 Hz, 1H), 7.32 (m, 5H), 6.89 (d, J=1.9 Hz, 1H), 6.83 (dd, J=8.5, 2.0 Hz, 1H), 6.68 (brs, 1H), 5.44 (m, 1H), 5.17-5.07 (m, 2H), 5.02 (m, 1H), 3.98 (m, 2H), 3.84 (s, 3H), 3.53 (dd, J=15.7, 4.7 Hz, 1H), 3.41-3.12 (m, 2H), 3.01 (dd, J=15.6, 11.7 Hz, 1H), 2.09 (m, 1H), 1.97 (m, 1H), 1.73 (m, 1H), 1.57 (m, 6H), 1.04 (d, J=6.4 Hz, 3H), 0.82 (d, J=6.2 Hz, 3H). HRMS (ESI): m/z (M+H)$^+$ calcd for C$_{31}$H$_{39}$N$_4$O$_5$: 547.2920, found: 547.2919.

(3S,6S,12aS)-3-(4-aminobutyl)-6-isobutyl-9-methoxy-2,3,12,12a-tetrahydropyrazino[1',2':1,6]pyrido[3,4-b]indole-1,4(6H,7H)-dione (K9)

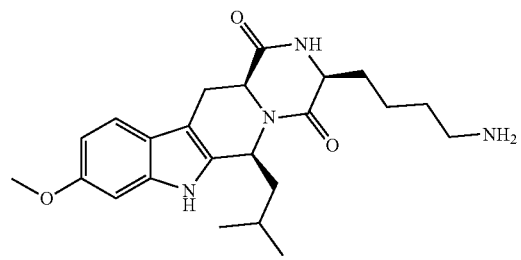

To a solution of K8 (1.06 g) in MeOH was added 10% Pd/C (100 mg) and concentrated HCl (1 mL). The mixture was hydrogenated for 4 hours at room temperature until the consumption of the starting material. Then the suspension was filtered and the filtrate was concentrated. The residue was crude K9 hydrochloride as a light green solid. $^1$H NMR (400 MHz, DMSO) δ 10.95 (s, 1H), 8.33 (s, 1H), 8.00 (brs, 3H), 7.40 (d, J=8.6 Hz, 1H), 6.86 (d, J=2.1 Hz, 1H), 6.66 (dd, J=8.6, 2.2 Hz, 1H), 5.33 (dd, J=7.9, 4.5 Hz, 1H), 4.13 (dd, J=11.5, 4.8 Hz, 1H), 4.02 (m, 1H), 3.75 (s, 3H), 3.30 (dd, J=15.6, 4.7 Hz, 1H), 2.77 (m, 3H), 1.92-1.79 (m, 1H), 1.75 (m, 1H), 1.57 (m, 4H), 1.50-1.35 (m, 3H), 0.90 (d, J=6.4 Hz, 3H), 0.75 (d, J=6.5 Hz, 3H). HRMS (ESI): m/z (M+H)$^+$ calcd for C$_{23}$H$_{33}$N$_4$O$_3$: 413.2553, found: 413.2543.

N-(4-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)butyl)pivalamide (K10)

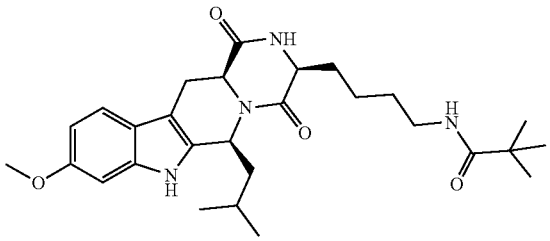

N-(4-((3S,6S,12aS)-6-isobutyl-9-methoxy-1,4-dioxo-2-pivaloyl-1,2,3,4,6,7,12,12a-octahydropyrazino[1',2':1,6]pyrido[3,4-b]indol-3-yl)butyl)pivalamide (K11)

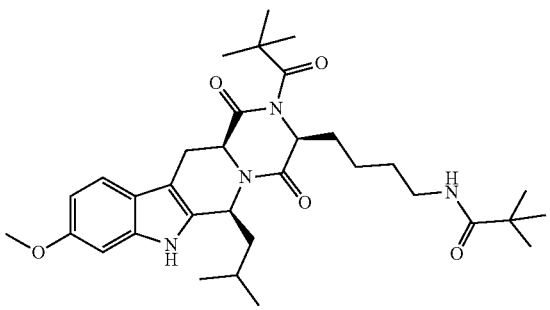

To a solution of K9 (90 mg, 0.22 mmol) and Et$_3$N (89 μL, 0.64 mmol) in dichloromethane was added trimethylacetyl chloride (40 μL, 0.32 mmol) at 0° C. The resulting mixture was stirred 4 hours at room temperature and then quenched with water. The organic phases were washed with brine, dried over MgSO$_4$ and concentrated. The residue was purified by silica gel chromatography (CH$_2$Cl$_2$/MeOH=30:1) to afford K10 (28 mg, 26%) and K11 (26 mg, 18%) as white solids.

K10: $^1$H NMR (400 MHz, CDCl$_3$) δ 8.14 (brs, 1H), 7.43 (d, J=8.6 Hz, 1H), 6.89 (d, J=2.0 Hz, 1H), 6.82 (dd, J=8.6, 2.0 Hz, 1H), 6.75 (brs, 1H), 5.89 (m, 1H), 5.45 (dd, J=9.1, 3.9 Hz, 1H), 4.06-3.94 (m, 2H), 3.84 (s, 3H), 3.52 (dd, J=15.8, 4.8 Hz, 1H), 3.40 (m, 1H), 3.25 (m, 1H), 3.01 (dd, J=15.5, 11.9 Hz, 1H), 2.13 (m, 1H), 2.01 (m, 1H), 1.73 (m, 1H), 1.64-1.49 (m, 4H), 1.49-1.35 (m, 2H), 1.23 (s, 9H), 1.03 (d, J=6.4 Hz, 3H), 0.81 (d, J=6.3 Hz, 3H). HRMS (ESI): m/z (M+H)$^+$ calcd for C$_{28}$H$_{41}$N$_4$O$_4$: 497.3128, found: 497.3101.

K11: $^1$H NMR (400 MHz, CDCl$_3$) δ 7.93 (s, 1H), 7.41 (d, J=8.7 Hz, 1H), 6.88 (d, J=2.0 Hz, 1H), 6.83 (dd, J=8.4, 2.0 Hz, 1H), 5.84 (m, 1H), 4.42 (m, 1H), 4.06 (dd, J=11.3, 4.2 Hz, 1H), 3.85 (s, 3H), 3.62 (dd, J=15.4, 4.0 Hz, 1H), 3.26 (m, 2H), 2.95 (dd, J=15.3, 11.6 Hz, 1H), 2.04 (m, 1H), 1.95-1.68 (m, 3H), 1.66-1.41 (m, 5H), 1.34 (s, 9H), 1.20 (s, 9H), 0.98 (d, J=6.5 Hz, 3H), 0.86 (d, J=6.5 Hz, 3H). HRMS (ESI): m/z (M+H)$^+$ calcd for $C_{33}H_{49}N_4O_5$: 581.3703, found: 581.3714.

N-(4-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)butyl)cyclohexanecarboxamide (K28)

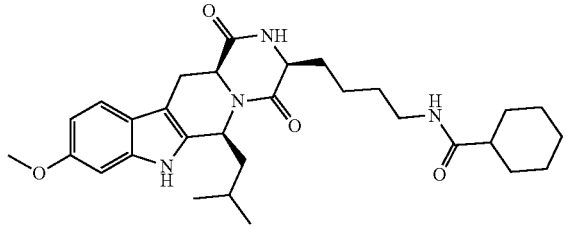

N-(4-((3S,6S,12aS)-2-(cyclohexanecarbonyl)-6-isobutyl-9-methoxy-1,4-dioxo-1,2,3,4,6,7,12,12a-octahydropyrazino[1',2':1,6]pyrido[3,4-b]indol-3-yl)butyl)cyclohexanecarboxamide (K27)

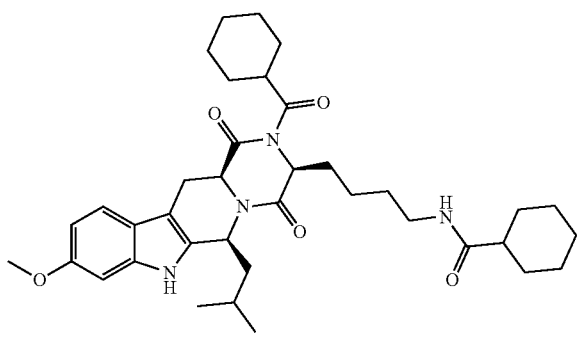

K27 and K28 were prepared as a white solid from cyclohexanecarbonyl chloride following a procedure similar to that described for the preparation of K10.

K28: $^1$H NMR (400 MHz, CDCl$_3$) δ 8.15 (s, 1H), 7.43 (d, J=8.6 Hz, 1H), 6.89 (d, J=2.0 Hz, 1H), 6.82 (dd, J=8.6, 2.2 Hz, 1H), 6.72 (s, 1H), 5.73 (t, J=6.0 Hz, 1H), 5.46 (dd, J=9.1, 4.1 Hz, 1H), 4.03 (dd, J=11.5, 4.7 Hz, 1H), 3.97 (t, J=4.8 Hz, 1H), 3.84 (s, 3H), 3.52 (dd, J=15.8, 4.8 Hz, 1H), 3.38 (m, 1H), 3.26 (m, 1H), 3.01 (dd, J=15.7, 11.7 Hz, 1H), 2.18-2.05 (m, 2H), 1.98 (m, 1H), 1.87 (d, J=13.4 Hz, 2H), 1.78 (t, J=9.2 Hz, 2H), 1.72-1.63 (m, 2H), 1.62-1.52 (m, 4H), 1.46 (dd, J=14.0, 9.0 Hz, 4H), 1.33-1.18 (m, 3H), 1.03 (d, J=6.5 Hz, 3H), 0.82 (d, J=6.4 Hz, 3H). HRMS (ESI): m/z (M+H)$^+$ calcd for $C_{30}H_{43}N_4O_4$: 523.3284, found: 523.3279.

K27: $^1$H NMR (400 MHz, CDCl$_3$) δ 7.94 (s, 1H), 7.38 (d, J=8.6 Hz, 1H), 6.88 (d, J=2.0 Hz, 1H), 6.82 (dd, J=8.6, 2.2 Hz, 1H), 5.55 (m, 1H), 5.04 (t, J=6.0 Hz, 1H), 4.83 (t, J=6.0 Hz, 1H), 4.29 (d, J=11.6, 3.9 Hz, 1H), 3.85 (s, 3H), 3.56 (dd, J=15.4, 3.6 Hz, 1H), 3.29 (m, 1H), 3.20 (m, 2H), 2.97 (dd, J=14.5, 12.6 Hz, 1H), 2.30-2.21 (m, 1H), 2.12-1.97 (m, 2H), 1.90-1.60 (m, 10H), 1.58-1.46 (m, 3H), 1.47-1.34 (m, 7H), 1.22 (m, 7H), 0.94 (d, J=6.6 Hz, 3H), 0.90 (d, J=6.6 Hz, 3H). HRMS (ESI): m/z (M+H)$^+$ calcd for $C_{37}H_{53}N_4O_5$: 633.4016, found: 633.4008.

N-(4-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)butyl)benzamide (K29)

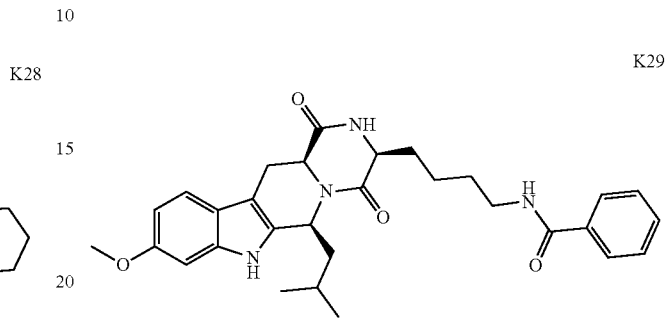

K29 was prepared as a white solid from benzoyl chloride following a procedure similar to that described for the preparation of K10. $^1$H NMR (400 MHz, CDCl$_3$) δ 8.16 (s, 1H), 7.86-7.79 (m, 2H), 7.48 (m, 1H), 7.45-7.38 (m, 3H), 6.90 (s, 1H), 6.88 (d, J=2.1 Hz, 1H), 6.81 (dd, J=8.6, 2.2 Hz, 1H), 6.57 (t, J=6.0 Hz, 1H), 5.45 (dd, J=9.1, 4.1 Hz, 1H), 4.01 (m, 2H), 3.83 (s, 3H), 3.60 (m, 1H), 3.55-3.45 (m, 2H), 2.99 (dd, J=15.9, 12.0 Hz, 1H), 2.18 (m, 1H), 2.08-1.96 (m, 1H), 1.76-1.66 (m, 3H), 1.62-1.47 (m, 4H), 1.01 (d, J=6.4 Hz, 3H), 0.78 (d, J=6.3 Hz, 3H). HRMS (ESI): m/z (M+H)$^+$ calcd for $C_{30}H_{37}N_4O_4$: 517.2815, found: 517.2822.

N-(4-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)butyl)cyclopentanecarboxamide (K30)

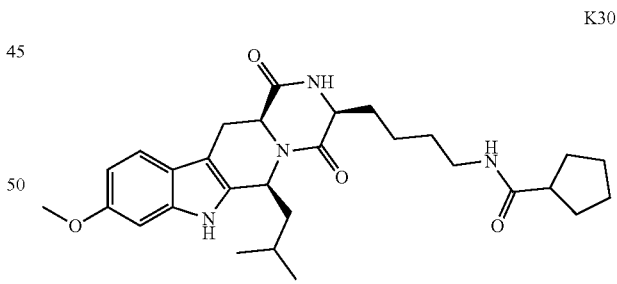

K30 was prepared as a white solid following a procedure similar to that described for the preparation of K10. $^1$H NMR (400 MHz, CDCl$_3$) δ 8.09 (s, 1H), 7.43 (d, J=8.6 Hz, 1H), 6.89 (d, J=2.1 Hz, 1H), 6.82 (dd, J=8.6, 2.2 Hz, 1H), 6.71 (s, 1H), 5.77 (t, J=6.0 Hz, 1H), 5.45 (dd, J=9.1, 4.1 Hz, 1H), 4.03 (dd, J=11.7, 4.8 Hz, 1H), 3.97 (t, J=4.8 Hz, 1H), 3.85 (s, 3H), 3.52 (dd, J=15.7, 4.8 Hz, 1H), 3.41 (m, 1H), 3.26 (m, 1H), 3.01 (dd, J=15.7, 11.7 Hz, 1H), 2.53 (m, 1H), 2.13 (m, 1H), 2.05-1.94 (m, 1H), 1.92-1.70 (m, 7H), 1.64-1.51 (m, 6H), 1.50-1.40 (m, 2H), 1.04 (d, J=6.5 Hz, 3H), 0.82 (d, J=6.4 Hz, 3H). HRMS (ESI): m/z (M+H)$^+$ calcd for $C_{29}H_{41}N_4O_4$: 509.3128, found: 509.3136.

N-(4-((3S,6S,12aS)-6-isobutyl-9-methoxy-1,4-dioxo-1,2,3,4,6,7,12,12a-octahydropyrazino[1',2':1,6]pyrido[3,4-b]indol-3-yl)butyl)isobutyramide (K32)

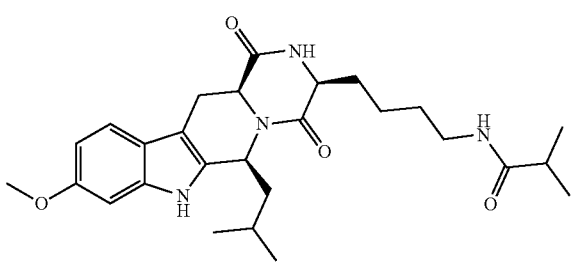

K32 was prepared as a white solid following a procedure similar to that described for the preparation of K10. $^1$H NMR (400 MHz, CDCl$_3$) δ 8.11 (s, 1H), 7.43 (d, J=8.6 Hz, 1H), 6.89 (d, J=2.0 Hz, 1H), 6.82 (dd, J=8.6, 2.0 Hz, 1H), 6.70 (s, 1H), 5.78 (t, J=5.7 Hz, 1H), 5.46 (dd, J=9.0, 4.0 Hz, 1H), 4.07-3.94 (m, 2H), 3.84 (s, 3H), 3.52 (dd, J=15.8, 4.8 Hz, 1H), 3.42 (m, 1H), 3.25 (m, 1H), 3.01 (dd, J=15.6, 11.7 Hz, 1H), 2.44-2.31 (m, 1H), 2.17-2.06 (m, 1H), 2.00 (m, 1H), 1.77-1.70 (m, 1H), 1.63-1.40 (m, 6H), 1.19 (m, 6H), 1.03 (d, J=6.4 Hz, 3H), 0.82 (d, J=6.4 Hz, 3H). HRMS (ESI): m/z (M+H)$^+$ calcd for C$_{27}$H$_{39}$N$_4$O$_4$: 483.2971, found: 483.2964.

(3S,6S,12aS)-3-(3-(tert-butoxy)propyl)-6-isobutyl-9-methoxy-2,3,12,12a-tetrahydropyrazino[1',2':1,6]pyrido[3,4-b]indole-1,4(6H,7H)-dione (K7)

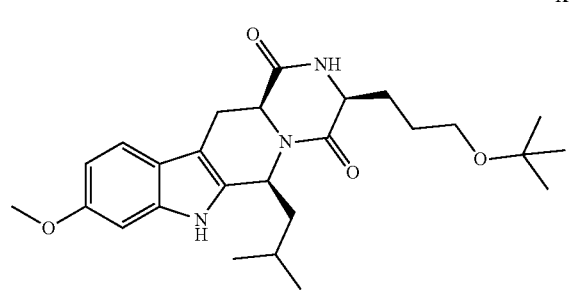

K7 was prepared as a white solid following a procedure similar to that described for the preparation of K12. $^1$H NMR (400 MHz, CDCl$_3$) δ 7.98 (s, 1H), 7.72 (s, 1H), 7.44 (d, J=8.6 Hz, 1H), 6.88 (d, J=2.0 Hz, 1H), 6.83 (dd, J=8.6, 2.1 Hz, 1H), 5.45 (dd, J=9.3, 4.1 Hz, 1H), 4.01 (dd, J=11.7, 4.9 Hz, 1H), 3.89-3.81 (m, 4H), 3.54-3.36 (m, 3H), 3.04 (dd, J=15.8, 11.6 Hz, 1H), 2.38 (m, 1H), 1.88 (m, 2H), 1.80-1.61 (m, 2H), 1.61-1.48 (m, 2H), 1.27 (s, 9H), 1.06 (d, J=6.4 Hz, 3H), 0.82 (d, J=6.3 Hz, 3H). HRMS (ESI): m/z (M+H)$^+$ calcd for C$_{26}$H$_{38}$N$_3$O$_4$: 456.2862, found: 456.2852.

ABCG2 Inhibition Assay.

A Protoporphyrin IX(PPIX)-based ABCG2 inhibition assay was developed using the A549 cancer cell line. The half maximal inhibitory concentration (IC$_{50}$) value was measured for each KO143 analog. KO143 was used as a positive control for ABCG2 inhibition assay.

Cytotoxicity Assay.

MTT assay was used to determine cytotoxicity. The 50% cytotoxic concentration (CC$_{50}$) value was calculated for each KO143 analog.

Metabolic Stability Assay.

Metabolic stability was determined by the incubation of synthesized KO143 analogs with human liver microsomes (HLM). After the incubation (0-60 min), the remaining parent compounds were analyzed by UPLC-QTOFMS.

Pharmacokinetic Study in Mice.

Pharmacokinetic analysis was conducted for the KO143 analogs with high ABCG2 inhibitory activity, low cytotoxicity, and high metabolic stability. In brief, WT mice (6-8 weeks, male) were treated with the selected KO143 analogs (50 mg/kg) by gavage. Blood was collected at 0, 0.25, 0.5, 1, 2, 4, 8, 12, 24 h after treatment. The concentration of target compound in serum was analyzed by UPLC-QTOFMS.

Efficacy of ABCG2 Inhibitors Against EPP-Associated Phototoxicity In Vivo.

This work was conducted for the KO143 analogs with a high ABCG2 inhibitory activity, low cytotoxicity, and high metabolic stability. The Fech-mut mouse model was used as an EPP model to determine the efficacy of ABCG2 inhibitors against EPP-associated phototoxicity, the most common symptom in EPP patients (6-8). In brief, Fech-mut mice with dorsal hair removed were pretreated with the selected KO143 analogs for 30 min, and then exposed to UV light (395-410 nm) for 30 min. After 5 days' treatment, all mice were sacrificed for evaluation of skin damage.

To further verify the protective effect of ABCG2 inhibitors on PPIX-mediated phototoxicity, a withdrawal test was conducted using the KO143 analogs. Briefly, the Fech-mut mice were pretreated with a KO143 analog (100 mg/kg, po). Thirty minutes after treatment, the mice were exposed to UV light for 30 minutes. The same treatment (drug plus light exposure) was repeated once daily for 4 days. From the 5th day, drug treatment was stopped, but the light exposure was continued for 4 more days. The gross appearance of mouse skin was recorded every day. On the 9th day, all mice were sacrificed and the back skin was collected for evaluation of phototoxicity.

Effects of ABCG2 Inhibitors on PPIX Efflux from RBCs.

RBCs were collected from Fech-mut mice and incubated with each selected KO143 analog (10 μM). PPIX in RBCs and culture medium was extracted, respectively, and analyzed by UPLC-QTOFMS.

REFERENCES

A. G. Smith, F. De Matteis, Drugs and the hepatic porphyrias. *Clin Haematol* 9, 399-425 (1980).

A. Schauder, A. Avital, Z. Malik, Regulation and gene expression of heme synthesis under heavy metal exposure—review. *J Environ Pathol Toxicol Oncol* 29, 137-158 (2010).

A. V. Anstey, R. J. Hift, Liver disease in erythropoietic protoporphyria: insights and implications for management. *Gut* 56, 1009-1018 (2007).

American Porphyria Foundation, https://porphyriafoundation.org/about-porphyria/types/EPP-XLP. (2018).

B. M. McGuire et al., Liver transplantation for erythropoietic protoporphyria liver disease. *Liver Transpl* 11, 1590-1596 (2005).

C. LIM, M. RAZZAQUE, J. Luo, P. FARMER, Isolation and characterization of protoporphyrin glycoconjugates from rat Harderian gland by HPLC, capillary electrophoresis and HPLC/electrospray ionization MS. *Biochem. J* 347, 757-761 (2000).

C. Xu, C. Y.-T. Li, A.-N. T. Kong, Induction of phase I, II and III drug metabolism/transport by xenobiotics. *Archives of pharmacal research* 28, 249 (2005).

D. M. Becker, J. D. Viljoen, J. Katz, S. Kramer, Reduced ferrochelatase activity: a defect common to porphyria variegata and protoporphyria. *Br J Haematol* 36, 171-179 (1977).

E. Henin et al., Pharmacokinetic interactions in mice between irinotecan and MBL-II-141, an ABCG2 inhibitor. *Biopharmaceutics & drug disposition* 38, 351-362 (2017).

E. I. Minder, X. Schneider-Yin, J. Steurer, L. M. Bachmann, A systematic review of treatment options for dermal photosensitivity in erythropoietic protoporphyria. *Cellular and molecular biology* (Noisy-le-Grand, France) 55, 84-97 (2009).

F. Li et al., Human PXR modulates hepatotoxicity associated with rifampicin and isoniazid co-therapy. *Nat Med* 19, 418-420 (2013).

G. S. Marks, D. T. Zelt, S. P. Cole, Alterations in the heme biosynthetic pathway as an index of exposure to toxins. *Can J Physiol Pharmacol* 60, 1017-1026 (1982).

G. Szakacs, J. K. Paterson, J. A. Ludwig, C. Booth-Genthe, M. M. Gottesman, Targeting multidrug resistance in cancer. *Nature reviews. Drug discovery* 5, 219-234 (2006).

H. Baart de la Faille et al., Erythropoietic protoporphyria: clinical aspects with emphasis on the skin. *Curr Probl Dermatol* 20, 123-134 (1991).

H. L. Bonkovsky et al., Porphyrin and heme metabolism and the porphyrias. *Compr Physiol* 3, 365-401 (2013).

H. Puy, L. Gouya, J.-C. Deybach, Porphyrias. *The Lancet* 375, 924-937 (2010).

J. D. Allen et al., Potent and specific inhibition of the breast cancer resistance protein multidrug transporter in vitro and in mouse intestine by a novel analogue of fumitremorgin C. *Mol Cancer Ther* 1, 417-425 (2002).

J. G. Langendonk et al., Afamelanotide for Erythropoietic Protoporphyria. *The New England journal of medicine* 373, 48-59 (2015).

J. R. Bloomer, The liver in protoporphyria. *Hepatology* 8, 402-407 (1988).

J. W. Jonker et al., The breast cancer resistance protein protects against a major chlorophyll-derived dietary phototoxin and protoporphyria. *Proc Natl Acad Sci USA* 99, 15649-15654 (2002).

K. Liu et al., Metabolism of KO143, an ABCG2 inhibitor. *Drug Metabolism and Pharmacokinetics* 32, 193-200 (2017).

K. Natarajan, Y. Xie, M. R. Baer, D. D. Ross, Role of breast cancer resistance protein (BCRP/ABCG2) in cancer drug resistance. *Biochem. Pharmacol.* 83, 1084-1103 (2012).

M. B. Poh-Fitzpatrick, A. A. Lamola, Comparative study of protoporphyrins in erythropoietic protoporphyria and griseofulvin-induced murine protoporphyria. Binding affinities, distribution, and fluorescence spectra in various blood fractions. *The Journal of clinical investigation* 60, 380-389 (1977).

M. Balwani et al., Clinical, Biochemical, and Genetic Characterization of North American Patients With Erythropoietic Protoporphyria and X-linked Protoporphyria. *JAMA dermatology* 153, 789-796 (2017).

M. Balwani, R. J. Desnick, The porphyrias: advances in diagnosis and treatment. *Hematology Am Soc Hematol Educ Program* 2012, 19-27 (2012).

M. J. Casanova-Gonzalez, M. Trapero-Marugan, E. A. Jones, R. Moreno-Otero, Liver disease and erythropoietic protoporphyria: a concise review. *World J Gastroenterol* 16, 4526-4531 (2010).

M. Lecha, H. Puy, J. C. Deybach, Erythropoietic protoporphyria. *Orphanet J Rare Dis* 4, 19 (2009).

M. Wiese, BCRP/ABCG2 inhibitors: a patent review (2009-present). *Expert Opin. Ther. Pat.* 25, 1229-1237 (2015).

N. S. Key, J. M. Rank, D. Freese, J. R. Bloomer, D. E. Hammerschmidt, Hemolytic anemia in protoporphyria: possible precipitating role of liver failure and photic stress. *American journal of hematology* 39, 202-207 (1992).

R. J. Hift, S. Thunell, A. Brun, Drugs in porphyria: From observation to a modern algorithm-based system for the prediction of porphyrogenicity. *Pharmacol Ther* 132, 158-169 (2011).

S. Boulechfar et al., Ferrochelatase structural mutant (Fechm1Pas) in the house mouse. *Genomics* 16, 645-648 (1993).

S. D. Whatley et al., C-terminal deletions in the ALAS2 gene lead to gain of function and cause X-linked dominant protoporphyria without anemia or iron overload. *American journal of human genetics* 83, 408-414 (2008).

S. Kramer, J. D. Viljoen, Erythropoietic protoporphyria: evidence that it is due to a variant ferrochelatase. *Int J Biochem* 12, 925-930 (1980).

S. Lyoumi et al., Protoporphyrin retention in hepatocytes and Kupffer cells prevents sclerosing cholangitis in erythropoietic protoporphyria mouse model. *Gastroenterology* 141, 1509-1519, 1519 e1501-1503 (2011).

S. Sandberg, A. Brun, Light-induced protoporphyrin release from erythrocytes in erythropoietic protoporphyria. *The Journal of clinical investigation* 70, 693-698 (1982).

S. Tutois et al., Erythropoietic protoporphyria in the house mouse. A recessive inherited ferrochelatase deficiency with anemia, photosensitivity, and liver disease. *J Clin Invest* 88, 1730-1736 (1991).

S. Zhou et al., Increased expression of the Abcg2 transporter during erythroid maturation plays a role in decreasing cellular protoporphyrin IX levels. *Blood* 105, 2571-2576 (2005).

T. R. Tephly, A. H. Gibbs, F. De Matteis, Studies on the mechanism of experimental porphyria produced by 3,5-diethoxycarbonyl-1, 4-dihydrocollidine. Role of a porphyrin-like inhibitor of protohaem ferro-lyase. *Biochem. J* 180, 241-244 (1979).

X. Ma et al., The pregnane X receptor gene-humanized mouse: a model for investigating drug-drug interactions mediated by cytochromes P450 3A. *Drug Metab Dispos* 35, 194-200 (2007).

Y. Fukuda et al., The severity of hereditary porphyria is modulated by the porphyrin exporter and Lan antigen ABCB6. *Nature communications* 7, 12353 (2016).

Y. Li et al., Synthesis of a new inhibitor of breast cancer resistance protein with significantly improved pharmacokinetic profiles. *Bioorg Med Chem Lett* 26, 551-555 (2016).

```
Sequences
TNF-α Forward Primer
                                          SEQ ID NO: 1
CATCTTCTCAAAATTCGAGTGACAA
```

-continued

TNF-α Reverse Primer SEQ ID NO: 2

TGGGAGTAGACAAGGTACAACCC

IL-1β Forward Primer SEQ ID NO: 3

TTGAGGGACCCCAAAAGATG

IL-1β Reverse Primer SEQ ID NO: 4

TGGACAGCCCAGGTCAAAG

Collagen 1a1 Forward Primer SEQ ID NO: 5

ACTGCAACATGGAGACAGGTCAGA

Collagen 1a1 Reverse Primer SEQ ID NO: 6

ATCGGTCATGCTCTCTCCAAACCA

Collagen 1a2 Forward Primer SEQ ID NO: 7

GAGGACTTGTTGGTGAGCCT

Collagen 1a2 Reverse Primer SEQ ID NO: 8

CTCACCCTTGTTACCGGATT

Mdr1 Forward Primer SEQ ID NO: 9

ATTCTGGGAACTCTCGCTGC

Mdr1 Reverse Primer SEQ ID NO: 10

CTCCAGACTGCTGTTGCTGA

Mdr2 Forward Primer SEQ ID NO: 11

CGGCGACTTTGAACTAGGCA

Mdr2 Reverse Primer SEQ ID NO: 12

CAGAGTATCGGAACAGTGTCAAC

Bsep Forward Primer SEQ ID NO: 13

GCAGAAGCAAAGGGTAGCCATC

Bsep Reverse Primer SEQ ID NO: 14

GGTAGCCATGTCCAGAAGCAG

Mrp2 Forward Primer SEQ ID NO: 15

AGCAGGTGTTCGTTGTGTGT

Mrp2 Reverse Primer SEQ ID NO: 160

CAGGAGGAATTGTGGCTTGTC

Abcg5 Forward Primer SEQ ID NO: 17

TGGATCCAACACCTCTATGCTAAA

Abcg5 Reverse Primer SEQ ID NO: 18

GGCAGGTTTTCTCGATGAACTG

Abcg8 Forward Primer SEQ ID NO: 19

CCGTCGTCAGATTTCCAATGA

Abcg8 Reverse Primer SEQ ID NO: 20

GGCTTCCGACCCATGAATG

---

What is claimed is:

1. A compound defined by Formula IA below

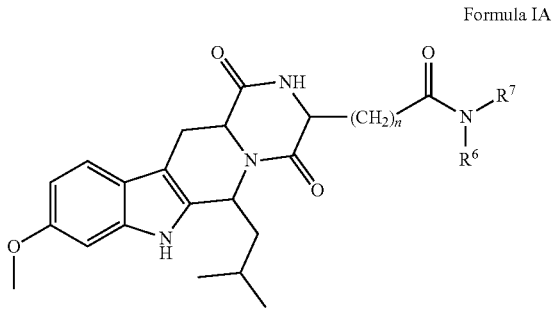

Formula IA wherein n is an integer of from 0 to 6;

$R^6$ and $R^7$ are each independently selected from the group consisting of H, $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, wherein said $C_{1-6}$ alkyl, $C_{2-6}$ alkenyl, $C_{2-6}$ alkynyl, $C_{1-4}$ haloalkyl, $C_{3-10}$ cycloalkyl, 6-10 membered aryl, 5-10 membered heteroaryl, and 4-10 membered heterocycloalkyl, are optionally substituted with 1, 2, 3, or 4 independently selected $R^A$ groups, or $R^6$ and $R^7$, together with the N atom to which they are attached, form a 4-9 membered heterocycloalkyl group or a 5-6 membered heteroaryl group, each optionally substituted with 1, 2, or 3 independently selected $R^A$ groups; and each $R^A$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkyl, HO-$C_{1-3}$ alkyl, amino, $C_{1-6}$ alkylamino, di($C_{1-6}$ alkyl) amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl) carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

2. A compound defined by Formula IB below

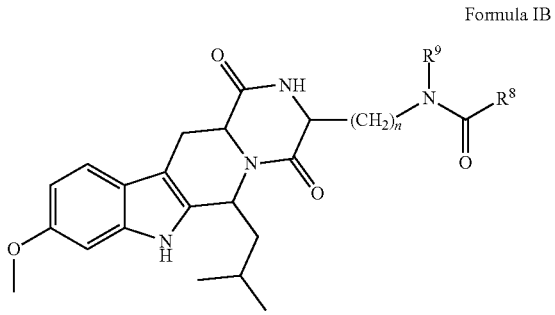

Formula IB wherein
n is an integer of from 0 to 6;
R$^8$ and R$^9$ are independently selected from the group consisting of H, C$_{1-6}$ alkyl, C$_{2-6}$ alkenyl, C$_{2-6}$ alkynyl, C$_{1-4}$ haloalkyl, C$_{3-10}$ cycloalkyl, 6-10 membered aryl, 5-10 membered heteroaryl, and 4-10 membered heterocycloalkyl, wherein said C$_{1-6}$ alkyl, C$_{2-6}$ alkenyl, C$_{2-6}$ alkynyl, C$_{1-4}$ haloalkyl, C$_{3-10}$ cycloalkyl, 6-10 membered aryl, 5-10 membered heteroaryl, and 4-10 membered heterocycloalkyl, are optionally substituted with 1, 2, 3, or 4 independently selected R$^A$ groups, or R$^8$ and R$^9$, together with the atoms to which they are attached, form a 4-9 membered heterocycloalkyl group or a 5-6 membered heteroaryl group, each optionally substituted with 1, 2, or 3 independently selected R$^A$ groups; and
each R$^A$ is independently selected from OH, NO$_2$, CN, halo, C$_{1-6}$ alkyl, C$_{2-6}$ alkenyl, C$_{2-6}$ alkynyl, C$_{1-4}$ haloalkyl, C$_{1-6}$ alkoxy, C$_{1-6}$ haloalkoxy, cyano-C$_{1-3}$ alkyl, HO-C$_{1-3}$ alkyl, amino, C$_{1-6}$ alkylamino, di(C$_{1-6}$ alkyl)amino, thio, C$_{1-6}$ alkylthio, C$_{1-6}$ alkylsulfinyl, C$_{1-6}$ alkylsulfonyl, carbamyl, C$_{1-6}$ alkylcarbamyl, di(C$_{1-6}$ alkyl) carbamyl, carboxy, C$_{1-6}$ alkylcarbonyl, C$_{1-6}$ alkoxycarbonyl, C$_{1-6}$ alkylcarbonylamino, C$_{1-6}$ alkylsulfonylamino, aminosulfonyl, C$_{1-6}$ alkylaminosulfonyl, di(C$_{1-6}$ alkyl)aminosulfonyl, aminosulfonylamino, C$_{1-6}$ alkylaminosulfonylamino, di(C$_{1-6}$ alkyl)aminosulfonylamino, aminocarbonylamino, C$_{1-6}$ alkylaminocarbonylamino, and di(C$_{1-6}$ alkyl)aminocarbonylamino;
or a pharmaceutically acceptable salt, ester, or N-oxide thereof.

3. A compound defined by Formula IC below

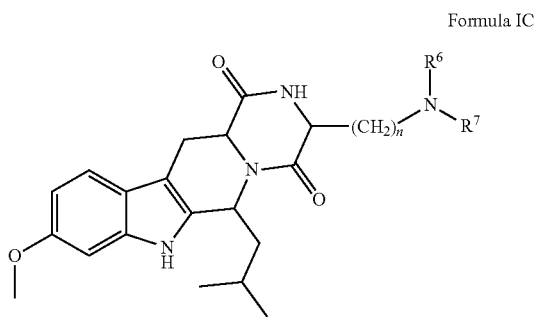

Formula IC wherein
n is an integer of from 0 to 6;
R$^6$ and R$^7$ are each independently selected from the group consisting of H, C$_{1-6}$ alkyl, C$_{2-6}$ alkenyl, C$_{2-6}$ alkynyl, C$_{1-4}$ haloalkyl, C$_{3-10}$ cycloalkyl, 6-10 membered aryl, 5-10 membered heteroaryl, and 4-10 membered heterocycloalkyl, wherein said C$_{1-6}$ alkyl, C$_{2-6}$ alkenyl, C$_{2-6}$ alkynyl, C$_{1-4}$ haloalkyl, C$_{3-10}$ cycloalkyl, 6-10 membered aryl, 5-10 membered heteroaryl, and 4-10 membered heterocycloalkyl, are optionally substituted with 1, 2, 3, or 4 independently selected R$^A$ groups, or R$^6$ and R$^7$, together with the N atom to which they are attached, form a 4-9 membered heterocycloalkyl group or a 5-6 membered heteroaryl group, each optionally substituted with 1, 2, or 3 independently selected R$^A$ groups; and
each R$^A$ is independently selected from OH, NO$_2$, CN, halo, C$_{1-6}$ alkyl, C$_{2-6}$ alkenyl, C$_{2-6}$ alkynyl, C$_{1-4}$ haloalkyl, C$_{1-6}$ alkoxy, C$_{1-6}$ haloalkoxy, cyano-C$_{1-3}$ alkyl, HO-C$_{1-3}$ alkyl, amino, C$_{1-6}$ alkylamino, di(C$_{1-6}$ alkyl)amino, thio, C$_{1-6}$ alkylthio, C$_{1-6}$ alkylsulfinyl, C$_{1-6}$ alkylsulfonyl, carbamyl, C$_{1-6}$ alkylcarbamyl, di(C$_{1-6}$ alkyl) carbamyl, carboxy, C$_{1-6}$ alkylcarbonyl, C$_{1-6}$ alkoxycarbonyl, C$_{1-6}$ alkylcarbonylamino, C$_{1-6}$ alkylsulfonylamino, aminosulfonyl, C$_{1-6}$ alkylaminosulfonyl, di(C$_{1-6}$ alkyl)aminosulfonyl, aminosulfonylamino, C$_{1-6}$ alkylaminosulfonylamino, di(C$_{1-6}$ alkyl)aminosulfonylamino, aminocarbonylamino, C$_{1-6}$ alkylaminocarbonylamino, and di(C$_{1-6}$ alkyl)aminocarbonylamino;
or a pharmaceutically acceptable salt, ester, or N-oxide thereof.

4. A compound defined by Formula ID below

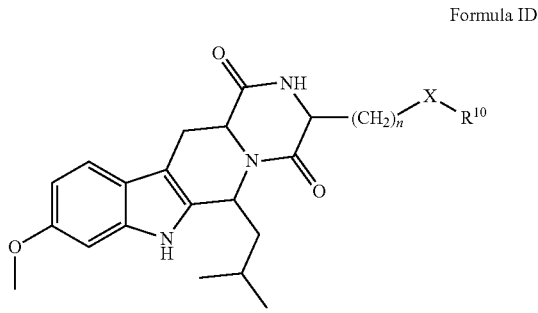

Formula ID wherein
n is an integer of from 0 to 6;
X is selected from the group consisting of CH$_2$, O and S;
R$^{10}$ is selected from the group consisting of C$_{1-6}$ alkyl, C$_{2-6}$ alkenyl, C$_{2-6}$ alkynyl, C$_{1-4}$ haloalkyl, C(O)R$^b$, C$_{3-10}$ cycloalkyl, 6-10 membered aryl, 5-10 membered heteroaryl, and 4-10 membered heterocycloalkyl, wherein said C$_{1-6}$ alkyl, C$_{2-6}$ alkenyl, C$_{2-6}$ alkynyl, C$_{1-4}$ haloalkyl, C$_{3-10}$ cycloalkyl, 6-10 membered aryl, 5-10 membered heteroaryl, and 4-10 membered heterocycloalkyl, are optionally substituted with 1, 2, 3, or 4 independently selected R$^A$ groups; and
each R$^A$ is independently selected from OH, NO$_2$, CN, halo, C$_{1-6}$ alkyl, C$_{2-6}$ alkenyl, C$_{2-6}$ alkynyl, C$_{1-4}$ haloalkyl, C$_{1-6}$ alkoxy, C$_{1-6}$ haloalkoxy, cyano-C$_{1-3}$ alkyl, HO-C$_{1-3}$ alkyl, amino, C$_{1-6}$ alkylamino, di(C$_{1-6}$ alkyl)amino, thio, C$_{1-6}$ alkylthio, C$_{1-6}$ alkylsulfinyl, C$_{1-6}$ alkylsulfonyl, carbamyl, C$_{1-6}$ alkylcarbamyl, di(C$_{1-6}$ alkyl) carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino;

or a pharmaceutically acceptable salt, ester, or N-oxide thereof.

5. A method of treating multidrug resistance in a tumor or cancer in a subject in need thereof by inhibiting ABCG2 transporter activity, reducing resistance of a tumor or cancer to a chemotherapeutic agent by inhibiting ABCG2 in a mammal, enhancing the chemotherapeutic treatment of tumor or cancer with a chemotherapeutic agent or increasing the bioavailability of an ABCG2 substrate drug in a mammal, the method comprising administering to the subject a therapeutically effective amount of a compound of claim 1.

6. A method of treating multidrug resistance in a tumor or cancer in a subject in need thereof by inhibiting ABCG2 transporter activity, reducing resistance of a tumor or cancer to a chemotherapeutic agent by inhibiting ABCG2 in a mammal, enhancing the chemotherapeutic treatment of tumor or cancer with a chemotherapeutic agent, or increasing the bioavailability of an ABCG2 substrate drug in a mammal, the method comprising administering to the subject a therapeutically effective amount of a compound of claim 2.

7. A method of treating multidrug resistance in a tumor or cancer in a subject in need thereof by inhibiting ABCG2 transporter activity, reducing resistance of a tumor or cancer to a chemotherapeutic agent by inhibiting ABCG2 in a mammal, enhancing the chemotherapeutic treatment of tumor or cancer with a chemotherapeutic agent, or increasing the bioavailability of an ABCG2 substrate drug in a mammal, the method comprising administering to the subject a therapeutically effective amount of a compound of claim 3.

8. A method of treating multidrug resistance in a tumor or cancer in a subject in need thereof by inhibiting ABCG2 transporter activity, reducing resistance of a tumor or cancer to a chemotherapeutic agent by inhibiting ABCG2 in a mammal, enhancing the chemotherapeutic treatment of tumor or cancer with a chemotherapeutic agent, or increasing the bioavailability of an ABCG2 substrate drug in a mammal, the method comprising administering to the subject a therapeutically effective amount of a compound of claim 4.

* * * * *

SEQUENCE LISTING

<160> NUMBER OF SEQ ID NOS: 20

<210> SEQ ID NO 1
<211> LENGTH: 25
<212> TYPE: DNA
<213> ORGANISM: Artificial Sequence
<220> FEATURE:
<223> OTHER INFORMATION: Synthetic construct

<400> SEQUENCE: 1
catcttctca aaattcgagt gacaa         25

<210> SEQ ID NO 2
<211> LENGTH: 23
<212> TYPE: DNA
<213> ORGANISM: Artificial Sequence
<220> FEATURE:
<223> OTHER INFORMATION: Synthetic construct

<400> SEQUENCE: 2
tgggagtaga caaggtacaa ccc           23

<210> SEQ ID NO 3
<211> LENGTH: 20
<212> TYPE: DNA
<213> ORGANISM: Artificial Sequence
<220> FEATURE:
<223> OTHER INFORMATION: Synthetic construct

<400> SEQUENCE: 3
ttgagggacc ccaaaagatg                                               20

<210> SEQ ID NO 4
<211> LENGTH: 19
<212> TYPE: DNA
<213> ORGANISM: Artificial Sequence
<220> FEATURE:
<223> OTHER INFORMATION: Synthetic construct

<400> SEQUENCE: 4
tggacagccc aggtcaaag                                                19

<210> SEQ ID NO 5
<211> LENGTH: 24
<212> TYPE: DNA
<213> ORGANISM: Artificial Sequence
<220> FEATURE:
<223> OTHER INFORMATION: Synthetic construct

<400> SEQUENCE: 5
actgcaacat ggagacaggt caga                                          24

<210> SEQ ID NO 6
<211> LENGTH: 24
<212> TYPE: DNA
<213> ORGANISM: Artificial Sequence
<220> FEATURE:
<223> OTHER INFORMATION: Synthetic construct

<400> SEQUENCE: 6
atcggtcatg ctctctccaa acca                                          24

<210> SEQ ID NO 7
<211> LENGTH: 20
<212> TYPE: DNA
<213> ORGANISM: Artificial Sequence
<220> FEATURE:
<223> OTHER INFORMATION: Synthetic construct

<400> SEQUENCE: 7
gaggacttgt tggtgagcct                                               20

<210> SEQ ID NO 8
<211> LENGTH: 20
<212> TYPE: DNA
<213> ORGANISM: Artificial Sequence
<220> FEATURE:
<223> OTHER INFORMATION: Synthetic construct

<400> SEQUENCE: 8
ctcacccttg ttaccggatt                                               20

<210> SEQ ID NO 9
<211> LENGTH: 20
<212> TYPE: DNA
<213> ORGANISM: Artificial Sequence
<220> FEATURE:
<223> OTHER INFORMATION: Synthetic construct

<400> SEQUENCE: 9
attctgggaa ctctcgctgc                                               20

<210> SEQ ID NO 10
<211> LENGTH: 20
<212> TYPE: DNA
<213> ORGANISM: Artificial Sequence -continued

```
<220> FEATURE:
<223> OTHER INFORMATION: Synthetic construct

<400> SEQUENCE: 10
ctccagactg ctgttgctga                                             20

<210> SEQ ID NO 11
<211> LENGTH: 20
<212> TYPE: DNA
<213> ORGANISM: Artificial Sequence
<220> FEATURE:
<223> OTHER INFORMATION: Synthetic construct

<400> SEQUENCE: 11
cggcgacttt gaactaggca                                             20

<210> SEQ ID NO 12
<211> LENGTH: 23
<212> TYPE: DNA
<213> ORGANISM: Artificial Sequence
<220> FEATURE:
<223> OTHER INFORMATION: Synthetic construct

<400> SEQUENCE: 12
cagagtatcg gaacagtgtc aac                                         23

<210> SEQ ID NO 13
<211> LENGTH: 22
<212> TYPE: DNA
<213> ORGANISM: Artificial Sequence
<220> FEATURE:
<223> OTHER INFORMATION: Synthetic construct

<400> SEQUENCE: 13
gcagaagcaa agggtagcca tc                                          22

<210> SEQ ID NO 14
<211> LENGTH: 21
<212> TYPE: DNA
<213> ORGANISM: Artificial Sequence
<220> FEATURE:
<223> OTHER INFORMATION: Synthetic construct

<400> SEQUENCE: 14
ggtagccatg tccagaagca g                                           21

<210> SEQ ID NO 15
<211> LENGTH: 20
<212> TYPE: DNA
<213> ORGANISM: Artificial Sequence
<220> FEATURE:
<223> OTHER INFORMATION: Synthetic construct

<400> SEQUENCE: 15
agcaggtgtt cgttgtgtgt                                             20

<210> SEQ ID NO 16
<211> LENGTH: 21
<212> TYPE: DNA
<213> ORGANISM: Artificial Sequence
<220> FEATURE:
<223> OTHER INFORMATION: Synthetic construct

<400> SEQUENCE: 16
caggaggaat tgtggcttgt c                                           21
```

```
<210> SEQ ID NO 17
<211> LENGTH: 24
<212> TYPE: DNA
<213> ORGANISM: Artificial Sequence
<220> FEATURE:
<223> OTHER INFORMATION: Synthetic construct

<400> SEQUENCE: 17
tggatccaac acctctatgc taaa                                          24

<210> SEQ ID NO 18
<211> LENGTH: 22
<212> TYPE: DNA
<213> ORGANISM: Artificial Sequence
<220> FEATURE:
<223> OTHER INFORMATION: Synthetic construct

<400> SEQUENCE: 18
ggcaggtttt ctcgatgaac tg                                            22

<210> SEQ ID NO 19
<211> LENGTH: 21
<212> TYPE: DNA
<213> ORGANISM: Artificial Sequence
<220> FEATURE:
<223> OTHER INFORMATION: Synthetic construct

<400> SEQUENCE: 19
ccgtcgtcag atttccaatg a                                             21

<210> SEQ ID NO 20
<211> LENGTH: 19
<212> TYPE: DNA
<213> ORGANISM: Artificial Sequence
<220> FEATURE:
<223> OTHER INFORMATION: Synthetic construct

<400> SEQUENCE: 20
ggcttccgac ccatgaatg                                                19
```